United States Patent [19]

Ida

[11] Patent Number: 4,491,287

[45] Date of Patent: Jan. 1, 1985

[54] PUSHBUTTON ACTUATED CASSETTE TAPE TRANSPORT

[75] Inventor: Mitsuru Ida, Koshigaya, Japan

[73] Assignee: Sony Corporation, Tokyo, Japan

[21] Appl. No.: 333,478

[22] Filed: Dec. 22, 1981

[30] Foreign Application Priority Data

Dec. 29, 1980 [JP] Japan ................... 55-188031

[51] Int. Cl.³ .......................... G11B 15/10
[52] U.S. Cl. .................. 242/200; 360/96.3; 360/137
[58] Field of Search ............ 360/96.5, 74.6, 137, 360/96.3, 96.4; 369/24, 42; 200/DIG. 34; 242/200–202

[56] References Cited

U.S. PATENT DOCUMENTS

| | | | |
|---|---|---|---|
| 3,606,977 | 9/1971 | Kakiuchi | 242/200 |
| 4,081,849 | 3/1978 | Onishi et al. | 360/137 |
| 4,116,078 | 9/1978 | Kitamura et al. | 360/137 |

FOREIGN PATENT DOCUMENTS

| | | | |
|---|---|---|---|
| 581504 | 11/1977 | U.S.S.R. | 74/483 |
| 637855 | 12/1978 | U.S.S.R. | 137/ |

Primary Examiner—Bernard Konick
Assistant Examiner—Steven R. Garland
Attorney, Agent, or Firm—Lewis H. Eslinger; Alvin Sinderbrand

[57] ABSTRACT

A cassette tape recording and/or reproducing apparatus has a substantially rectangular chassis with a perimeter approximately coextensive with a tape cassette to be operatively positioned in a cassette holder at one side of the chassis, a tape transport mechanism including reel shafts extending through the chassis for engaging respective reels in a tape cassette operatively positioned against the chassis, and a gear transmission for selectively driving the reel shafts in accordance with a plurality of operating modes, such gear transmission consisting of a plurality of gears disposed at the other side of the chassis for rotation about axes normal to the chassis, with certain of the gears being axially displaceable for the changing from one to another of the operating modes, and push-buttons all disposed at the other side of the chassis and being selectively manually actuable normal to the chassis from extended to depressed positions for displacing respective axially movable gears for correspondingly changing the mode of the apparatus.

11 Claims, 76 Drawing Figures

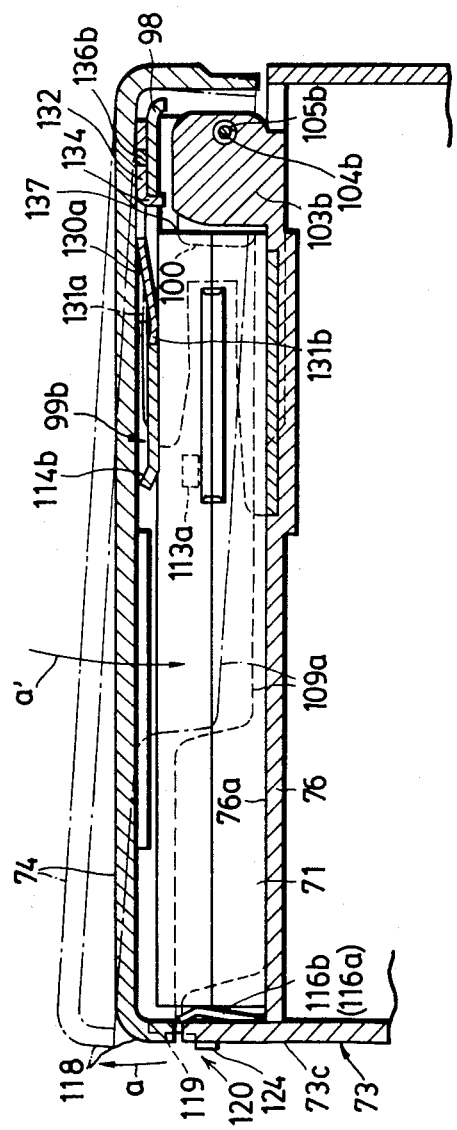

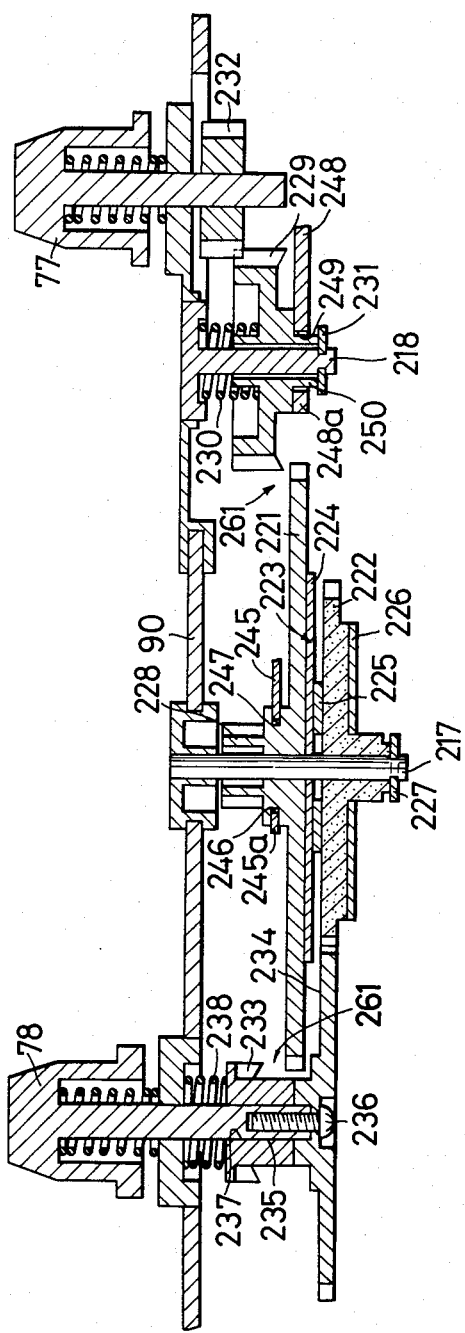

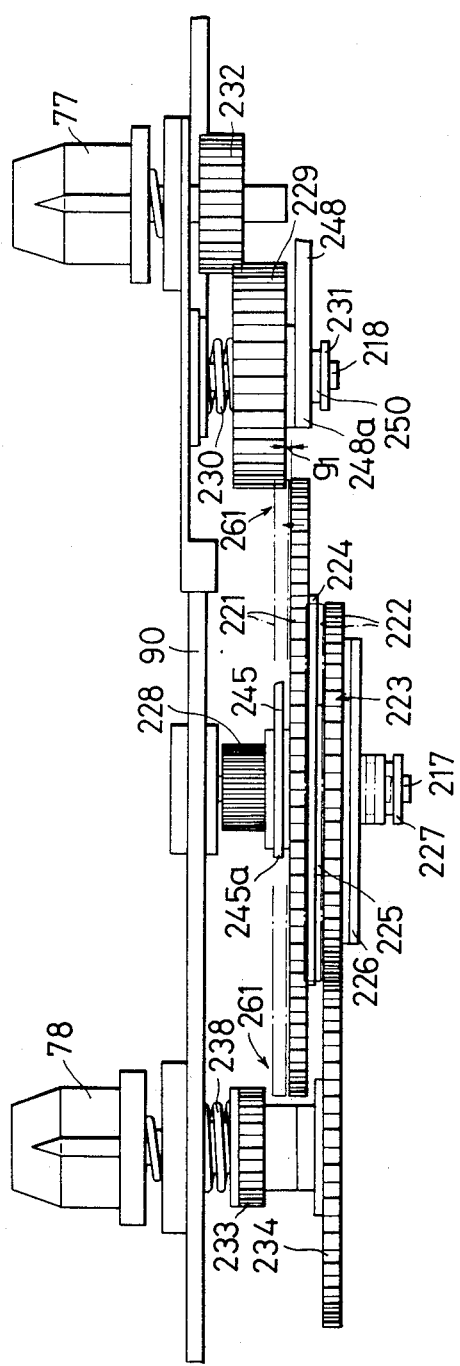

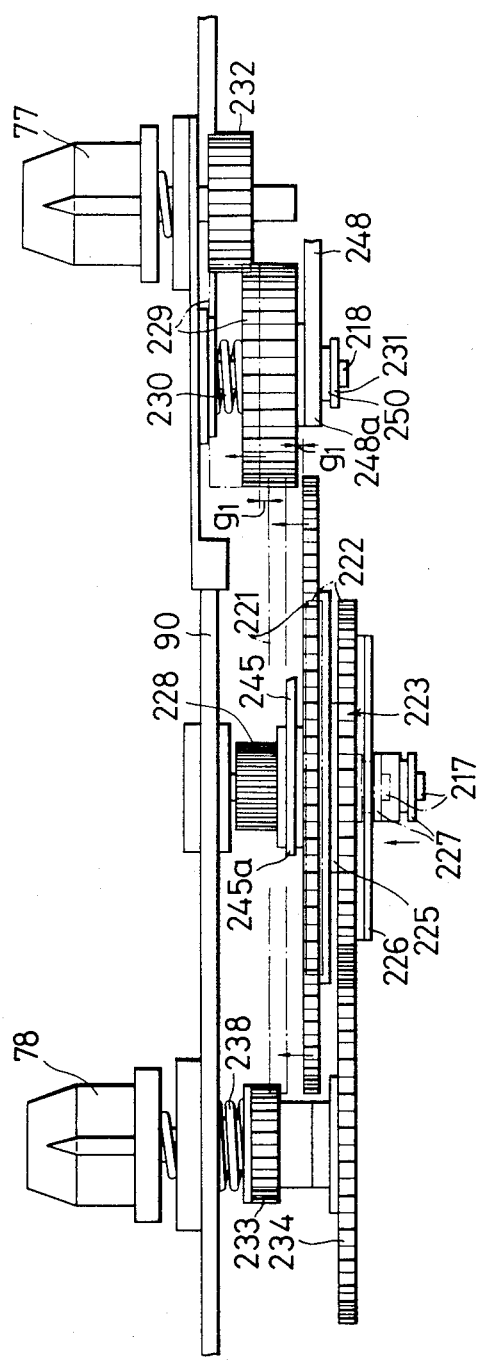

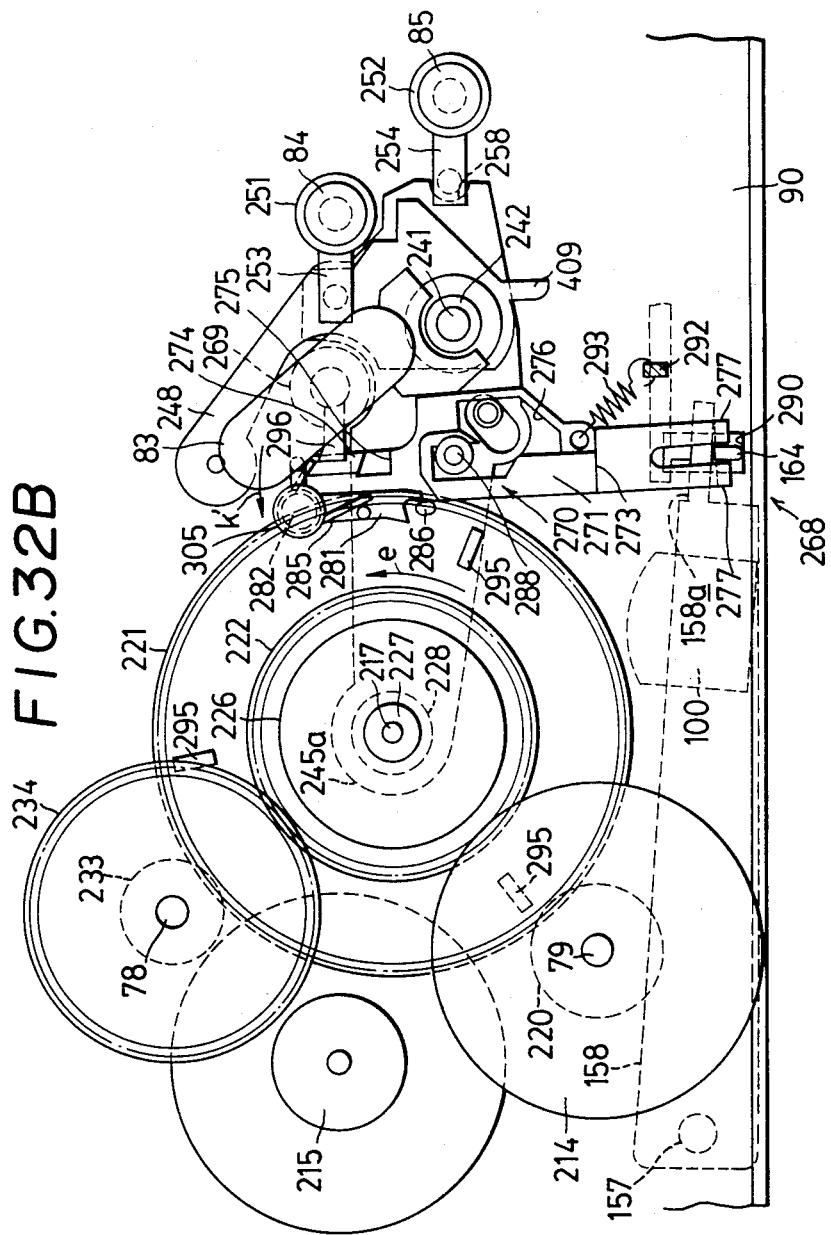

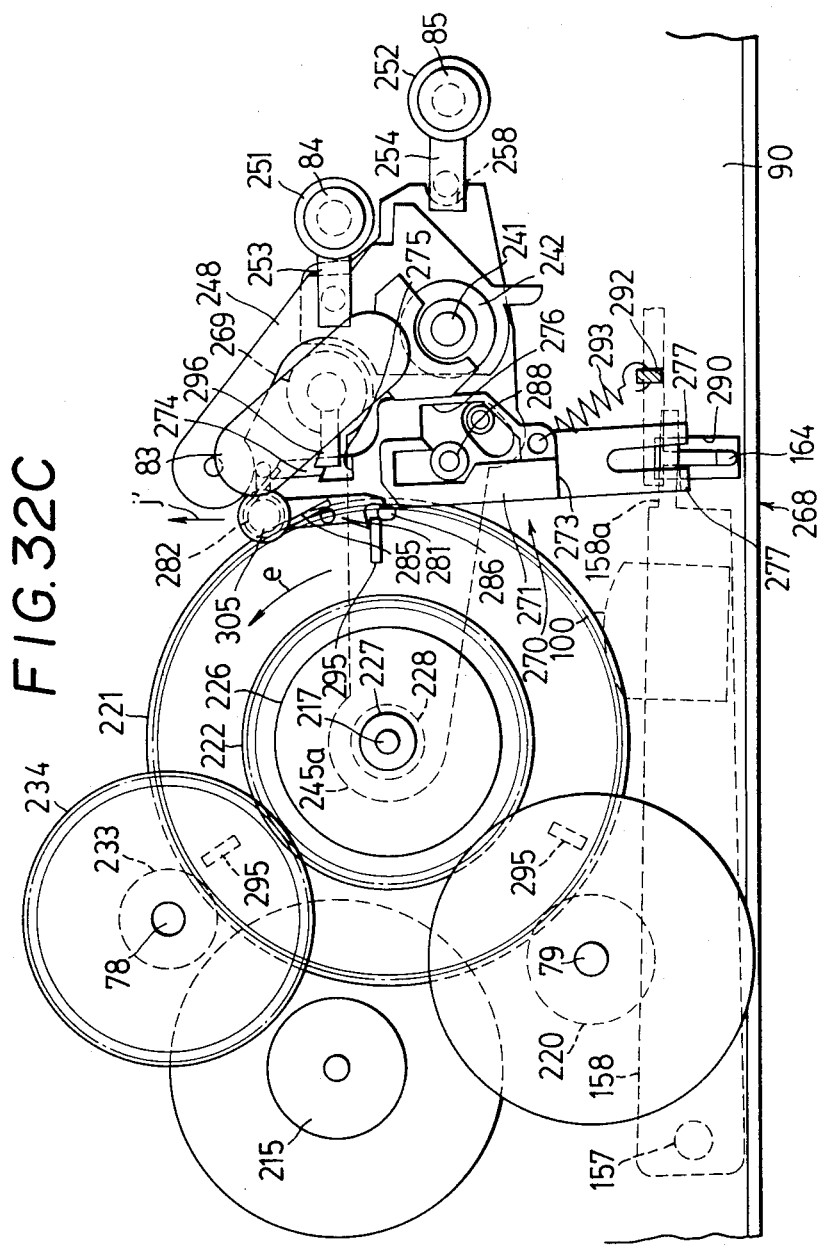

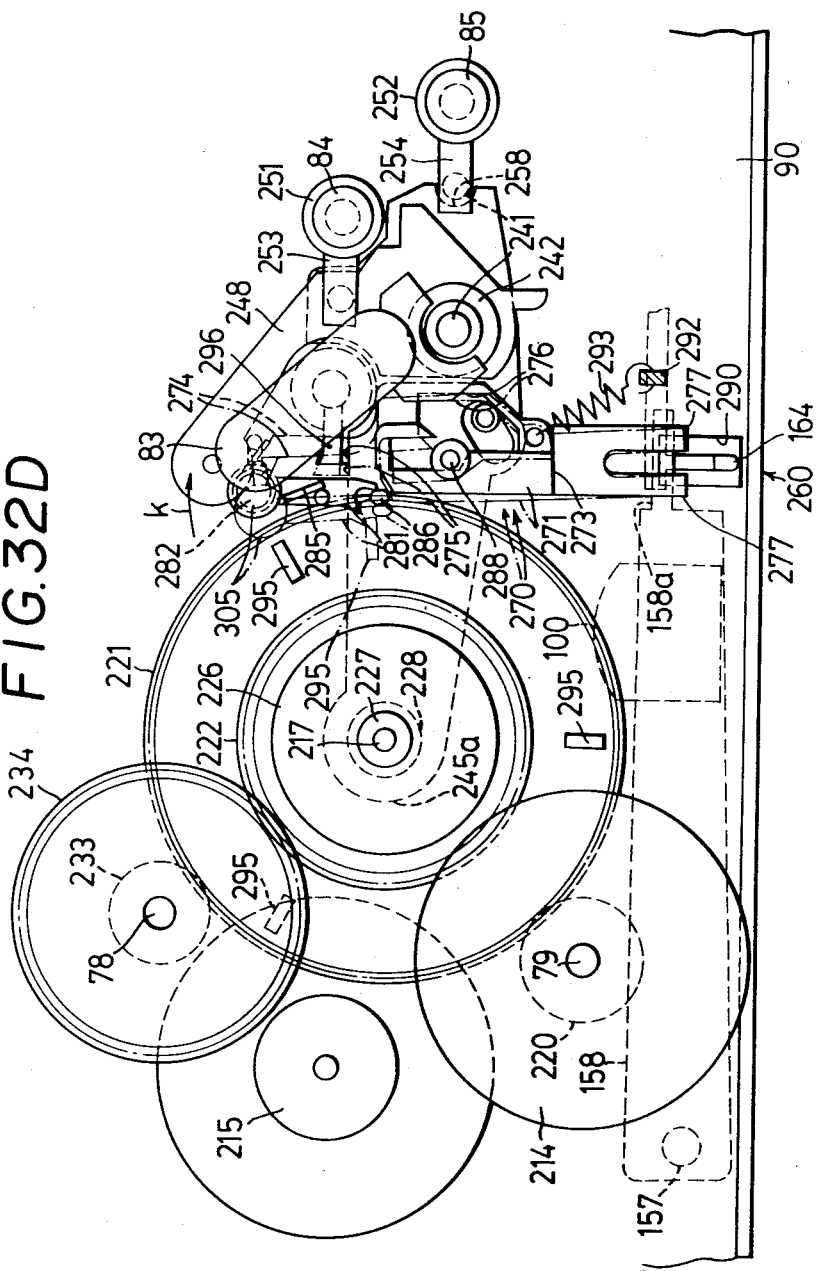

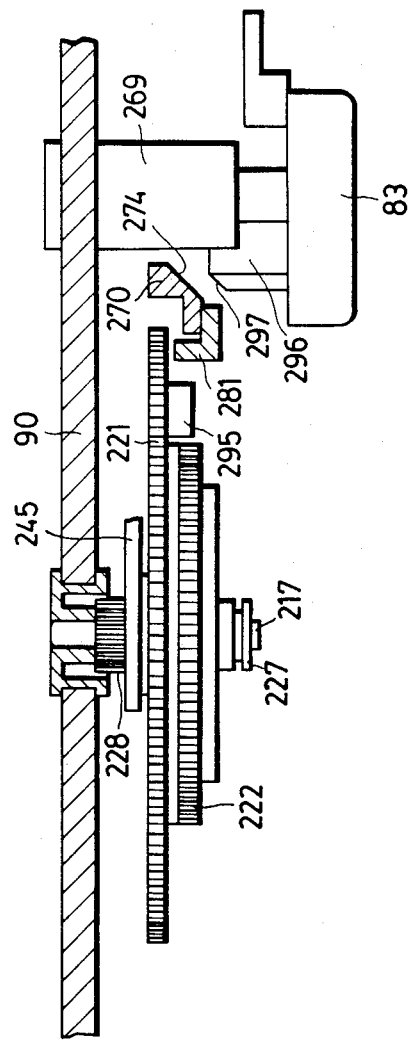

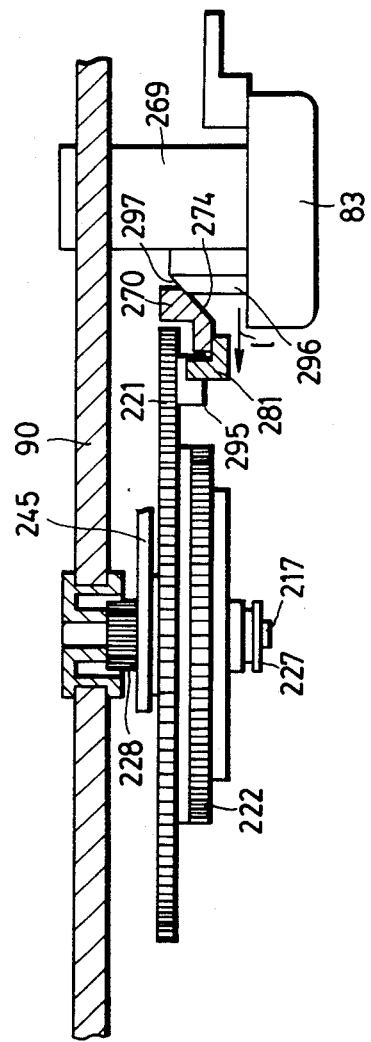

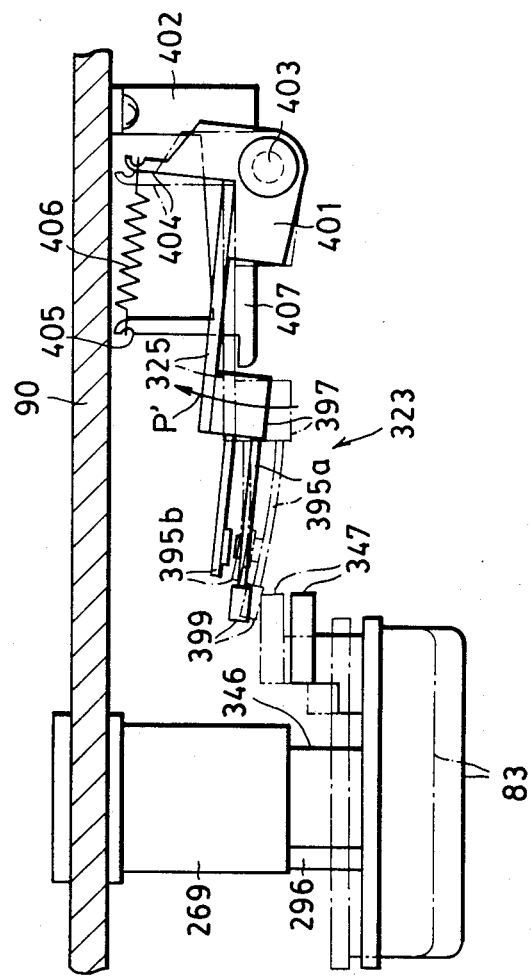

PUSHBUTTON ACTUATED CASSETTE TAPE TRANSPORT

BACKGROUND OF THE INVENTION

1. Field of the Invention

This invention relates generally to magnetic tape recording and/or reproducing apparatus, and is particularly directed to improvements in such apparatus for use with a tape cassette.

2. Description of the Prior Art

Recently, cassette tape recording and/or reproducing apparatus has been provided which is relatively small so as to permit the same to be carried in a pocket or the like on one's person. Such apparatus generally comprises a tape transport mechanism including an assemblage of gears and idlers for suitably driving a capstan and a pair of reel shafts, and a mode selecting mechanism for the changing of the relationships of the gears and idlers to establish a selected or desired operating mode of the apparatus, such as, the normal forward, fast-forward or rewind mode. The foregoing relatively complex mechanisms make it difficult to provide a truly compact or extremely small size apparatus. Further, in the existing apparatus of the described type, at least some of the gears and idlers are moved horizontally, that is, in directions generally parallel to the chassis of the apparatus, in response to forces applied manually to push-buttons, or slide levers of the mode-selecting mechanism. Usually, such push-buttons or slide levers of the mode selecting mechanism are also moved in directions parallel to the chassis of the apparatus so that it is conventional for the push-buttons to project from a side surface of the apparatus casing, in which case the overall dimensions of the apparatus are enlarged by the projecting push-buttons.

OBJECTS AND SUMMARY OF THE INVENTION

Accordingly, it is an object of the present invention to provide a cassette tape recording and/or reproducing apparatus of minimum size, and which is simple and inexpensive to produce.

More specifically, it is an object of this invention to provide a cassette tape recording and/or reproducing apparatus of overall dimensions which are, at most, only slightly larger than the corresponding dimensions of a standard compact tape cassette to be used therein.

In accordance with an aspect of this invention, a cassette tape recording and/or reproducing apparatus is provided with a substantially rectangular chassis having first and second surfaces at its opposite sides, cassette holding means for operatively positioning a tape cassette against the first surface of the chassis, tape transport means including reel shafts extending through the chassis from the side of said second surface thereof for engaging respective reels in a tape cassette operatively positioned against the first surface of the chassis, gear transmission means for selectively driving the shafts in accordance with a plurality of operating modes of the apparatus, such gear transmission means consisting of a plurality of gears at the side of the chassis corresponding to the second surface of the latter for rotation about respective axis all of which are normal to the chassis with at least one of the gears being displaceable in the direction of the respective axis for changing from one to another of the operating modes, at least one push-button, each push-button being disposed at the side of the chassis corresponding to the second surface thereof and being manually actuable between extended and depressed positions in a direction normal to the chassis, and means responsive to the actuation of each such push-button from its extended position to the depressed position for displacing a respective axially movable gear in the direction of the respective axis and thereby changing the mode of the apparatus.

In a preferred embodiment of the invention, there are a plurality of the push-buttons selectively actuable for establishing respective operating modes of the apparatus and the chassis has a perimeter substantially coextensive with a cassette to be operatively positioned against the chassis, and all elements of the tape transport means and all of the push-buttons are wholly contained within such perimeter of the chassis at the side of the latter remote from that at which the cassette is operatively positioned.

The above, and other objects, features and advantages of the invention, will be apparent in the following detailed description of an illustrative embodiment which is to be read in connection with the accompanying drawings.

BRIEF DESCRIPTION OF THE DRAWINGS

FIGS. 9A and 9B are enlarged cross-sectional views taken along the line 9—9 of FIG. 7, and showing the cover in its opened and closed positions for insertion of a cassette;

FIG. 24 is an enlarged sectional development taken along the line 24—24 of FIG. 23;

FIGS. 25A and 25B are front elevational views of the tape drive unit of FIG. 24, and illustrating in broken lines the positions to which gears of the drive unit are shifted for the rewind mode and the fast-forward mode, respectively, from the positions shown in full lines which correspond to the stopped and reproducing modes;

FIG. 32A to FIG. 32D are bottom views of the mode selecting unit of FIG. 29 shown in various phases of its operation;

FIGS. 33A and 33B are enlarged cross-sectional views showing actuation of a FWD lever of the mode selecting unit of FIG. 29 upon manipulation of a reproducing button;

FIGS. 54A and 54B are side views to which reference will be made in explaining operation of the switch mounting plate of the power switch unit;

DESCRIPTION OF A PREFERRED EMBODIMENT

An embodiment of the present invention will now be described in detail with reference to the accompanying drawings which show the invention applied to a cassette tape player 70 for the stereo reproduction only of audio signals recorded on a magnetic tape in a conventional compact cassette 71 (hereinafter referred to simply as a "cassette").

Figure 1:
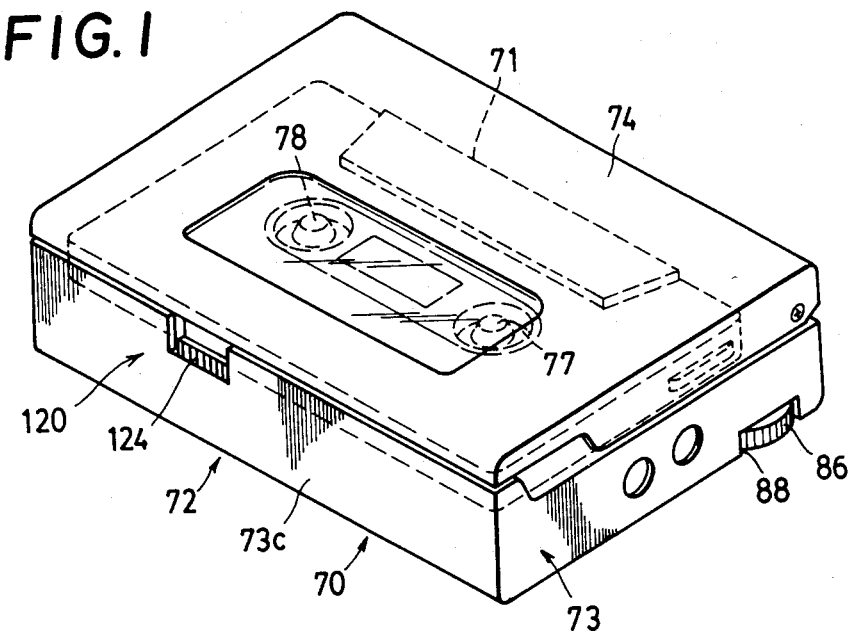
FIG. 1 is a perspective view of a cassette tape player according to an embodiment of this invention, and which is shown with its cover closed.
Figure 2:
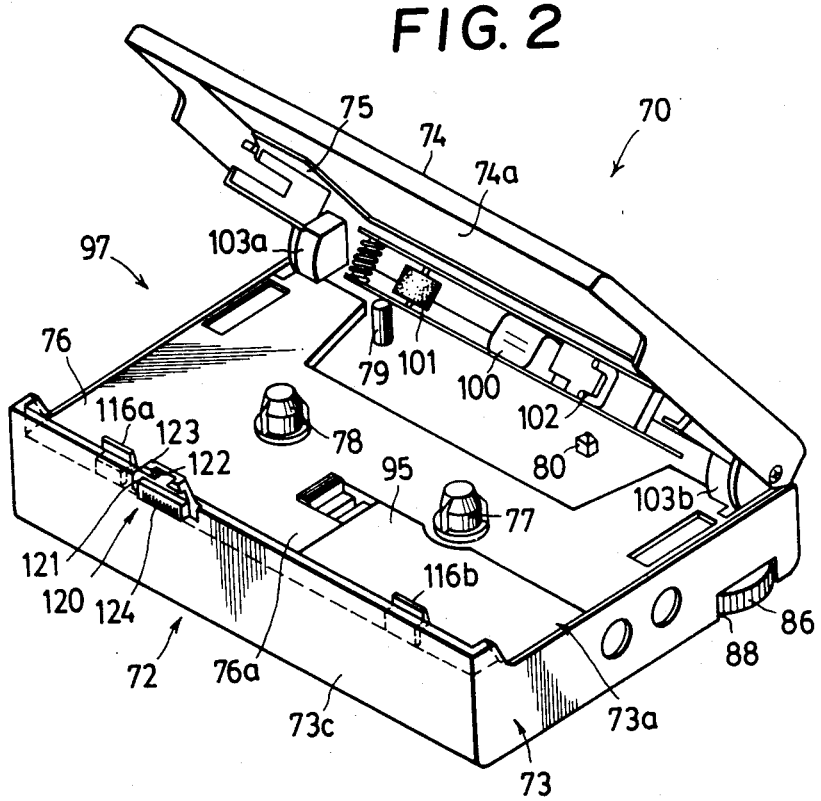
FIG. 2 is a perspective view of the cassette tape player, but shown with its cover opened.

As shown in FIGS. 1 and 2, the player 70 includes a body 72 comprised of a cabinet 73 and cover 74 constructed very compactly so that the outside dimensions thereof are only slightly (several millimeters) larger than the outside dimensions of the cassette 71. The top 73a of cabinet 73 is open over approximately its entire surface to accommodate the cassette 71 horizontally therein. The cassette cover 74 is constructed to close the top 73a of cabinet 73 above the cassette 71. A cassette holder 75 (FIGS. 1 and 4) is disposed inside cassette cover 74 to receive the cassette 71 and to dispose the latter in the cabinet top 73a upon closing of cassette cover 74. A molded plastic chassis 76 is installed in cabinet 73, and an upper plate 76a of the chassis 76 extends across the cabinet top 73a. Projecting from the upper surface of plate 76a there are a supply reel shaft 77, a take-up reel shaft 78, a capstan 79 and a cassette positioning guide 80 (FIG. 1).

Figure 3:
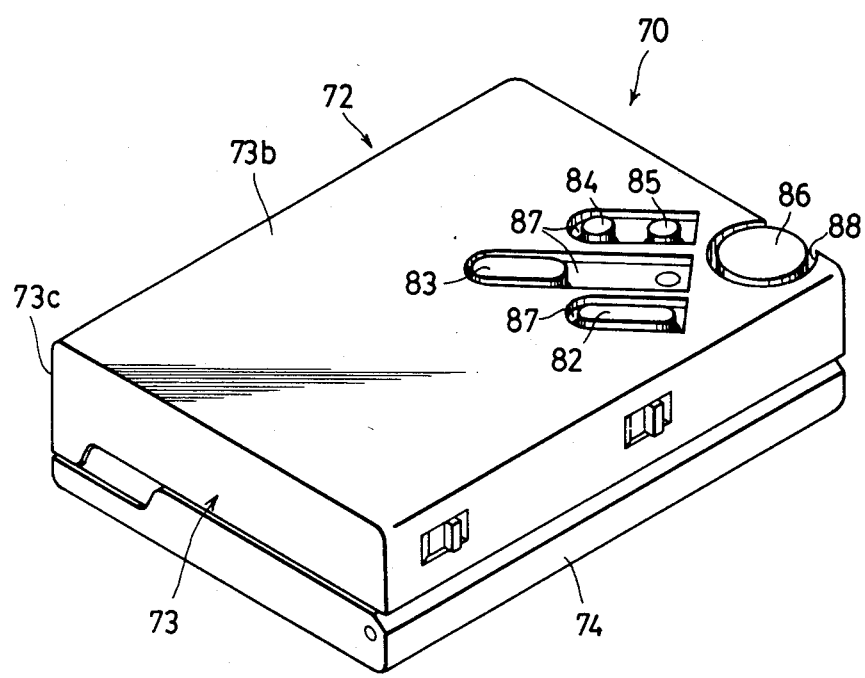
FIG. 3 is a perspective view of the cassette tape player as viewed from the bottom.

As shown in FIG. 3, at the other or underside 73b of cabinet 73 there are disposed four push buttons, namely, a stop button 82, a reproducing (FWD) button 83, a fast forward (FF) button 84 and a rewind button 85, and a volume control knob 86. The push buttons 82–85 and the knob 86 are disposed within respective recesses 87 and 88.

Figure 4:
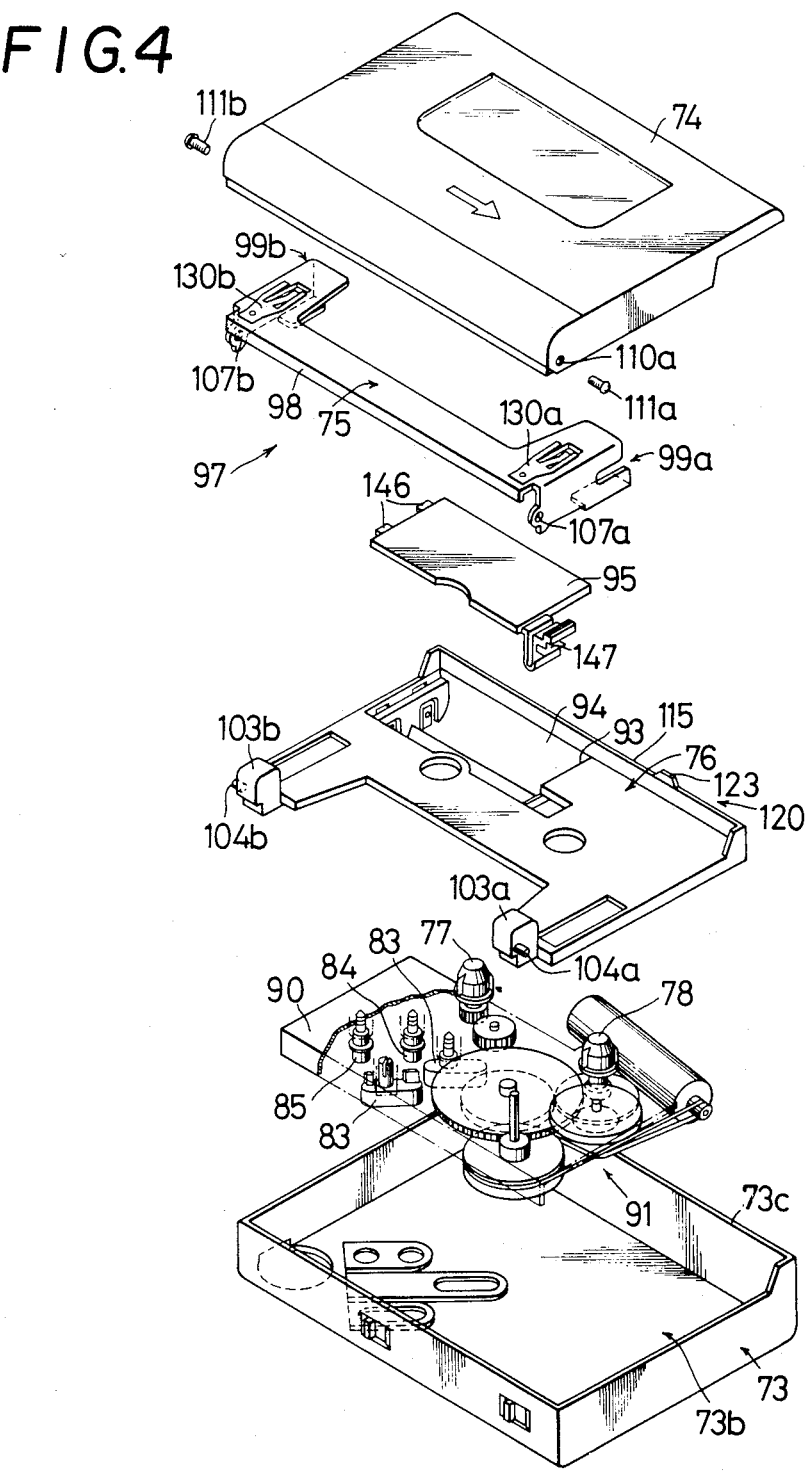
FIG. 4 is an exploded perspective view of the major components of the cassette tape player, with the mounting board being shown partly broken away.

Referring now to FIG. 4, it will be seen that a mechanical mounting board 90 formed of a metallic plate is fixed to the lower surface of plate 76a of the chassis 76, and, at the underside of board 90, there is mounted a tape driving unit 91.

The upper plate 76a of chassis 76 is formed with a battery insertion opening 93 at one side adjacent the front 73c of cabinet 73, and below the battery insertion opening 93 there is defined a battery container portion 94 integral with chassis 76. A removable battery cover 95 is provided for the battery insertion opening 93.

Figure 5:
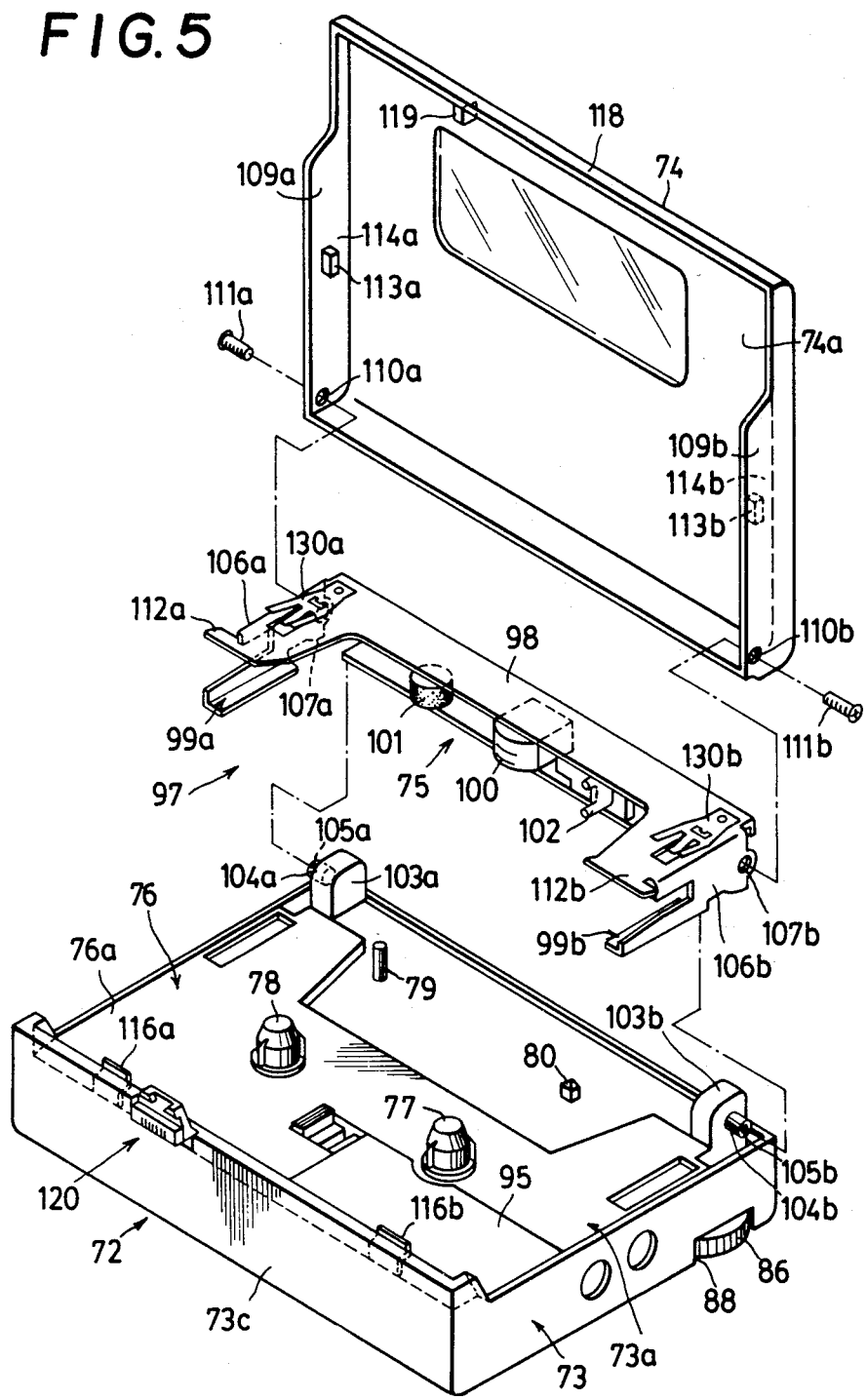
FIG. 5 is a more detailed exploded perspective view of the tape player body, cassette holder and cover included in the cassette tape player.

Referring to FIG. 5, the cabinet 73 and the cassette cover 74 are preferably molded, for example from a suitably synthetic resin or a plastic material, and the cassette holder 75 is formed of sheet metal. The cassette holder 75 includes a holder body 98 in the form of an elongated plate extending across cabinet 73 adjacent the rear side of the latter and, at the opposite end portions of holder body 98, there are forwardly directed integrally cassette holding portions 99a and 99b of C-shaped cross-sections opening toward each other below the plane of holder body 98. Under holder body 98 there are mounted a stereo reproducing head 100, a pinch roller 101 and a tape guide 102.

Figure 9A:
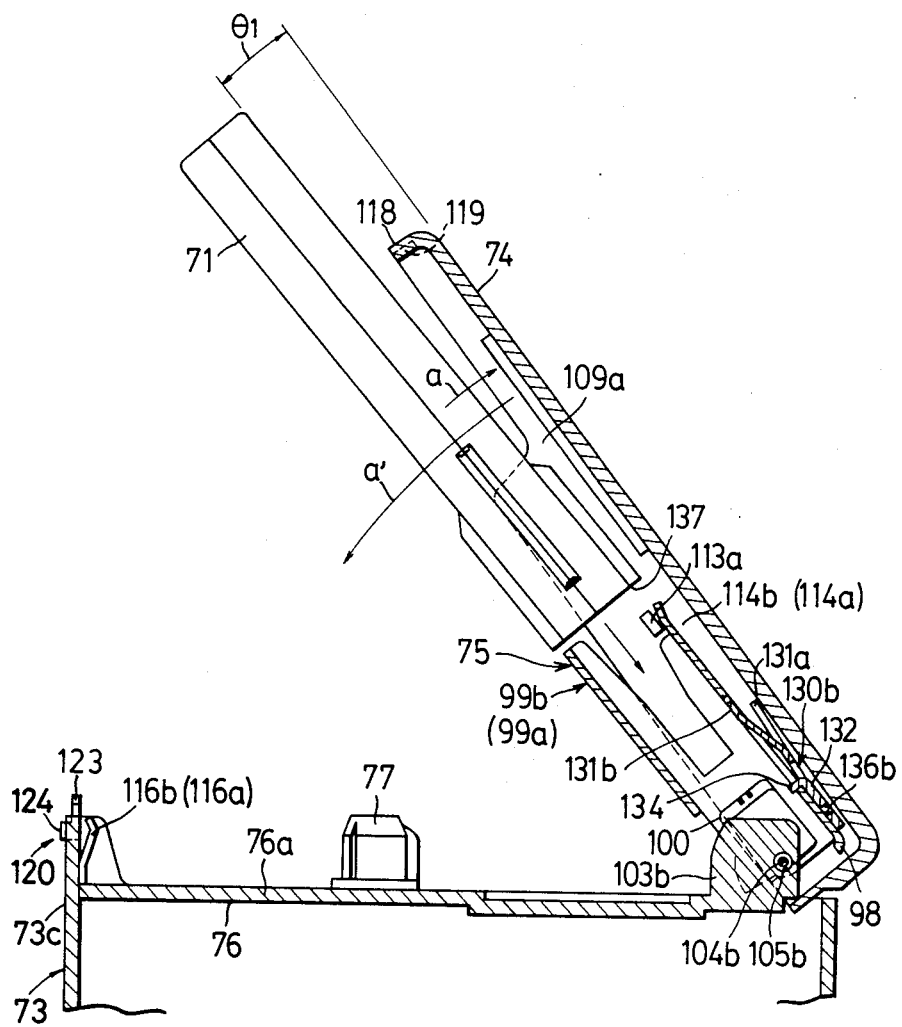

On the upper plate 76a of chassis 76 there are integrally formed a pair of supporting blocks 103a, 103b at the right and left rear end portions, and a pair of aligned right and left pivots 104a and 104b are press-fitted into supporting blocks 103a and 103b. The pivots 104a and 104b are in the form of sleeves which have threaded bores 105a and 105b. The cassette holder 75 has through holes 107a and 107b formed in side plate portions 106a and 106b of cassette holding portions 99a and 99b, respectively, and receiving pivots 104a and 104b, respectively, whereby cassette holder 75 is pivotably supported. Furthermore, right and left side walls 109a and 109b are formed integrally on cassette cover 74, and have holes 110a and 110b, respectively, and screws 111a and 111b are inserted through holes 110a and 110b into threaded bores 105a and 105b, respectively, whereby cassette cover 74 is pivotally supported. Thus, cassette cover 74 and cassette holder 75 are mounted for pivoting about the same axis. Projections 112a and 112b extend laterally outward from the cassette holding portions 99a and 99b of cassette holder 75, and a pair of lugs 113a and 113b are integrally formed on the insides of side walls 109a and 109b, respectively, of cassette cover 74 so as to leave gaps 114a and 114b between lugs 113a and 113b and an inner surface 74a of cassette cover 74. The projections 112a and 112b are disposed in gaps 114a and 114b, respectively, while leaving a margin for relative movement within those gaps. Consequently, the cassette cover 74 is engaged with the cassette holder 75 so that it can move pivotally within a predetermined angular range $\theta_1$ (see FIG. 9A) relative to the cassette holder 75. In one supporting block 103a there is a click or detent mechanism (not shown), for example, a ball urged by a coiled spring, to engage in one or the other of two spaced apart apertures of the adjacent side plate portion 106a of cassette holding portion 99a, whereby cassette holder 75 is selectively maintained in the cassette inserting position (FIG. 9A) or in the cassette loading position (FIG. 9B). At the inside of a front wall 115 of chassis 76 there are mounted a pair of laterally spaced cassette pressers 116a and 116b which are constituted by leaf springs.

Figure 6:
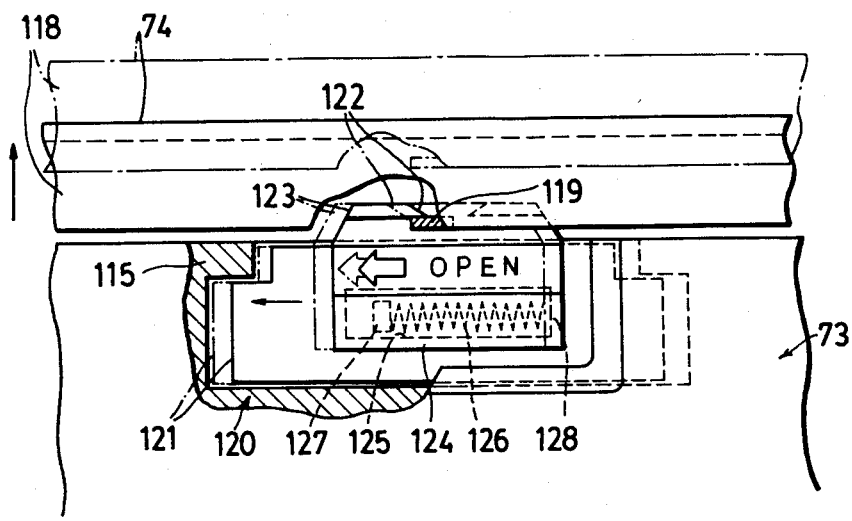
FIG. 6 is an enlarged front elevational view which is partly broken away to show a lock mechanism for the cover.

As shown on FIG. 5, a generally L-shaped keeper 119 is integrally formed on the inside of a front edge or flange 118 of cassette cover 74. On the other hand, as shown in FIG. 6, at the upper end portion of front wall 115 of cabinet 73 there is mounted a locking or latch mechanism 120 for locking the cassette cover 74 by engagement with keeper 119. The locking mechanism 120 includes a locking plate 121 which is slidable laterally in a suitably shaped recess in front wall 115 of chassis 76 and is retained in such recess by front wall 73c of cabinet 73. At the upper end of locking plate 121 there is integrally formed a locking pawl 123 having a slant face 122 at its upper tip end, while at the lower portion of the plate 121 there is integrally formed a knob portion 124 to be exposed through a cutout in front wall 73c (FIG. 1). Furthermore, a recess 125 is formed in the back of plate 121, and a compression spring 126 is accommodated within recess 125 to abut, at one end, against a lug 127 projecting into recess 125 from wall 115, while the other end of spring 126 abuts against an end of recess 125, as at 128 (FIG. 6). Consequently, locking plate 121 is slidably urged to the right in FIG. 6 by means of compression spring 126.

Referring now to FIGS. 5 and 7 through 9B, it will be seen that a pair of right and left leaf springs 130a and 130b are disposed between cassette cover 74 and cassette holder 75. As best shown on FIG. 8 in respect to spring 130b, the tip end of each of leaf springs 130a and 130b is generally fork-shaped to provide three spring tines or bias portions, with the outer tines or spring-bias portions 131a being inclined upward, while the central tine or spring-bias portion 131b is inclined downward. Furthermore, a central hole 133 is formed in a base portion 132 of each of springs 130a and 130b and between the base portion 132 and the tip end portion there is struck a bent portion or tab 134 which is bent downward at approximately a right angle. Elongated apertures 135a and 135b are formed in the tops of the cassette holding portions 99a and 99b of cassette holder 75. The leaf springs 130a and 130b are positioned with their tabs 134 against ends of elongated apertures 135a and 135b, and with their respective holes 133 receiving dowels 136a and 136b which are embossed on the upper surfaces of cassette holding portions 99a and 99b of holder body 98. The heads of dowels 136a and 136b are caulked or upset so that leaf springs 130a and 130b are secured to cassette holder 75. The central spring-bias portion 131b of each of springs 130a and 130b thus secured to the cassette holder 75 is inserted in the respective one of elongated apertures 135a and 135b. Of course, leaf springs 130a and 130b may be fixed to cassette cover 74 rather than to cassette holder 75. The loading of a cassette 71 into player 70 will now be described with reference to FIGS. 9A and 9B.

As shown on FIG. 9A, the cassette cover 74 is first opened and the cassette holder 75 is positioned at an angle of inclination of approximately 45 degrees in respect to the upper plate 76a of chassis 76. The cassette cover 74 is urged upwardly relative to holder 75 by spring-bias portions 131a of leaf springs 130a and 130b so as to be angularly displaced in the direction of arrow a by an angle $\theta_1$ with respect to the cassette holder 75. The angle $\theta_1$ is determined by abutment of lugs 113a and 113b with projections 112a and 112b, respectively. At this time, the central spring-bias portions 131b of leaf springs 130a and 130b are positioned within elongated apertures 135a and 135b, that is, within the thickness of the sheet metal material of holder body 98, so that they do not project downward into holding portions 99a and 99b.

Figure 7:
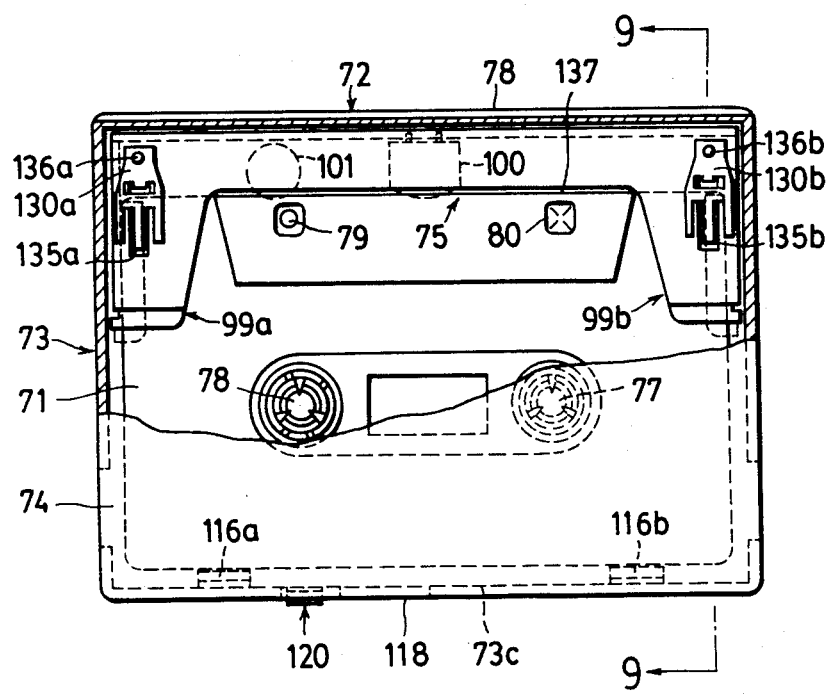
FIG. 7 is a plan view of the cassette tape player with its cover partly broken away to show a cassette positioned therein.
Figure 8:
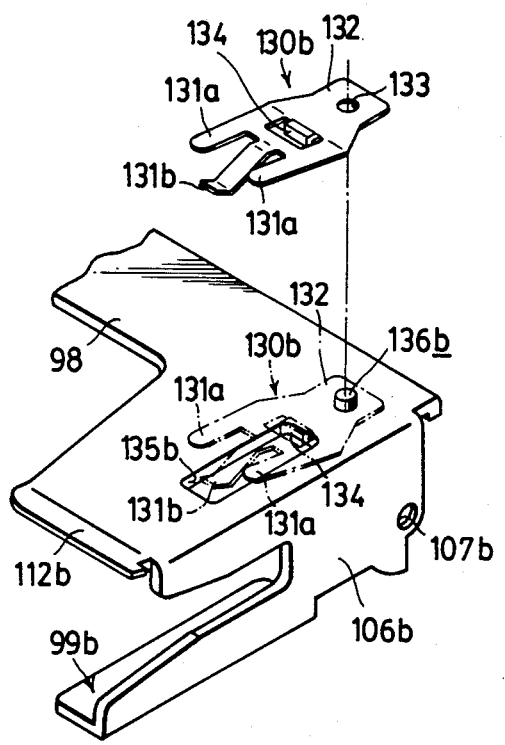
FIG. 8 is a detailed exploded perspective view of a leaf spring mounting structure included on the cassette holder.

With cover 74 in such opened state, a standard cassette 71 is inserted obliquely downward into the cassette holder 75 with its opening side 137 in the lead and with opposite end portions of the cassette 71 being slidably received and held in cassette holding portions 99a and 99b (FIG. 7). During this cassette insertion, since cassette cover 74 is open at the angle $\theta_1$ with respect to cassette holder 75, the presence of the cassette cover 74 does not impede the cassette insertion, which can be performed extremely easily. Moreover, the central spring-bias portions 131b of leaf springs 130a and 130b do not project downward from holder body 98, and therefore the cassette 71 being inserted will never be hooked on these spring-bias portions 131b.

After the aforesaid cassette insertion, cassette cover 74 is pivotally moved in the direction of arrow a' on FIG. 9A to effect loading of cassette 71. In this case, spring-bias portions 131a of each of leaf springs 130a and 130b are pressed by the inner surface 74a of cassette cover 74 to urge cassette holder 75 to move pivotally with cover 74 in the direction of arrow a' and, at the same time, the central spring-bias portions 131b of leaf springs 130a and 130b are projected downward through apertures 135a and 135b of holder body 98, respectively, and bear against the upper surface of cassette 71.

When cassette cover 74 has been closed completely, as indicated with a solid line in FIG. 9B, the cassette 71 is fitted over reel shafts 77,78, capstan 79 and cassette positioning guide 80 and is loaded horizontally on the upper plate 76a of chassis 76. At the same time, cassette presser springs 116a and 116b press against cassette 71 to press the latter rearwardly into cassette holder 75, so that the cassette is thereby securely positioned in the forward-rearward direction. Further, upon completion of the cover closing, keeper 119 of cassette cover 74 is locked by the locking mechanism 120. More particularly, just before full closure of the cassette cover 74 the slant face 122 of locking pawl 123 is acted upon by keeper 119 so that locking plate 121 is moved to the left in FIG. 6 against the bias of spring 126 and then returned to the right by such spring to engage locking pawl 123 with keeper 119 and thereby lock cassette cover 74 in its closed-up position. Upon locking of cassette cover 74, the cassette holder 75 is urged against the upper plate 76a of chassis 76 by repulsive forces of spring-bias portions 131a of leaf springs 130a and 130b, while the central spring-bias portions 131b of leaf springs 130a and 130b urge cassette 71 against upper plate 76a of chassis 76.

After completion of the cassette loading operation, the reproducing button 83 may be depressed for inserting the reproducing head 100 into the cassette 71 and into contact with the tape therein, and at the same time bringing the pinch roller 101 into pressure contact with the capstan 79 through the tape, and thereby establishing the stereo reproducing mode of the player 70 as hereinafter described in detail.

For unloading the cassette 71 from player 70, the knob portion 124 of locking plate 121 is lightly pushed to the left in FIG. 6 against the bias of the compression spring 126 whereby locking pawl 123 is disengaged from keeper 119 and cassette cover 74 is freed to bob up to the position indicated with phantom lines in FIG. 9B by virtue of the repulsive force of spring-bias portions 131a of leaf springs 130a and 130b, thus indicating to the user that cassette cover 74 is ready to be opened. After this bobbing-up movement of cover 74, a finger tip can be easily hooked under the front edge or flange 118 of cassette cover 74, and the cassette cover 74 can then be easily pivoted to its open position shown in FIG. 9A. As cassette cover 74 is being fully opened, projections 112a and 112b are engaged by lugs 113a and 113b whereby cassette holder 75 is pulled up to the cassette inserting position shown in FIG. 9A where it is again positioned by the mentioned detent mechanism. Thereafter, the cassette 71 is withdrawn obliquely upward from within cassette holder 75 and this withdrawal can be effected extremely easily and smoothly as in the case of cassette insertion.

Figure 10:
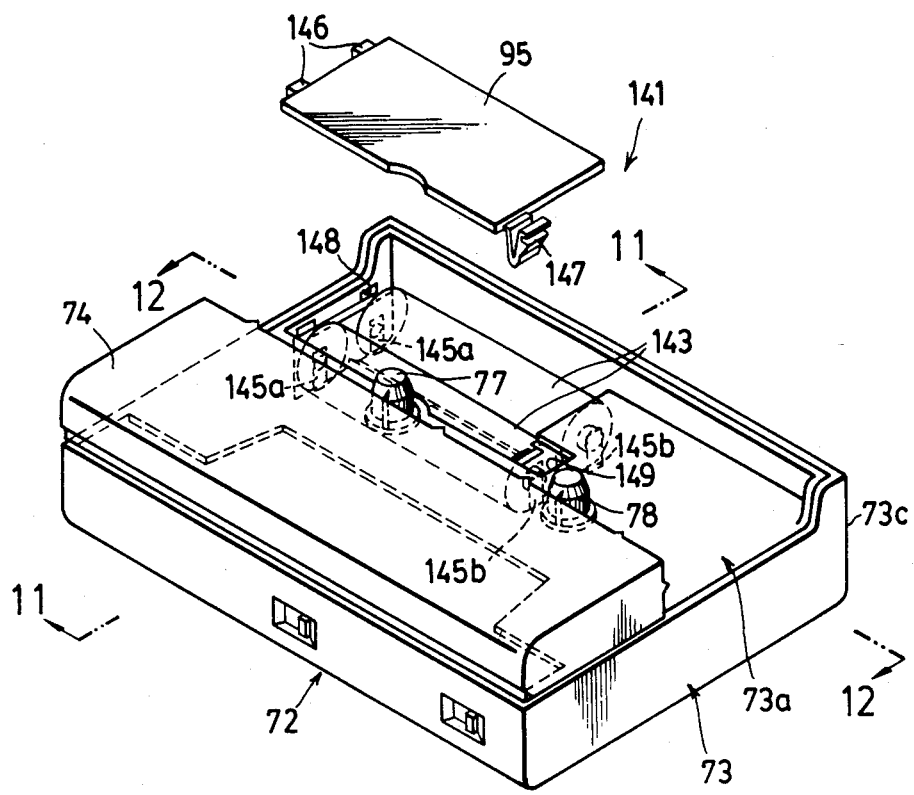
FIG. 10 is a perspective view of the cassette tape player which is partly broken away for showing a battery container.
Figure 11:
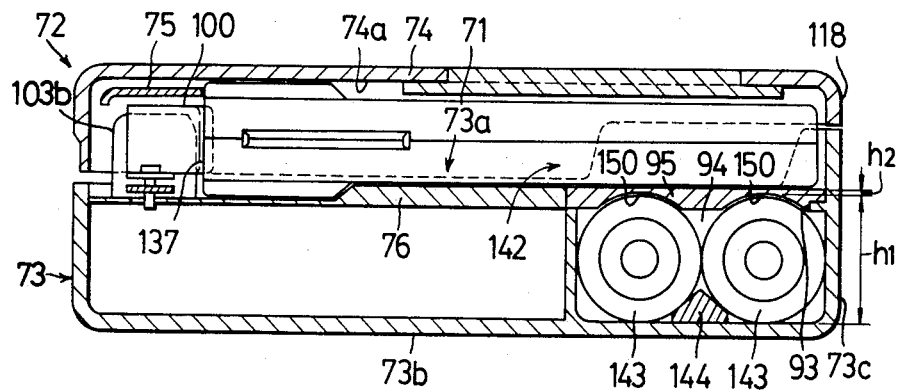
FIG. 11 an enlarged cross-sectional view taken along the line 11—11 of FIG. 10.
Figure 12:
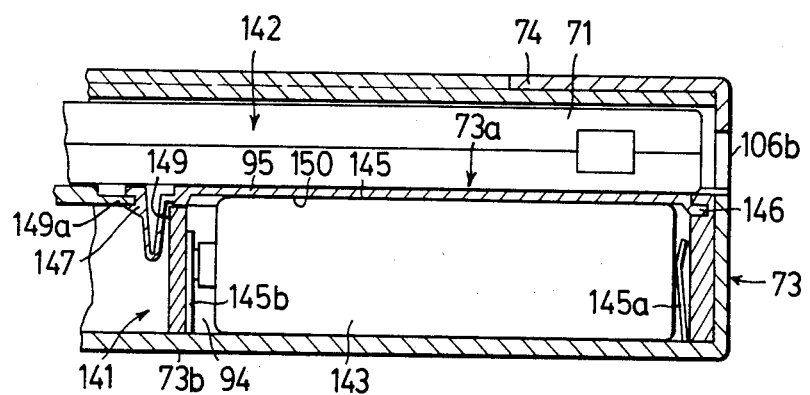
FIG. 12 is a fragmentary sectional view taken along the line 12—12 of FIG. 10.

Referring now to FIGS. 10–12, it will be seen that a battery container unit 141 is constituted by the earlier mentioned battery insertion opening 98, battery container portion 94 of cabinet 73 and battery cover 95, and is formed below and adjacent to a cassette container portion 142 of cabinet 73 for the cassette 71 which is loaded on the upper plate 76a of the chassis 76. Within the battery container portion 94 there are accommodated two batteries 143, for example, two UM-3 batteries, which are disposed horizontally and in parallel with each other. The batteries 143 inserted within the battery container portion 94 are disposed along and at opposite sides of a battery pad 144 formed integrally with chassis 76 at the bottom of battery container portion 94. Moreover, the batteries 143 inserted within battery container portion 94 have their respective poles brought into pressure contact with terminal fittings 145a and 145b mounted at the opposite end portions of the interior of battery container portion 94, and are thereby connected to a power supply circuit. The battery cover 95 is molded from a suitable synthetic resin or plastic material and is provided at one end with a pair of retaining lugs 146, while the other end of cover 95 has, for example, a generally U-shaped elastic latch 147, also integrally formed therewith.

After insertion of batteries 143 into battery container portion 94, battery cover 95 is secured removably in the battery insertion opening 93 to close the latter. In this case, one end of battery cover 95 is engaged through the retaining lugs 146 with a pair of retaining holes 148 formed in chassis 76 (FIG. 10), while, at the other end of cover 95, latch 147 is inserted, by utilization of its elasticity, into a retaining hole 149 formed in the upper plate 76a of chassis 76 and is engaged with one end 149a of the retaining hole 149 (FIG. 12). As a result, the battery cover 95 is mounted flush with upper plate 76a.

In order to minimize the height $h_1$ of battery container portion 94, thereby minimizing the total thickness of the cassette tape player 70, curved concaves 150 matching the outside diameter of batteries 143 are formed in the inner surface of battery cover 95 whereby the effective thickness $h_2$ of cover 95 contributing to the thickness $h_1$ is made very small.

In the battery container unit 141, moreover, the battery cover 95 is not exposed at any outer surface of the cabinet 73. Consequently, even if battery cover 95 is made thin to a large extent, no problem arises as to its strength. Additionally, since the battery cover 95 is not exposed at any outer surface of cabinet 73, great freedom is afforded as to the ornamental design of the player.

Figure 18:
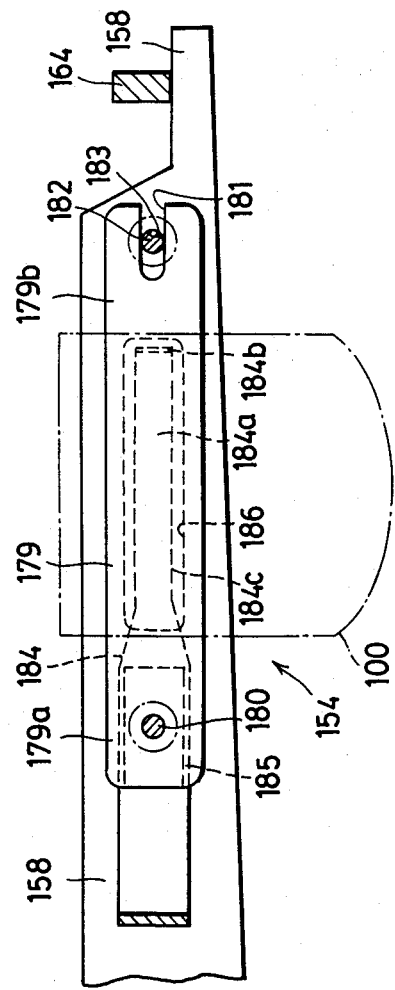
FIG. 18 is a sectional view taken along the line 18—18 of FIG. 17.
Figure 19:
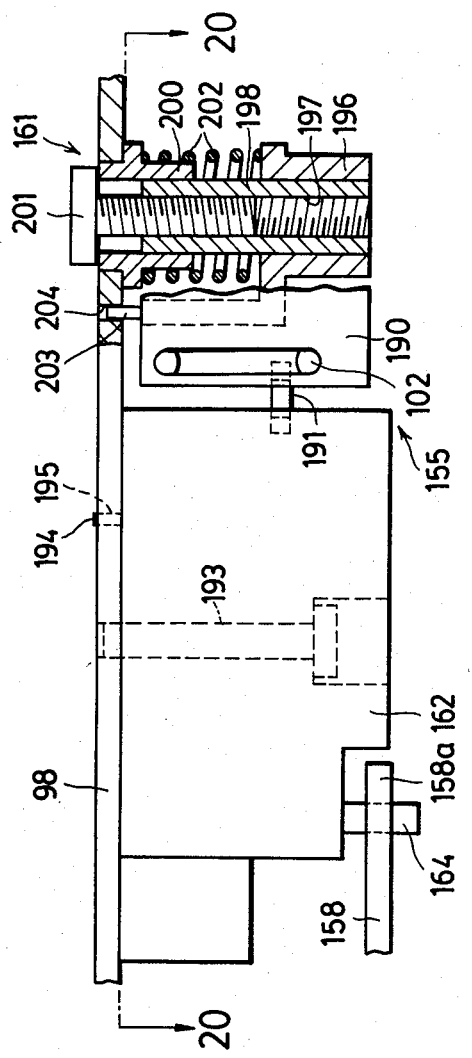
FIG. 19 is an enlarged front elevational view of the tape guide.
Figure 20:
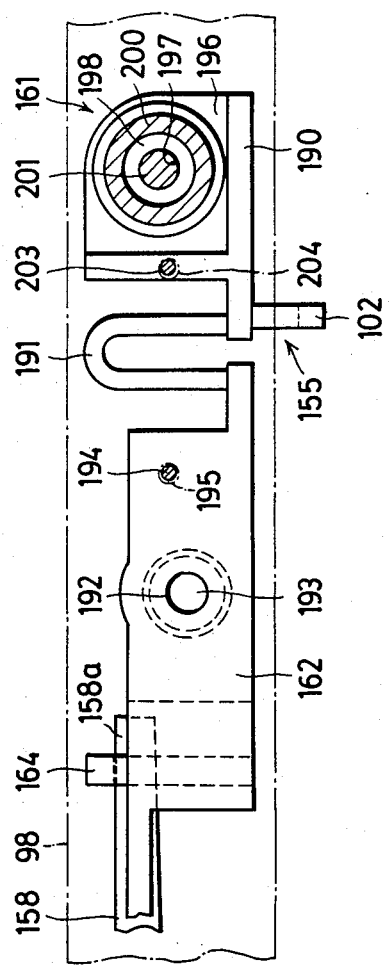
FIG. 20 is a sectional view taken along the line 20—20 of FIG. 19.
Figure 21:
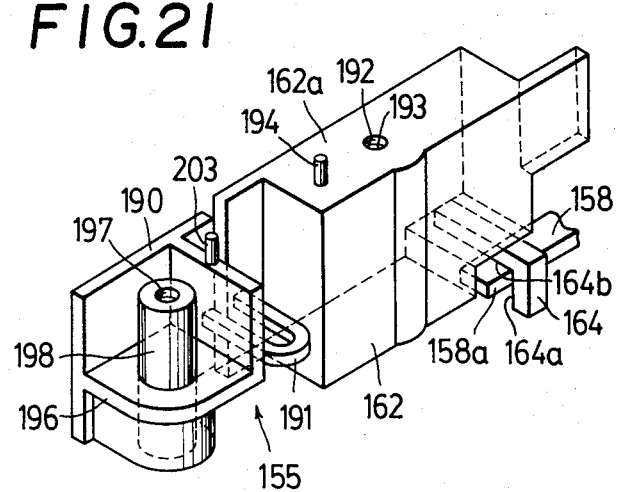
FIG. 21 is a perspective view of the tape guide as viewed from the side opposite to that appearing on FIG. 13.

Mounted within cassette holder 75 are a head mounting unit 153 (FIGS. 13 ∝ 15), a head azimuth adjusting unit 154 (FIGS. 17 and 18) and a tape guide unit 155 (FIGS. 19-21).

Figure 13:
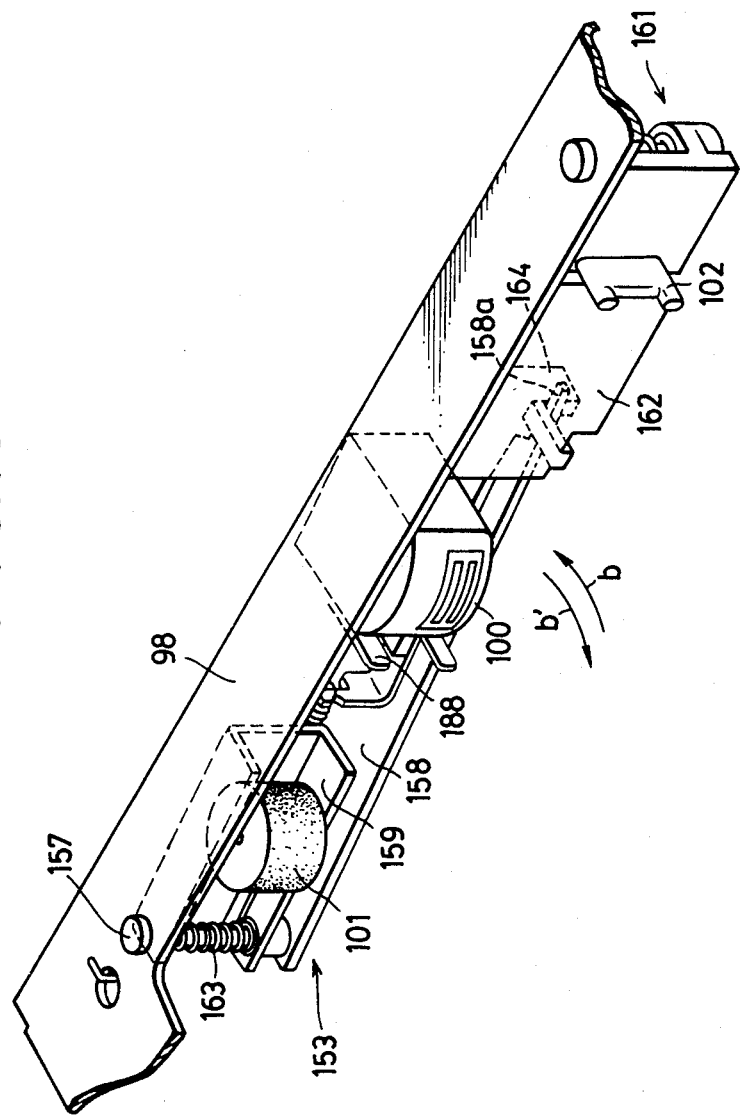
FIG. 13 is an enlarged perspective view of the cassette holder for showing the mounting thereon of a head, a pinch roller and a tape guide.
Figure 14:
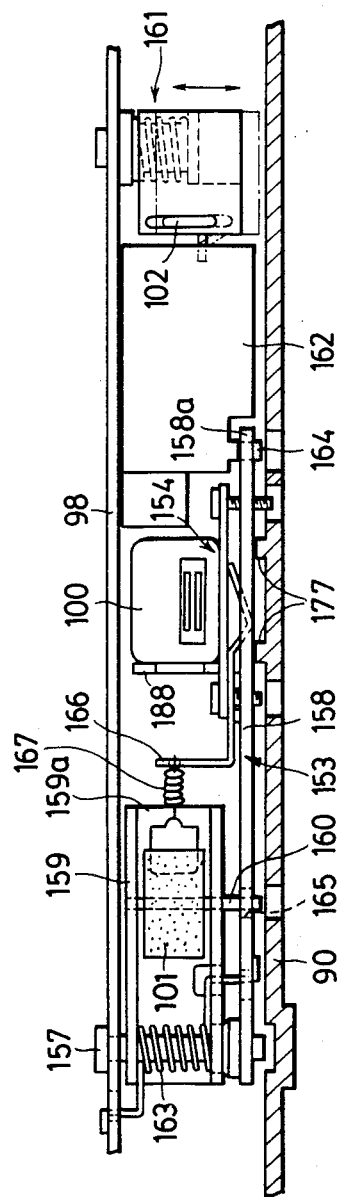
FIG. 14 is a front elevational view of the structure shown on FIG. 13.

As shown on FIGS. 13 and 14, a depending shaft 157 is fixed to one end portion of the holder body 98 of cassette holder 75, and on the lower end of shaft 157 there is pivotably mounted one end of a head base 158. The reproducing head 100 is mounted, by means of azimuth adjusting unit 154, on head base 158 adjacent the free end portion 158a of the head base 158. Furthermore, between holder body 98 and head base 158 and between shaft 157 and reproducing head 100 there is disposed a pinch roller support lever 159 having a generally C-shaped cross-section and being pivotably mounted, at one end, on shaft 157. The free end 159a of pinch roller support lever 159 carries a supporting shaft 160 on which pinch roller 101 is rotatably mounted. At the end portion of holder body 98 remote from pinch roller 101 there is mounted the tape guide 102 by means of a height adjusting unit 161. Thus, the pinch roller 101 is disposed downstream and the tape guide 102 is disposed upstream in respect to the tape running direction relative to the reproducing head 100 interposed therebetween. At the underside of holder body 98 between reproducing head 100 and tape guide 102 there is mounted a blinder plate 162. The head base 158 is pivotally urged in the direction of arrow b on FIG. 13 by means of a torsion spring 163 which extends around shaft 157 and has its ends anchored to holder body 98 and to head base 158, respectively. The tip or free end 158a of head base 158 is engageable with a stop 164 formed integrally with the lower end of blinder plate 162 whereby the pivotal movement of head base 158 in the direction of arrow b is restricted. The lower end of pinch roller supporting shaft 160 extends below lever 159 and is inserted loosely in a hole 165 in head base 158. Therefore, the range of movement of supporting shaft 160 in hole 164 defines the permissible pivoting of pinch roller lever 159 relative to head base 158. Between the tip or free end 159a of pinch roller lever 159 and a spring anchor 166 on azimuth adjusting unit 154 there is a tension spring 167 for urging pinch roller lever 159 in the direction of arrow b' on FIG. 13 with respect to head base 158.

Figure 15:
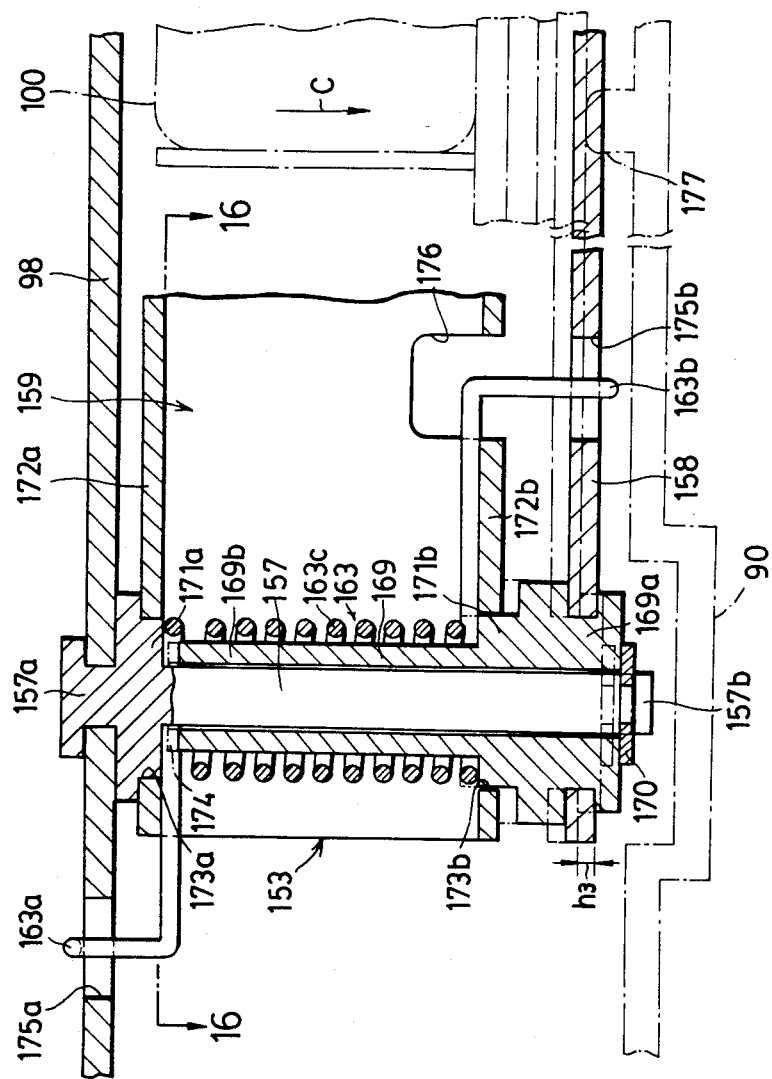
FIG. 15 is an enlarged cross-sectional view of the supporting structure for a head mounting unit.
Figure 16:
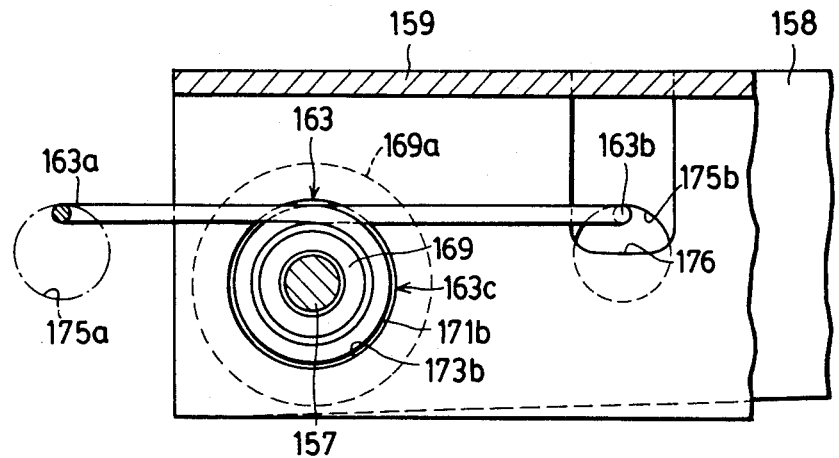
FIG. 16 is a detail sectional view taken along the line 16—16 of FIG. 15.

The head mounting unit 153 is comprised of shaft 157, head base 158 and torsion spring 163. In such unit, an upper end 157a of shaft 157 is fixed to holder body 98, for example, by upsetting or caulking. The pivoted end of head base 158 has affixed thereto a lower end 169a of a sleeve 169 which is fitted, from below, over shaft 157 and is pivotably supported thereby. Sleeve 169 is prevented from being removed downwardly from shaft 157 by an E-ring 170 fitted around a lower end 157b of shaft 157. Cylindrical upper and lower pinch roller lever bearing portions 171a and 171b are formed integrally with shaft 157 and sleeve 169, respectively. Upper and lower through holes 173a and 173b are formed in the pivoted end portions of upper and lower sides 172a and 172b of the pinch roller lever 159, respectively, and such holes 173a and 173b pivotally receive the pinch roller lever bearing portions 171a and 171b, respectively. Between an upper end 169b of sleeve 169 and the upper pinch roller bearing portion 171a there is formed a gap 174 (FIG. 15), and sleeve 169 is movable up and down on the outer periphery of the shaft 157 within the range of gap 174. Due to this vertical movement of sleeve 160, head base 158 is movable therewith within the range of the height h₃ shown in FIG. 15.

The torsion spring 163 includes a coil portion 163c wound about sleeve 169 and upper and lower end portions 163a and 163b anchored in retaining holes 175a and 175b formed in holder body 98 and head base 158, respectively. In a portion of the pinch roller supporting lever 159 there is an escape notch 176 for the extension therethrough of the lower end portion 163b of torsion spring 163. The coil portion 163c of the torsion spring 163 is, when installed, stressed torsionally and axially compressed. By virtue of the torsional stressing of coil portion 163c, the head base 158 is urged in the direction of arrow c in FIG. 15. Further, as shown in FIG. 14, on the upper surface of mounting board 90 there are formed a plurality of projections 177 to be disposed under head base 158.

With head mounting unit 153 constructed as above, when cassette 71 has been loaded horizontally on upper plate 76a of chassis 76 by a pivotal downward movement of cassette holder 75 after the cassette has been inserted therein, as shown in FIG. 14, head base 158 is elastically brought into pressure contact with projections 177 on mounting board 90 by the compressive force of coil portion 163c of torsion spring 163, whereby the height of head base 158 is exactly determined as is the height of reproducing head 100 with respect to the tape in cassette 71.

It is unavoidable that there will be some looseness in the structure by which head base 158 is pivotably mounted on shaft 157. Such looseness, however small it may be, would normally cause a deviation in the height of the reproducing head 100 which, particularly when head 100 is for reproducing stereo, would lead to a tracking error.

However, with the described head mounting unit 153, such tracking error does not occur at all because the height of head base 158 can be exactly predetermined regardless of the looseness in the pivoting of head base 158 on shaft 157. When reproducing button 83 is depressed with a cassette loaded in player 70 as described above, head base 158 is pivotally mounted in the direction of arrow b' on FIG. 13 against the torsional resistance of spring 163 while sliding over the height restricting projections 177.

Figure 17:
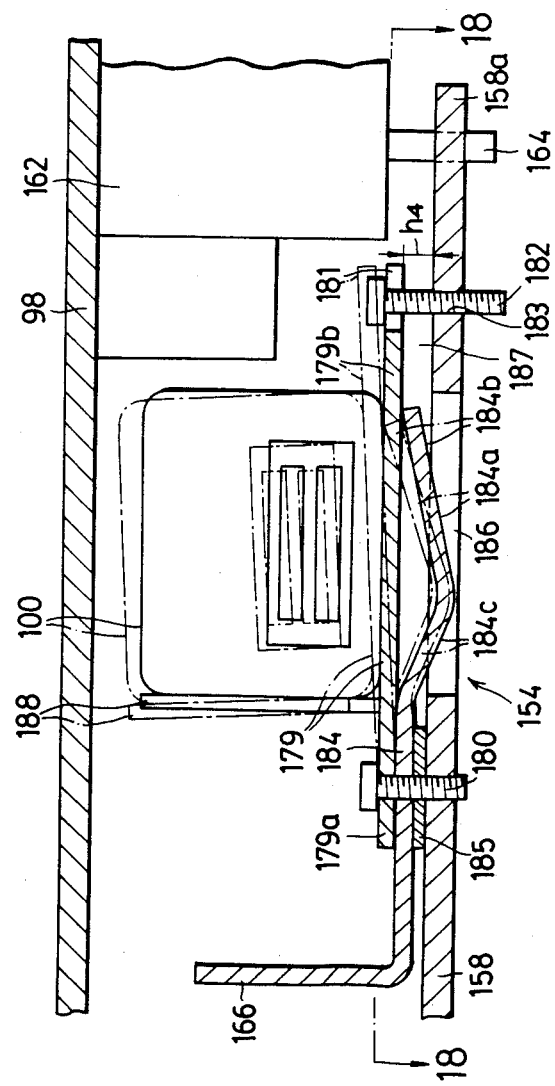
FIG. 17 is an enlarged sectional view for illustrating azimuth adjusting of the head.

The azimuth adjusting unit 154 will now be explained with reference to FIGS. 17 and 18 in which reproducing head 100 is shown to be fixed, as by spot welding or the like, at an approximately centered location along an elongated head mounting plate 179. The head mounting plate 179 is secured, at one end 179a, to head base 158 by means of a screw 180, and the other end 179b of head mounting plate 179 has a longitudinal slot 181 formed therein. An azimuth adJusting screw 182 is extended, from above, through slot 181 and is screwed into a threaded hole 183 formed in head base 158. A leaf spring 184 and a spacer 185 are interposed between end portion 179a of head mounting plate 179 and head base 158 and are secured in position by screw 180. Leaf spring 184 includes a spring-bias portion 184a bent so as to have a generally V-shaped configuration and engaging elastically, at its free end 184b, against the lower surface of head mounting plate 179. The apex portion 184c of spring-bias portion 184a is shown (FIG. 17) to be received in an elongated aperture 186 formed in head base 158. The end portion of leaf spring 184 remote from spring-bias portion 184a is bent upward to form the spring anchor 166 to which spring 167 is attached.

With the azimuth adjusting unit 154 as described above, screw 182 may be turned in one direction or the other to adjust the vertical position of its head bearing on the free end portion 179b of head mounting plate 179. By reason of the biasing force of spring-bias portion 184a leaf spring 184 on head mounting plate 179, the latter is made to flex in the vertical direction with its secured end 179a as the fulcrum, whereby the angle or azimuth of reproducing head 100 is adjusted, as indicated by the broken lines on FIG. 17.

It will be appreciated that, if elongated aperture 186 was omitted from head base 158, leaf spring 184 would be movable only within the gap 187 between head base 158 and head mounting plate 179. If the height $h_4$ of such gap 187 is made small, leaf spring 184 may undergo a stress above its elastic limit and lose its resiliency when head mounting plate 179 is curved downwardly in response to corresponding adjustment of screw 182. On the other hand, if the height $h_4$ of gap 187 is increased to avoid such stressing of spring 184 beyond its elastic limit, the overall thickness of the cassette tape player is undesirably increased to a corresponding extent. As distinguished from the foregoing, due to the presence of elongated aperture 186 in head base 158, the spring-bias portion 184a of leaf spring 184 is movable vertically within such aperture 186 so that the vertical movements of portion 184a are not at all restricted by head base 158. Consequently, the height $h_4$ of gap 187 can be made very small for correspondingly reducing the thickness of the cassette tape player without the danger that spring-bias portion 184a will be stressed beyond its elastic limit. The engagement of spring-bias portion 184a of leaf spring 184 in elongated aperture 186 further serves to position leaf spring 184 in the lateral direction in cooperation with the single screw 180.

The height of the reproducing head 100 can be predetermined, for example, by replacing spacer 185 with similar elements of different thicknesses. Further, a tape guide 188 (FIGS. 13, 14 and 17) is desirably affixed to reproducing head 100 at the downstream side of the latter considered in respect to the direction in which the tape runs past head 100 during the reproducing or playback operation.

Referring now to FIGS. 19-21, it will be seen that the tape guide unit 155 generally includes the blinder plate 162 and a guide support 190 from which tape guide 102 extends. Such tape guide 102 is generally C-shaped and is adapted to be inserted into the front opening of the standard cassette 71 so as to engage the tape within the latter for determining the height of the tape relative to reproducing head 100 at a position which is upstream relative to the latter in respect to the tape running direction. The guide support 190 and blinder plate 162 are integrally molded from a synthetic resin or plastic material and are coupled to each other by a generally U-shaped elastic connecting piece 191. Thus, guide support 190 can be universally deflected relative to blinder plate 162. Blinder plate 162 has a hole 192 extending vertically therethrough, and a screw 193 extends through hole 192, from below, and secures blinder plate 162 to the underside of holder body 98. A dowel 194 is formed integrally with blinder plate 162 and projects from its upper face 162a (FIG. 21). Such dowel 194 is engageable in a positioning aperture 195 formed in holder body 98 for determining the orientation of blinder plate 162 relative to holder body 98 when secured to the latter by screw 193. When blinder plate 162 is secured to holder plate 98 in the foregoing manner, such blinder plate 162 fills the gap between reproducing head 100 and tape guide 102 so as to effect the so-called "blind folding".

At the rear of guide support 190 there is integrally formed a hub portion 196 within which there is fixedly disposed a tubular shaft 198 which is internally threaded, as at 197. A guide sleeve or bushing 200 is fixed to holder body 98 and depends therefrom, and tubular shaft 198 is slidably inserted into guide bushing 200 from below. A height adjusting screw 201 is inserted from above through guide bushing 200 and is screwed into hollow shaft 198. A helical compression spring 202 extends around hollow shaft 198 between guide bushing 200 and hub 196 for urging the latter downwardly relative to holder body 98. A guide protrusion 203 extends integrally from an upper end face 190a of guide support 190 and is slidably received in a guide hole 204 in holder body 98.

Internally threaded tubular shaft 198, guide bushing 200, screw 201 and compression spring 202 combine to form a height adjusting unit 161 by which the height of tape guide 102 and of its guide support 190 is adjusted by suitably rotating screw 201 in one direction or the other. During such adjustment of the height of tape guide 102, the elastic connection piece 191 is flexed to avoid any resistance to adjustment from the fixed blinder plate 162.

As shown particularly on FIG. 21, the stop portion 164 which is integral with blinder plate 162 is generally L-shaped so that its vertical surface 164a restricts pivotal movement of head base 158 in the direction of arrow b on FIG. 13, while the horizontal surface 164b of stop portion 164 slidably engages the free end portion 158a of head base 158 from above and thereby restricts the rising up of the head base.

The advantages of the above described tape guide unit 155 according to this invention will be appreciated from a consideration of the likely results if, contrary to the invention, the tape guide 102 was attached to the free end of pivoted head base 158. In such case, after the loading of a cassette 71, the depression of reproducing button 83 for initiating a reproducing or playback operation by causing pivoting of head base 158 in the direction of the arrow b' on FIG. 13 to insert reproducing head 100 sufficiently into the cassette 71 to exert a predetermined pressure through the tape against the usual tape backup pad within cassette 71, would also result in a pivoting stroke of tape guide 102 that is too large considering the desire to reduce the overall dimensions of the cassette tape player. On the other hand, if head base 158 is mounted on cassette holder 75 so as to be reciprocable in a rectilinear manner, rather than pivoted, and tape guide 102 is again secured to an end of such head base 158, the inconvenience caused by the excessive pivoting stroke of tape guide 102 is avoided, but the resulting supporting mechanism for head base 158 becomes complicated and is increased in thickness so that the overall thickness of the cassette tape player cannot be minimized.

On the other hand, in the tape guide unit 155 of player 70 embodying this invention, head base 158 is pivotally attached to cassette holder 75 for simplifying the mounting structure, while tape guide 102 is separated from head base 158 and adjustably fixed to cassette holder 75 so that, when a cassette 71 is inserted into cassette holder 75, as previously described, tape guide 102 is inserted into such cassette 71 and contacted with the tape therein. Therefore, the mentioned inconveniences of previously proposed arrangements for mounting the tape guide 102 at the downstream side of head 100 are avoided in the tape guide unit 155.

Further, the elastic connection piece 191 between blinder plate 162 and guide support 190 greatly facilitates the handling of these small parts during assembly of player 70. More particularly, at the time of assembly, for example, if guide support 190 is initially attached to holder body 98, the elastic connection piece 191 generally supports blinder plate 162 adjacent its desired mounting position so that the insertion of screw 193 can be easily performed.

Figure 23:
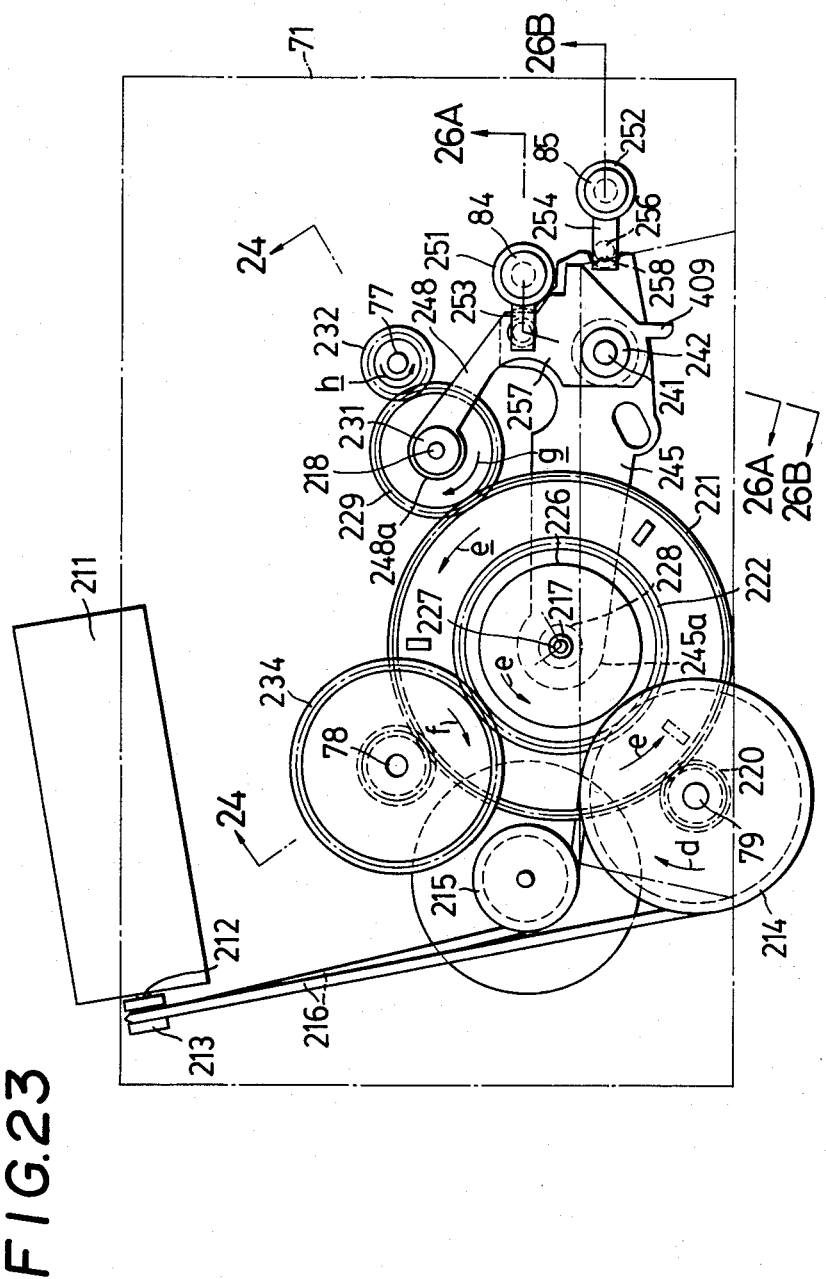
FIG. 23 is a bottom view of the tape drive unit.

Referring now to FIGS. 23 and 24, it will be seen that tape driving unit 91 is mounted at the underside of mounting board 90 through which lower end portions of supply reel shaft 77, take-up reel shaft 78 and capstan 79 project downwardly. A motor 211 is suitably fixed to the underside of mounting board 90 and has a shaft 212 on which a motor pulley 213 is secured. A combined fly wheel and capstan pulley 214 is secured to the lower end of capstan 79 and a guide pulley 215, which also serves as an anti-rolling fly wheel for the capstan fly wheel, is rotatably mounted at the underside of mounting board 90. A belt 216 is entrained about motor pulley 213, capstan pulley 214 and guide pulley 215 for transmitting the rotation of motor shaft 212 to capstan 79. Also rotatably mounted at the underside of mounting board 90 are a driving gear shaft 217 located approximately midway between supply reel shaft 77, take-up reel shaft 78 and capstan 79, and a switch-over gear shaft 218 which is disposed between driving gear shaft 217 and supply reel shaft 77.

A capstan gear 220 (FIGS. 22 and 23) is fixed relative to capstan pulley 214 above the latter on the lower end portion of capstan 79 and is relatively wide in the axial direction. First and second driving gears 221 and 222 (FIGS. 22 and 24) are rotatably mounted on driving gear shaft 217 and are also axially movable with a clutch mechanism 223 interposed therebetween.

Clutch mechanism 223 is in the form of a magnetic clutch and, for that purpose, second driving gear 222 is formed of a magnetic material which is magnetized to form a magnet. A hysteresis disc 224 of a semi-hard material is fixed to the lower surface of first driving gear 221, and a thin plastic washer 225 is interposed between disc 224 and second driving gear 222, with the axial gap between second driving gear 222 and disc 224 being held to a minimum. Further, a disc 226 for preventing the leakage of magnetic flux is in close contact with the lower surface of second driving gear 222 which, by virtue of its own magnetic force, is coupled to first driving gear 221 for rotation with the latter so long as the load resisting rotation of second driving gear 222 does not exceed a predetermined value. A third driving gear 228 for driving an automatic shutoff mechanism (not shown) may be formed integrally with first driving gear 221 at the top of the latter, and a retaining washer 227 is engaged in an annular groove at the lower end of driving gear shaft 217 for maintaining the respective gears on the latter.

A switch over gear 229 which is relatively wide in the axial direction is mounted on switch over gear shaft 218 for rotation and axial movement relative to such shaft. A helical compression spring 230 is provided around shaft 218 above gear 229 for urging the latter downwardly against a retaining washer 231 which is engaged in an annular groove at the lower end of switch over gear shaft 218. A supply reel shaft gear 232 which is relatively wide in the axial direction is fixedly mounted on the lower end portion of supply reel shaft 77, and first and second take-up reel shaft gears 233 and 234, respectively, are mounted on a lower end portion 235 of take-up reel shaft 78. Such lower end portion 235 of take-up reel shaft 78 is desirably of hexagonal cross section, and the second take-up reel shaft gear 234 is closely engaged with the outer periphery of hexagonal shaft end portion 235 and is fixed thereto by means of a screw 236. The first take-up reel shaft gear 233 has a bore 237 therethrough of hexagonal configuration so as to be slidable axially of shaft end portion 235 while being rotatably coupled to take-up reel shaft 78. A helical compression spring 238 is provided around shaft 78 and acts downwardly on first take-up reel shaft gear 233 for yieldably resisting raising of the latter from the position shown on FIG. 24 where the hubs of gears 233 and 234 are abutting.

The first driving gear 221 is in meshing engagement with capstan gear 220 in all axial positions of first driving gear 221. Further, by axial movement of first driving gear 221, the latter can be brought into selective engagement with switch over gear 229 or with first take-up reel shaft gear 233. The second driving gear 222 is axially movable with first driving gear 221 for engagement with, and disengagement from second take-up reel shaft gear 234. Switch over gear 229 is in meshing engagement with supply reel shaft gear 232 in all axial positions of switch over gear 229.

Figure 22:
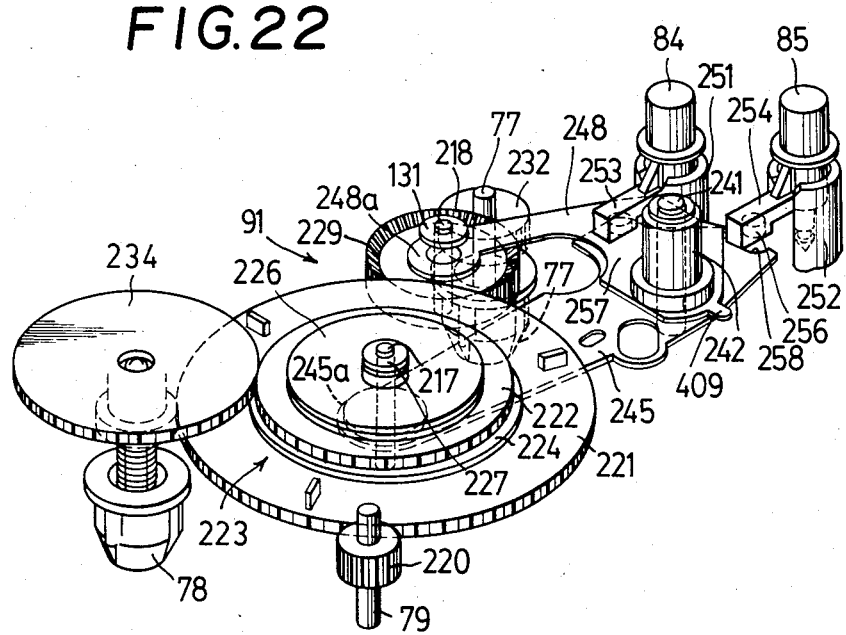
FIG. 22 is a perspective view of a tape drive unit included in the cassette tape player and as the same would appear with the player inverted.
Figure 26A:
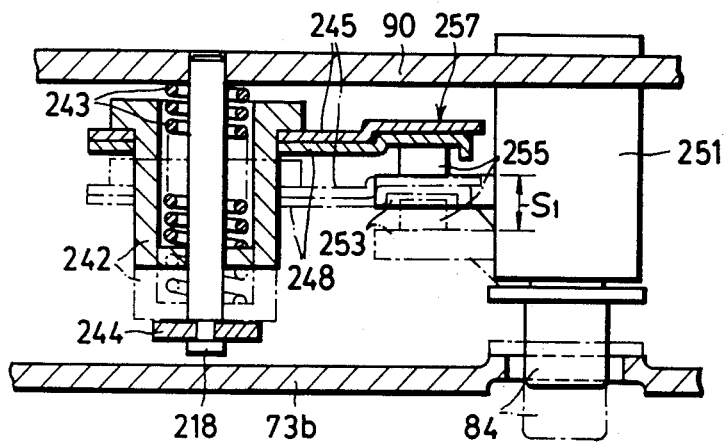
FIGS. 26A and 26B are enlarged sectional developments taken along the lines 26A—26A and 26B—26B on FIG. 23.
Figure 26B:
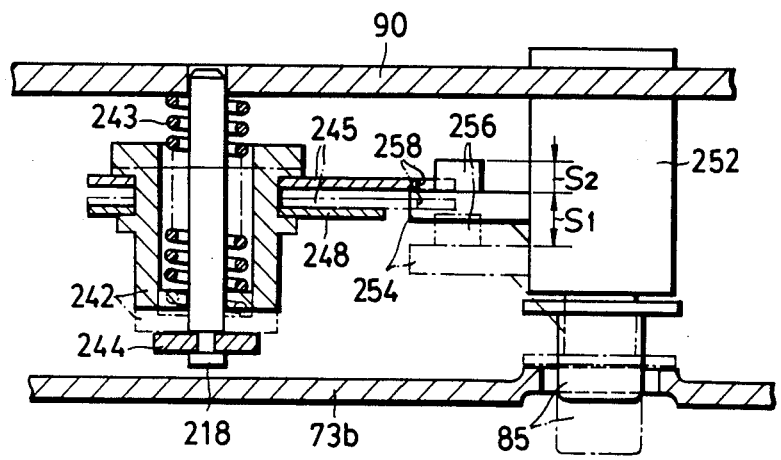

Referring now to FIGS. 22 and 23, it will be seen that an operating plate support shaft 241 depends perpendicularly from mounting board 90 and has a sleeve 242 axially slidable on shaft 241 and being urged downwardly by a helical compression spring 243 against a retaining washer 244 which is engaged in an annular groove at the lower end of shaft 241 (FIGS. 26A and 26B). A first substantially horizontal operating plate 245 is fixed to the upper end portion of sleeve 242 for movement vertically with the latter relative to mounting board 90. A free end portion 245a of first operating plate 245 extends towards driving gear shaft 217 and is formed with a hole 246 which, at its margin, is engaged in an annular groove 247 formed in a hub of first driving gear 221 between the latter and third driving gear 228 (FIG. 24). A second operating plate 248, which is overlapped in part by first operating plate 245, extends below the latter and is also mounted on sleeve 242 in a manner to permit limited vertical movement of sleeve 242 relative to plate 248, as indicated on FIGS. 26A and 26B. Second operating plate 248 is formed of a leaf spring material and has a free end portion 248a extending toward switch over gear shaft 218. Such free end portion 248a has a hole 249 therein which receives a boss 250 formed integrally with switch over gear 229 (FIG. 24).

The FF button 84 and the rewind button 85 are mounted to be vertically movable within tubular mounting members 251 and 252, respectively, which depend from mounting board 90 adjacent a side of first and second operating plates 245 and 248 facing generally away from shafts 217 and 218. Operating arms 253 and 254 integral with push buttons 84 and 85, respectively, extend horizontally from the latter and have upstanding projections 255 and 256 extending from the free end portions of operating arms 253 and 254, respectively. The operating arm 253 extending from FF button 84 extends under portions of first and second operating plates 245 and 248 which are overlapped, as at 257 on FIG. 26A, while operating arm 254 extending from rewind button 85 reaches below a part of the first operating plate 245 which extends beyond second operating plate 248 so that operating arm 254 can act only on first operating plate 245. Further, the portion of first operating plate 245 below which operating arm 254 extends is formed with a semi-circular notch or cutout 258 for receiving the projection 256 of operating arm 254 when rewind button 85 is depressed upwardly, as on FIG. 26B.

The various operating conditions of tape driving unit 91 are as follows:

When tape driving unit 91 is in its inoperative position, as indicated in solid lines on FIG. 25A, first driving gear 221 and switch over gear 229 are in their respective lowest positions with a vertical gap $g_1$ being provided therebetween, and with second driving gear 222 being in meshing engagement with second takeup reel shaft gear 234. In such stopped or inoperative condition of tape driving unit 91, FF button 84 and rewind button 85 are maintained in their downwardly returned or extended positions, as indicated by broken lines in FIGS. 26A and 26B, respectively.

If reproducing or FWD button 83 is depressed upwardly (starting with drive unit 91 in its inoperative or stopped condition), motor 211 is made operative to effect rotation of capstan 79 in the direction of arrow d on FIG. 23. By means of the engagement of first driving gear 221 with capstan gear 220, first driving gear 221 is rotated in the direction of the arrow e, and second driving gear 222 is rotated in the same direction through clutch mechanism 223. Further, by reason of the meshing engagement of second driving gear 222 with take-up reel shaft gear 234, the take-up reel shaft 78 is rotated in the direction of the arrow f at a relatively slow rotational speed for taking up or winding the tape on a take-up reel of cassette 71 as the tape is driven by capstan 79 in the reproducing or playback mode of player 70.

Once again starting with tape driving unit 91 in its inoperative or stopped condition, if FF button 84 is pushed up to its depressed position shown in solid lines on FIG. 26A, projection 255 on operating arm 253 acts upwardly on both operating plates 245 and 248 at their overlapped portions 257. The FF button 84 is locked in its raised position, as hereinafter described in detail, and both operating plates 245 and 248 are maintained in their raised positions shown in full lines on FIG. 26A against the force of spring 243. As a result of the foregoing, first driving gear 221 is raised axially to its highest position by the free end portion 245a of first operating plate 245, and switch over gear 229 is also raised to its highest position against the force of spring 230 by the free end portion 248a of second operating plate 248. When first driving gear 221 and switch over gear 229 are thus both moved to their respective highest positions, the gap $g_1$ is maintained therebetween. Therefore, switch over gear 229 continues to be disengaged from first driving gear 221, while first driving gear 221 continues in meshing engagement with capstan gear 220 and is also moved into meshing engagement with first take-up reel shaft gear 233. As a result of the magnetic attraction within clutch mechanism 223, second driving gear 222 is moved axially with first driving gear 221 during movement of the latter to its highest position, whereby second driving gear 222 is disengaged from second take-up reel shaft gear 234. Upon depression of FF button 84, motor 211 is again made operative, as hereinafter described in detail, to cause rotation of first driving gear 221 in the direction of the arrow e on FIG. 23 by reason of its meshing engagement with capstan gear 220. In response to such rotation of gear 221, take-up reel shaft 78 is rotated at relatively high speed in the direction of arrow f through the meshing engagement of first driving gear 221 with first take-up reel shaft gear 223. Thus, high speed winding of the tape is effected on the take-up reel in cassette 71, as is required in the fast forward or cue operating mode of player 70. It will be appreciated that, when first driving gear 221 is first raised to its highest position in response to depressing of FF button 84, if the teeth of gear 221 do not immediately mesh with the teeth of take-up reel shaft gear 233, the latter is urged upwardly against the force of spring 238 until, in the course of rotation of gear 221, the teeth of the latter mesh with the teeth of gear 233 to permit spring 238 to return first take-up-reel shaft gear 233 to its normal position shown on FIG. 25B.

Once again starting with the tape drive unit 91 in its stopped or inoperative condition, the upward pressing of rewind button 85 to its depressed position shown in full lines on FIG. 26B causes operating arm 254 to engage and raise first operating plate 245, while second operating plate 248, being free of arm 254, lags downwardly below raised plate 245, as shown in full lines on FIG. 26B. Although the stroke $S_1$ of rewind button 85 between its inoperative or extended position shown in broken lines on FIG. 26B and its raised operative position shown in full lines is the same as the similar stroke $S_1$ of FF button 84, the FF button 84 acts on both operating plates 245 and 248 by means of the upper end face of the projection 255 on its operating arm 253, while the similar projection 256 on operating arm 254 is received in the notch 258 of first operating plate 245. Therefore, upon actuation of rewind button 85, only first operating plate 245 is acted upon by the upper end face of operating arm 254 and, consequently, the distance the first operating plate 245 is raised by rewind button 85 is smaller, by the height $S_2$ of projection 256, than the distance through which both plates 245 and 248 are raised in response to actuation or depressing of FF button 84. As a result of the foregoing, when first operating plate 245 is raised in response to depressing of rewind button 85 and the locking of the latter in its raised position, as hereinafter described in detail, first driving gear 221, while maintaining engagement with capstan gear 220, is moved vertically upward to an intermediate position by the free end portion 245a of operating plate 245, as indicated in broken lines on FIG. 25A. In such intermediate position of first driving gear 221, the latter is brought into meshing engagement with switch over gear 229, while second driving gear 222 is moved upwardly with first driving gear 221 and is thereby disengaged from second take-up reel shaft gear 234. Thus, when motor 211 is operated upon depressing of rewind button 85, the rotation of first driving gear 221 in the direction of arrow e on FIG. 23 as a result of its engagement with capstan gear 220 causes switch over gear 229 to be rotated in the direction of arrow g. By reason of the meshing engagement of switch over gear 229 with supply reel shaft gear 232, supply reel shaft 77 is rotated at high speed in the direction of arrow h for rewinding the tape on the supply reel of cassette 71, as in the rewind mode of player 70. If switch over gear 229 does not mesh with first driving gear 221 at the instant when the latter is first raised to its intermediate position, switch over gear 229 is merely urged upwardly against the force of compression spring 230 until the teeth of rotated gear 221 mesh with the teeth of switch over gear 229, whereupon spring 230 returns the latter downwardly to its normal axial position shown on FIG. 25A.

As will be described hereinafter in detail, if stop button 82 is depressed or raised from its normal extended position at a time when player 70 is in its reproducing, fast-forward or rewind mode, the operation of motor 211 is halted. If the depressing of stop button 82 occurs at a time when player 70 is in its fast-forward mode or in its rewind mode, the FF button 84 or the rewind button 85 is unlocked and returned to its respective inactive or initial position shown in broken lines on FIG. 26A or FIG. 26B, respectively, so that operating plates 245 and 248 are returned by spring 243 to their normal positions shown in broken lines on FIGS. 26A and 26B and, as a result thereof, driving gears 221 and 222 and switch over gear 229 are returned to their lowest positions shown in full lines on FIG. 25A.

It will be appreciated that the described tape driving unit 91 achieves the necessary operating modes of player 70 with a minimum number of parts comprising driving gears 221 and 221, clutch mechanism 223, switch over gear 229, supply reel shaft gear 232 and take-up reel shaft gears 233 and 234, with the selection of the desired operating mode of player 70 being achieved by selective movements of driving gears 221 and 222 and switch over gear 229 only in their axial directions. The relatively small number of parts employed in tape driving unit 91 obviously simplifies the structure of the latter and reduces its cost, whereas the selection of the operating modes merely by movements of gears 221, 222 and 229 only in the axial direction substantially minimizes the space required for driving unit 91 so that the latter permits the attainment of a very compact cassette tape player.

Figure 27A:
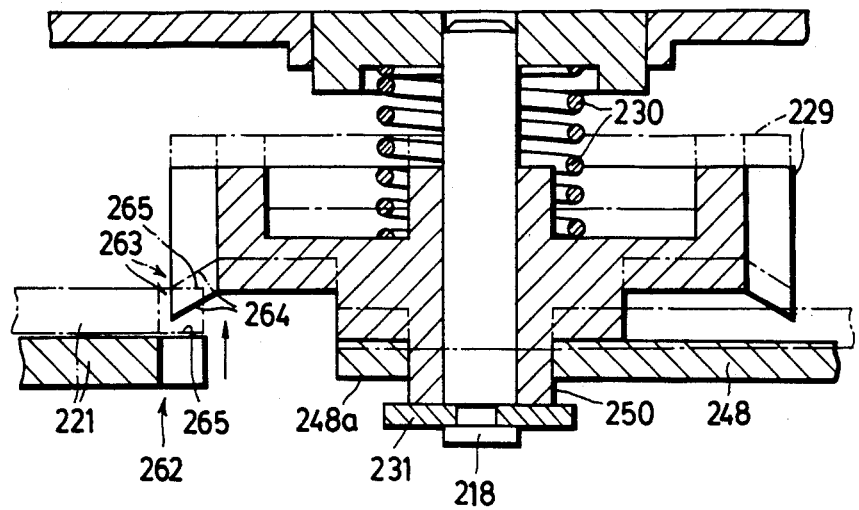
FIGS. 27A and 27B are enlarged sectional views of gears included in the drive unit, and which are shown disengaged and engaged, respectively.
Figure 27B:
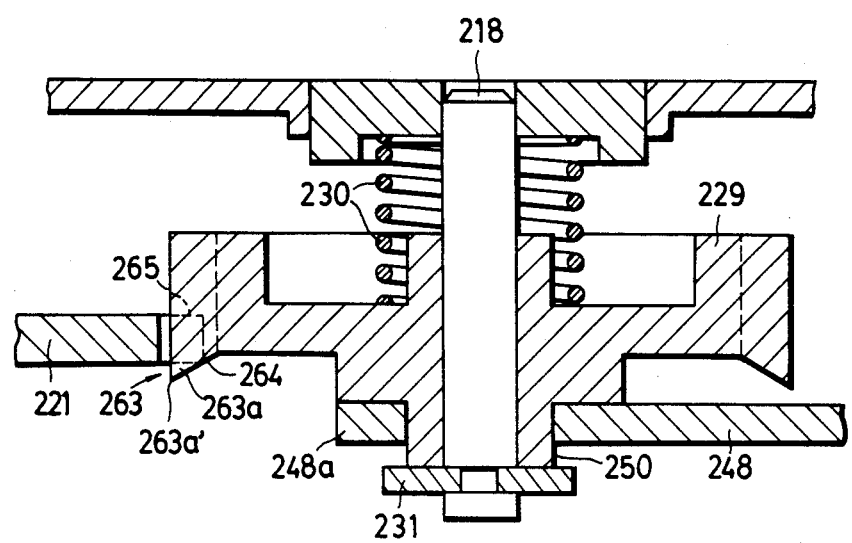
Figure 28A:
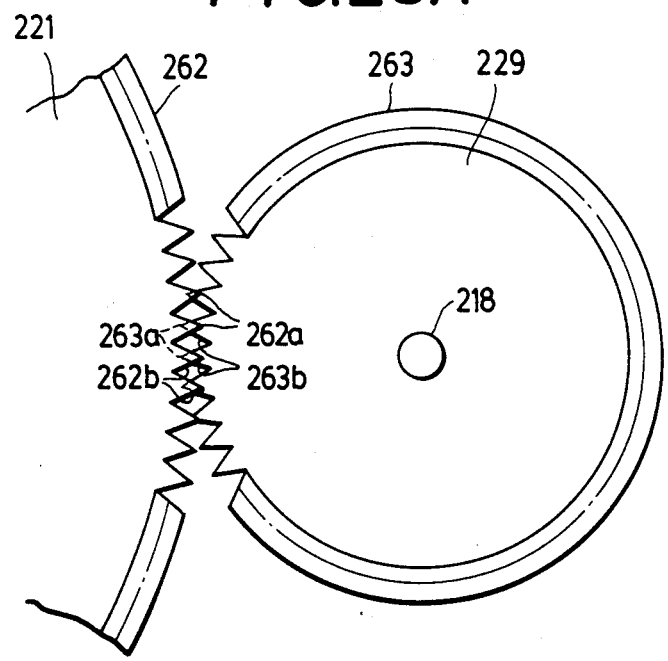
FIGS. 28A and 28B are bottom views of the gears shown on FIGS. 27A and 27B.
Figure 28B:
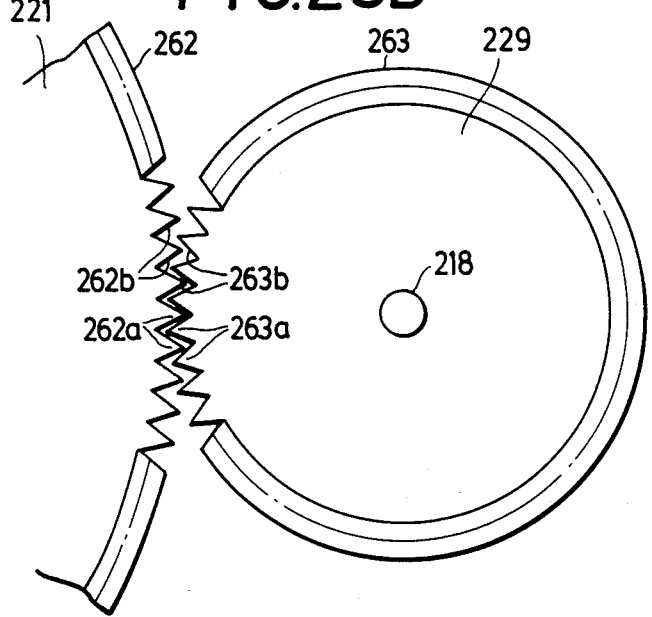

Referring now to FIGS. 27A and 27B, it will be seen that the toothed peripheries 262 and 263 of first driving gear 221 and switch over gear 229, respectively, are provided with special configurations to facilitate the rapid and substantially noise-free meshing engagement of first drive gear 221 with switch over gear 229 when drive gear 221 is raised to its intermediate position in response to depressing of rewind button 85, as described above. More particularly, the toothed periphery 263 of switch over gear 229 has an inclined surface 264 facing axially downward. By reason of the foregoing, when first drive gear 221 is initially raised to its intermediate position indicated in broken lines on FIG. 27A, even if the teeth 262a of gear 221 do not immediately mesh with the teeth 263a of gear 229, for example, as on FIG. 28A, a tip or pointed end 263a' of a tooth 263a will initially effect spot contact with a flat peripheral surface 265 of gear 221 lying in a plane perpendicular to the axis of rotation of gear 221. As a result, as shown in broken lines on FIG. 27A, switch over gear 229 is momentarily raised, as earlier described, but, in this case, the pointed or tip ends 263a' of teeth 263a on gear 229 are more likely to enter the roots 262b of teeth 262a on gear 221 when the latter is turned to align teeth 262a and 263a, as on FIGS. 27B and 28B. The inclined face 264 formed on gear 229 facilitates immediate meshing engagement of gears 221 and 229. It will be appreciated that the same desirable result could be achieved if the downwardly directed face of the toothed periphery 263 of gear 229 was flat, that is, in a plane perpendicular to the axis of gear 229, and the face 265 of the toothed periphery 262 of gear 221 was inclined upwardly. Further, although the special configuration of the gear teeth has been described with reference to the switch over gear 229 engageable by first drive gear 221 for establishing the rewind mode, reference to FIG. 24 will show that the first take-up reel shaft gear 233 is preferably formed with a toothed periphery similar to that described for switch over gear 229 so as to enhance the immediate, substantially noise-free engagement of gear 233 by gear 221 upon selection of the fast-forward mode of operation.

In the absence of the inclined face 264 on the toothed periphery of gear 229, and similarly on gear 233, that is, if the gears 221 and 229 or the gears 221 and 233 initially contact each other at axially facing surfaces which both lie in planes perpendicular to the axes of rotation, and thus are in planar contact with each other, there is the danger, particularly when the gear teeth are of small pitch and gear 221 is driven at a high peripheral speed, that the teeth of gear 221 will merely slip quickly from one tooth to the next on gear 229 or gear 233 so as to at least delay the meshing engagement of the gears and further to produce an undesirable noise when selecting either the fast-forward or rewinding mode of operation. However, the previously described special configuration of the gear teeth on gears 229 and 233 avoids such problem.

Figure 29:
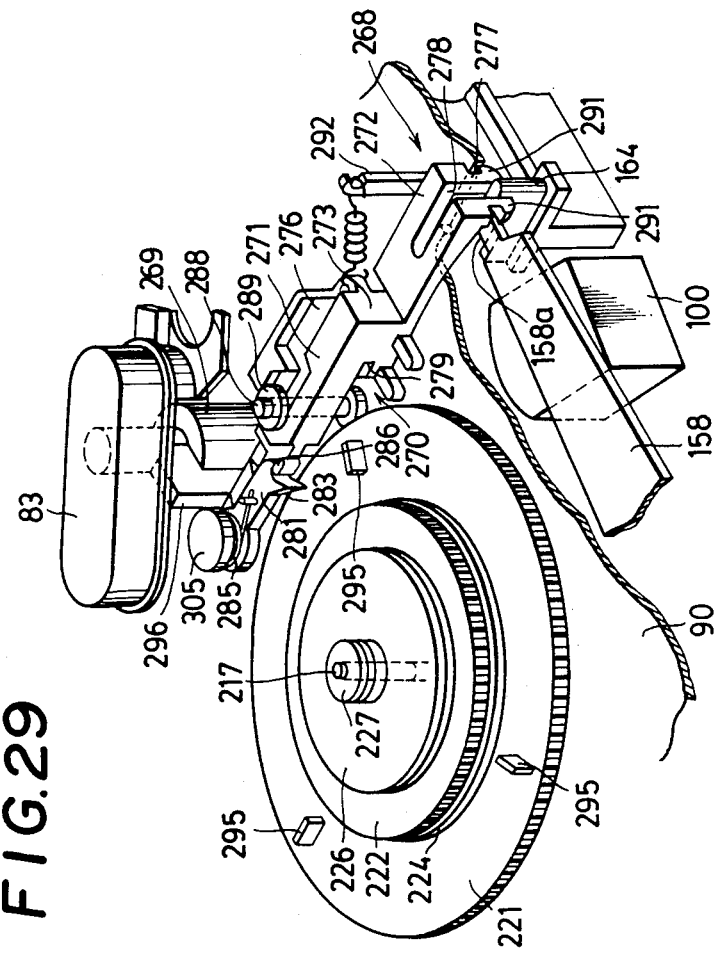
FIG. 29 is a perspective view of a unit for selecting the reproducing or playback mode of the cassette tape player.
Figure 32A:
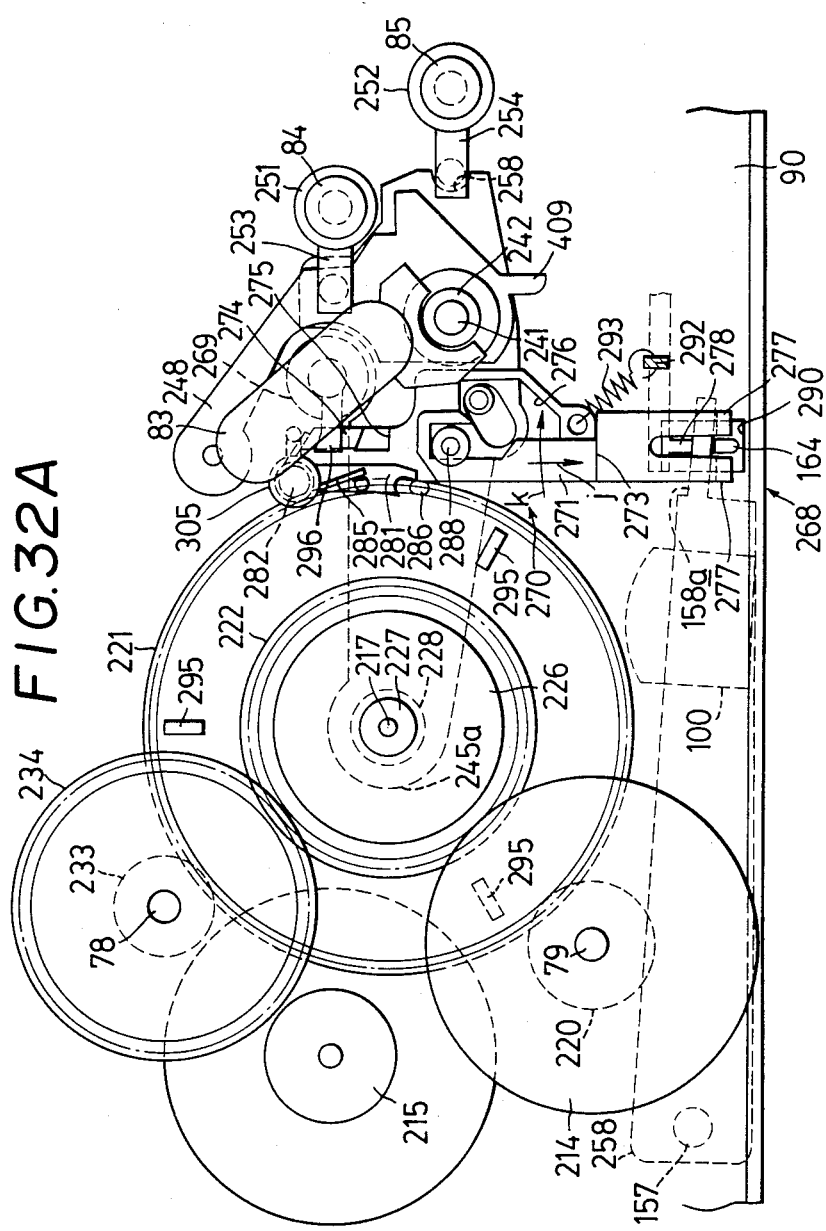
Figure 34A:
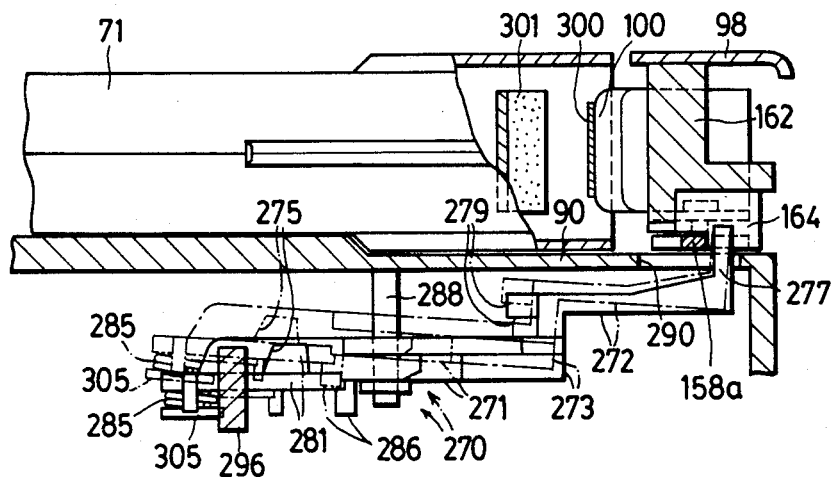
FIGS. 34A and 34B are enlarged cross-sectional views to which reference will be made in explaining actuation of a head mounting base by the FWD lever.
Figure 34B:
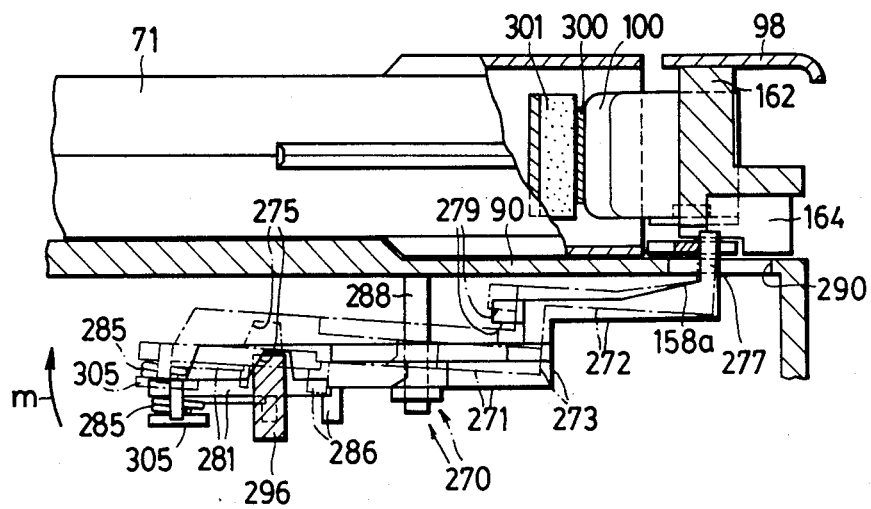

Referring now to FIGS. 29, 32A and 32B, it will be seen that in the cassette tape player 70 according to this invention, a device 268 is provided for selectively establishing the normal reproducing (FWD), cue (CUE) and review (REV) modes of the player and which utilizes a driving force provided by the tape driving unit 91 for effecting movement of head 100 on its base 158 from its initial position shown on FIG. 34A to its position for the normal reproducing or FWD mode, as shown on FIG. 34B.

Figure 30:
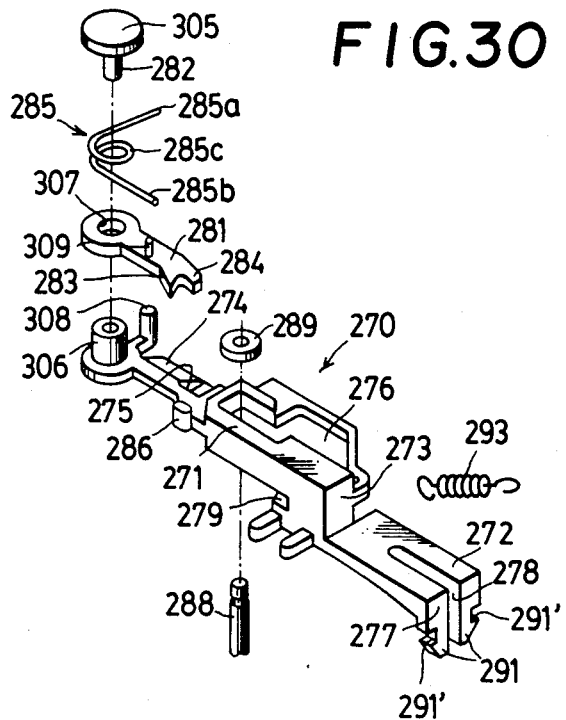
FIG. 30 is an exploded perspective view of elements included in the mode selecting unit of FIG. 29.
Figure 31:
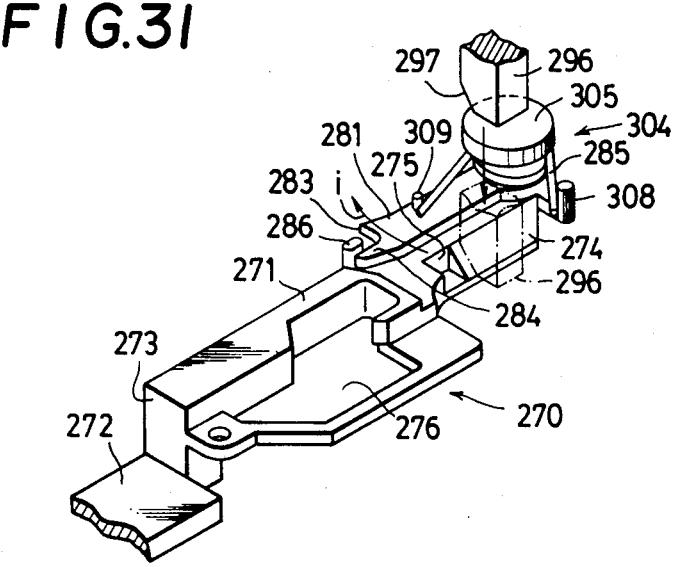
FIG. 31 is a perspective view of the elements of FIG. 30, as assembled together and viewed from another side.

As generally shown on FIGS. 29, 32A and 32B, a mounting member 269 for reproducing button 83 depends from mounting board 90 adjacent the periphery of gear 221 at the side of the latter generally facing away from capstan 79, and reproducing button 83 is mounted for vertical movement within a predetermined range in respect to such mounting member 269. A head base actuating lever 270 is disposed between mounting member 269 and the periphery of gear 221 and is preferably molded from a suitable synthetic resin or plastic material so as to have a forward portion 271, an offset rearward portion 272 and a connecting step 273 which are integral with each other (FIG. 30). The end region of front portion 271 is formed with a slant face 274 extending therealong at the side facing toward mounting member 269. Rearward in respect to such slant face 274, front portion 271 of lever 270 has a recess 275 and then an opening 276 extending vertically therethrough. An upwardly bent operating arm 277 is formed at the end or rear portion 272 and is bifurcated by a central slit 278 extending vertically in arm 277 and in the adjacent rear portion 272. Further, a horizontal slit 279 is formed in step portion 273 of lever 270 so as to form an undercut extension of the upper surface of forward portion 271 (FIGS. 34A and 34B). A pawl lever 281 is disposed against the lower surface of forward portion 271 of lever 270 alongside slant face 274 and is pivotally mounted on a pin 282 at the tip end of front portion 271. Pawl lever 281 is desirably molded of a plastic material so as to have a pawl tooth 283 and a stop projection 284 at its free end. Pawl lever 281 is pivotally biased relative to lever 270 in the direction of the arrow i on FIG. 31 by means of a torsion spring 285, and the stop projection 284 on pawl lever 281 is engageable with an abutment 286 formed on lever 270 for limiting such spring biased pivoting of pawl lever 281 to a position in which pawl tooth 283 projects beyond the side of lever 270 toward gear 221.

As shown on FIGS. 32A–32D and 37, front portion 271 of head base actuating lever 270 extends under the lower surface of first operating plate 245 and receives, in its opening 276, a guide pin 288 which depends from mounting board 90 and has a washer 289 secured on its lower end for retaining lever 270. The operating arm 277 of lever 270 extends upwardly through a rectangular guide aperture 290 formed in mounting board 90 under the free end portion 158a of head base 158. As shown particularly on FIG. 30, operating arm 277 is notched at its opposite sides, as at 291', for defining retaining pawls 291. When arm 277 is initially inserted upwardly in guide aperture 290, retaining pawls 291 are elastically urged laterally toward each other with narrowing of slit 278 therebetween, until notches 291' receive the opposite side edge portions of guide aperture 290. Thereafter, lever 270 is mounted under board 90 for movement in the longitudinal direction to the extent permitted by the engagement of arm 277 in rectangular aperture 290. Further, lever 270 can swing laterally about arm 277 as its fulcrum at any position of the latter along aperture 290.

Lever 270 is biased longitudinally and pivotally in the directions of the arrows j and k, respectively, on FIG. 32A, by a tension spring 293 extending between lever 270 and an anchor 292 which depends from mounting board 90.

As shown on FIGS. 29, 32A–32D, 33A and 33B, first driving gear 221, which is preferably molded of a synthetic resin or plastic material, is formed on its lower surface with a plurality of driving lugs, for example, the three equally spaced driving lugs 295, disposed near the periphery of gear 221 for coaction with pawl lever 281 when the pawl tooth 283 of lever 281 is projected into the circular path of driving lugs 295 in response to actuation of reproduce button 83. As shown particularly on FIGS. 29, 33A and 33B, an operating arm 296 is formed integrally with reproducing button 83 so as to extend from mounting member 269 under lever 270 in the region of slant face 274, and such operating arm 296 is formed with a beveled face 297 which is generally parallel to slant face 274 for smooth contact with the latter when button 83 is depressed upwardly.

The FWD, CUE and REV modes of operation of player 70 are established by the above described device 268 in the following manner:

Referring first to FIG. 32A, it will be seen that, in the inoperative or stopped condition, lever 270 is urged by spring 293 in the direction of the arrows j and k and reproducing button 83 is in its inoperative or extended position (FIG. 33A) in which operating arm 296 is spaced from slant face 274 so that the pawl tooth 283 of pawl lever 281 is held outside the path of travel of driving lugs 295 on gear 221. Further, in the inoperative or stop mode, stop portion 164 on blinder plate 162 is inserted in slit 278 of lever 270 and the operating arm 277 of the latter engages in back of the free end portion 158a of head base 158 which is urged by spring 163 to dispose head 100 in the position shown on FIG. 34A.

When a cassette 71 is loaded into player 70 in the inoperative or stop mode, and reproducing button 83 is depressed upwardly to the position shown in FIG. 33B, bevel face 297 on operating arm 296 acts on slant face 274 of lever 270. Since first operating plate 245 bears downwardly on front lever portion 271, upward movement of the latter in response to the pressure of beveled face 297 on slant face 274 is resisted, whereby such pressure provides a wedge action or force in the direction of arrow l on FIG. 33B. As a result thereof, lever 270 is pivotally moved in the direction of the arrow k' on FIG. 32B about the operating arm portion 277 as a fulcrum. Upon locking of reproducing button 83 in its upwardly depressed position, as hereinafter described in detail, lever 270 is held in the pivoted position shown on FIG. 32B and, as a result thereof, tooth 283 of pawl lever 281 extends into the circular path of movement of the driving lugs 295 on first driving gear 221. As earlier noted, depressing of reproducing button 83 for selecting the reproducing or playback mode of player 70 causes tape driving unit 91 to effect rotation of first driving gear 221 in the direction of arrow e on FIG. 32B. Immediately after the commencement of such rotation of gear 221, one of the driving lugs 295 thereon engages tooth 283 of pawl lever 281 and, through the latter, drives lever 270 longitudinally in the direction of the arrow j' on FIG. 32C against the force of tension spring 293.

Such longitudinal movement of lever 270 in the direction of arrow j' causes slant face 274 thereon to slide relative to beveled face 297 on operating arm 296 of button 83 until finally, as shown in broken lines on FIG. 32D, lever 270 attains a longitudinally displaced position in which recess 275 contiguous to slant face 274 (FIG. 31) registers with beveled face 297 of operating arm 296. Thereupon, tension spring 293 is effective to pivot lever 270, about its operating arm portion 277 as a fulcrum, in the direction of the arrow k on FIG. 32D to the position there shown in full lines, in which position the upper end of operating arm 296 engages in recess 275 for locking lever 270 in such so-called advanced position. The pivoting of lever 270 in the direction of arrow k on FIG. 32D is effective to remove the tooth 283 of pawl lever 281 from the path of the driving lugs 295 on first driving gear 221.

During the movement of lever 270 longitudinally in the direction of arrow j' (FIG. 32C) from its initial or returned position (FIG. 34A) to its advanced position (FIG. 34B), operating arm 277 of lever 270 moves along guide aperture 290 and displaces free end portion 158a of head base 158 in the same direction. Therefore, head base 158 is pivotally displaced about shaft 157 in the direction of arrow b' on FIG. 13 against the force of torsion spring 163 and, as shown in FIG. 34B, reproducing head 100 is inserted relatively deeply into cassette 71 and urges the tape 300 against a tape backup pad 301 with a predetermined pressure. Simultaneously, pinch roller 101 is brought into pressure contact with capstan 79 through tape 300 against the force of tension spring 167.

Figure 35A:
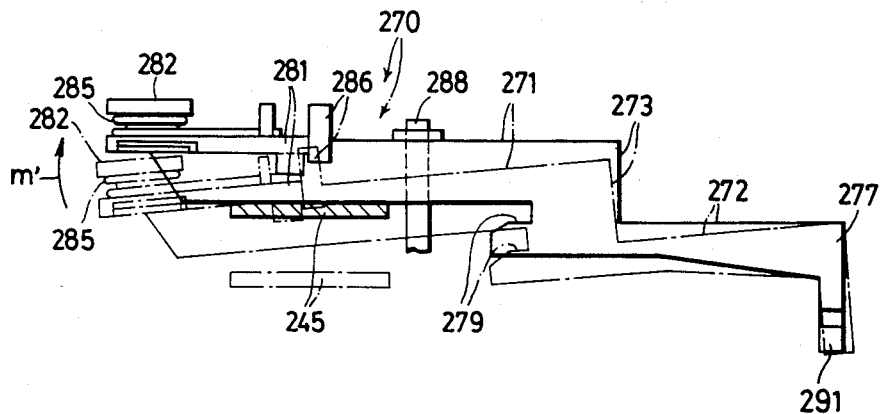
FIGS. 35A and 35B are inverted sectional views to which reference will be made in explaining operation of the FWD lever by a first operating plate.
Figure 35B:
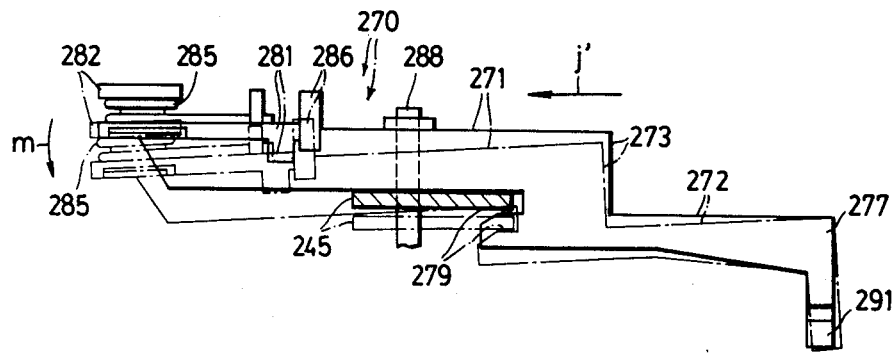

Upon changeover to the FWD mode, as described above, tape 300 is driven at a constant speed by the coaction of capstan 79 and pinch roller 101 while reproducing head 100 plays back or reproduces the stereo signals recorded on tape 300. In the FWD mode, the movement of lever 270 to its advanced position, as described above and as indicated in solid lines on FIG. 35B, causes an edge portion of first operating plate 245 to enter slit or undercut 279 of lever 270 and to be held therein.

If FF button 84 is depressed upwardly while player 70 is in its FWD or reproducing mode, the fast-forward driving of tape 300 is effected while the reproducing button 83 remains locked in its depressed position, as hereinafter described in detail, for establishing the CUE mode of the player. More particularly, when FF button 83 is depressed upwardly to its operative position shown in solid lines on FIG. 26A, operating arm 253 forces up the first operating plate 245 from its initial or returned position shown in solid lines on FIG. 35B to its raised position indicated in broken lines. Since first operating plate 245 is engaged with slit 279 of lever 270 when the latter has been advanced in the direction of the arrow j' for establishing the FWD mode, the upward movement or displacement of first operating plate 245 in response to depressing of FF button 83 causes pivotal movement of lever 270 in the direction of the arrow m about its operating arm portion 277 as a fulcrum, for example, to the position shown in broken lines on FIGS. 34B and 35B. Such pivoting of lever 270 in the direction of the arrow m causes disengagement of recess 275 of lever 270 from the upper end of operating arm 296 of reproducing button 84, whereby lever 270 is unlocked for return by tension spring 293 to its initial or rest position shown in FIG. 32A. Such return movement of lever 270, and hence of its operating arm portion 277 engaged with free end portion 158a of head base 158 permits torsion spring 163 to pivotally return head base 158 in the direction of arrow b on FIG. 13 so that reproducing head 100 is thereby moved back to its initial or returned position shown on FIG. 34A. In such returned position of reproducing head 100, the latter is still inserted to a relatively small extent into cassette 71 for lightly contacting tape 300.

When the reproducing or FWD button 83 has been depressed to its operative position before the FF button 84 is depressed, the button 84 is not locked in its depressed or operative position and the reproducing button 83 remains locked in its depressed operative position. Therefore, lever 270, upon being moved back to its returned or initial position shown in FIG. 32A, has its slant face 274 in light contact with the beveled face 297 on operating arm 296 of button 83. As a result, FWD lever 270 is held in a somewhat inclined state, as indicated in broken lines on FIGS. 34A and 35A, rather than being returned to a completely horizontal position shown in solid lines. Thus, upon depressing the FF button 84 at a time when the reproducing or FWD button 83 has been previously depressed, tape driving unit 91 assumes the CUE state in which the tape 300 is quickly wound on the take-up reel of cassette 71 while the stereo signals recorded on the tape are reproduced by head 100. Upon release of FF button 84 after the latter has been depressed to achieve the CUE mode or state, button 84 is returned to its initial or inoperative position shown in broken lines on FIG. 26A and, at the same time, first operating plate 245 is returned downwardly to the position shown in full lines on FIG. 35A to similarly press down front portion 271 of lever 270. Thus, lever 270 is pivoted in the direction of the arrow m' on FIG. 35A and, as a result thereof, slant face 274 on lever 270 is brought into pressure contact with beveled face 297 of operating arm 296 and the consequent wedging action causes lever 270 to be again displaced pivotally in the direction of arrow k' on FIG. 32B so that pawl tooth 283 of lever 281 is again projected into the path of movement of driving lugs 295 of gear 221. Therefore, as in the case when changing over to the forward or reproducing mode, the release of the FF button 84 when it is desired to change over from the CUE mode back to the reproduce or FWD mode causes lever 270 to be automatically displaced longitudinally to its advanced position shown in full lines on FIG. 32B and at which lever 270 is locked for continuing the playback or reproducing operation in the FWD mode.

Similarly to the above, if rewind button 85 is depressed upwardly to its operative position at a time when player 70 is in its reproducing or FWD state or mode, the rewinding of tape 300 is effected while reproducing or FWD button 83 remains locked in its advanced position, whereby to establish the review or REV mode of player 70. Whenever the rewind button 85 is thereafter released to terminate the rewinding in the REV mode, player 70 automatically returns again to its reproducing or FWD mode.

If stop button 82 is depressed upwardly at a time when player 70 is in its reproducing or FWD mode, reproducing or FWD button 83 is released from its depressed or operative position and is thereby returned to its initial or inoperation position shown on FIG. 33A. As a result of the foregoing, the upper end of operating arm 296 of button 83 is disengaged from recess 275 of lever 270 which is thereby freed to be moved back to its returned or initial position shown on FIG. 32A by means of spring 293. Such return movement of lever 270 permits head base 158 to return head 100 to its initial position shown in FIG. 34A, whereby player 70 is restored to its inoperative or stop mode.

It will be appreciated that, in the above described device 268 for selectively establishing the various modes of player 70, the action of arm 296 of reproducing button 83 on lever 270 by engagement with slant face 274 is only for the purpose of effecting the slight lateral displacement of lever 270 to the position in which the tooth 283 of pawl lever 281 will project into the path of movement of driving lugs 295. Thereafter, the substantial movement of lever 270 longitudinally to its advanced position, and the corresponding movement of head base 158 for disposing head 100 in its operative position and for engaging pinch roller 101 with capstan 79, is powered by motor 211 in rotating driving gear 221. Upon attaining its advanced position, lever 270 is there locked by the engagement of operating arm 296 in recess 275, which engagement also permits lever 270 to be moved laterally or pivoted so as to again withdraw pawl tooth 283 from the path of driving lugs 295. During the foregoing operations, lever 270 is movable both in its longitudinal direction and pivotally in the lateral direction, with the single tension spring 293 being effective to apply restoring forces for lever 270 in respect to both of such movements. Thus, the described device 268 is formed of a minimum number of parts which can be assembled by a relatively few simple steps. Since the rotational force of motor 211 is employed for effecting the substantial longitudinal movement of lever 70 when establishing the reproducing or FWD mode, the reproducing or FWD button 83 can be of a type that is actuable to its depressed or operative position by a very light or feather-touch.

Figure 36:
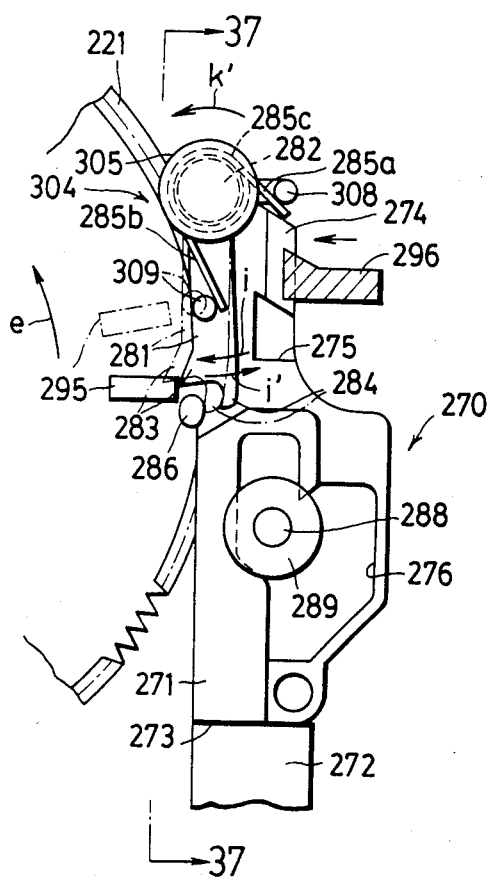
FIG. 36 is an enlarged bottom view of a safety device for the mode selecting unit.

The device 268 preferably further includes a safety mechanism 304 for avoiding damage to pawl lever 281 or to the driving lugs 295 on drive gear 221 in the event that one of the lugs 295 is positioned precisely to interfere with pawl tooth 283 at the instant when lever 270 is displaced laterally in the direction of the arrow k' on FIG. 36 in response to upward depressing of button 83. More particularly, as shown on FIGS. 30, 36 and 37, pivot pin 282 is formed with a head 305 and is pressed fitted, from below, into a boss 306 which depends from the tip end portion of lever 270. Pawl lever 281 has a through hole 307 in the end portion thereof remote from tooth 283, and such hole 307 is fitted over boss 306 so that pawl lever 281 can pivot in the directions of the arrow i and i' on FIG. 36 about the axis of boss 306. The diameter of hole 307 is slightly larger than the outer diameter of boss 306 so that lever 281 is also free to pivot in the directions of the arrows n and n' on FIG. 37. The torsion spring 285 is shown to include end portions 285a and 285b and an intermediate coil portion 285c which extends around pivot pin 282 between head 305 and pawl lever 281. The end portions 285a and 285b bear against spring anchors 308 and 309 which are integrally molded on the tip end portion of lever 270 and on pawl lever 281, respectively, so as to project from the lower surfaces thereof. As installed, the coil portion 285c of torsion spring 285 is loaded both torsionally and axially in compression so that pawl lever 281 is biased in the direction of the arrow i on FIG. 36 to engage its abutment 284 with the stop 286 on lever 270, and also to urge lever 281 pivotally in the direction of the arrow n on FIG. 37, whereby to urge lever 281 into close contact with the lower surface of the front portion 271 of lever 270.

By reason of the above described safety mechanism 304, if reproducing or FWD button 83 is depressed upwardly precisely at the instant when one of the driving lugs 295 is positioned at the side of front portion 271 of lever 270, so that the lateral pivoting of lever 270 in the direction of the arrow k' by the action of operating arm 296 on slant face 274 brings pawl lever 281 into abutment with such driving lug 295, as on FIG. 36, pawl lever 281 is deflected pivotally in the direction of the arrow i' against the force of torsion spring 285 to the position indicated in solid lines. Upon further turning of first driving gear 221 in the direction of the arrow e for removing the illustrated driving lug 295 from engagement with pawl lever 281, for example, upon movement of the driving lug 295 to the position shown in broken lines on FIG. 36, torsion spring 285 pivotally restores pawl lever 281 in the direction of the arrow i, for example, to the position shown in broken lines, where the pawl tooth 283 has entered the path of movement of the driving lugs 295 for eventual engagement by one of the latter.

Figure 37:
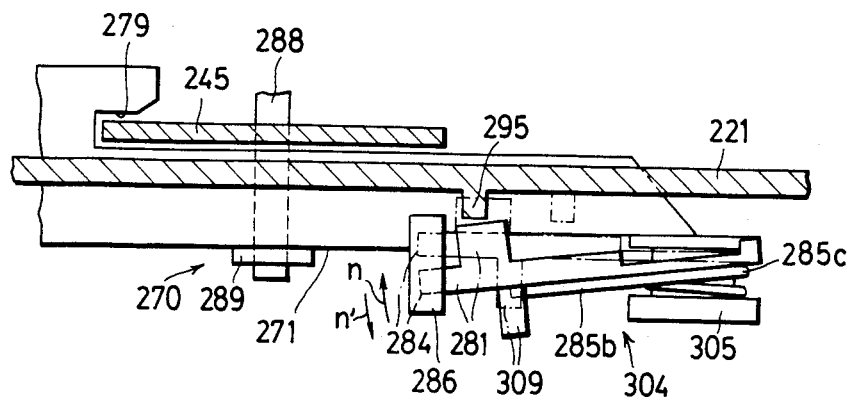
FIG. 37 is an enlarged and inverted sectional view taken along the line 37—37 of FIG. 36.

Further, as shown on FIG. 37, upon release of FF button 84 at the completion of an operation of player 70 in the CUE mode, first driving gear 221 may be returned downwardly with first operating plate 245 at an instant when a driving lug 295 on gear 221 is positioned above tooth 283 of lever 281. In that case, damage is avoided by downward deflection of lever 281 in the direction of the arrow n', for example, to the position shown in full lines on FIG. 37. Upon further turning of first driving gear 221 in the direction of the arrow e on FIG. 36, pawl lever 281 is returned by spring 285 to the position indicated in broken lines on FIG. 37 so as to be subsequently engaged by a driving lug 295 on gear 221 for restoring lever 270 to its advanced position. Thus, there is no possibility of damage to pawl lever 281 or to driving lugs 295 even though the actuation of buttons 83 and 84 may occur at random in respect to the rotational position of gear 221. Further, the described safety mechanism 304 for achieving the foregoing employs only a single torsion spring 285 for yieldably positioning pawl lever 281 in the direction of the arrow i and also in the direction of the arrow n.

Figure 38:
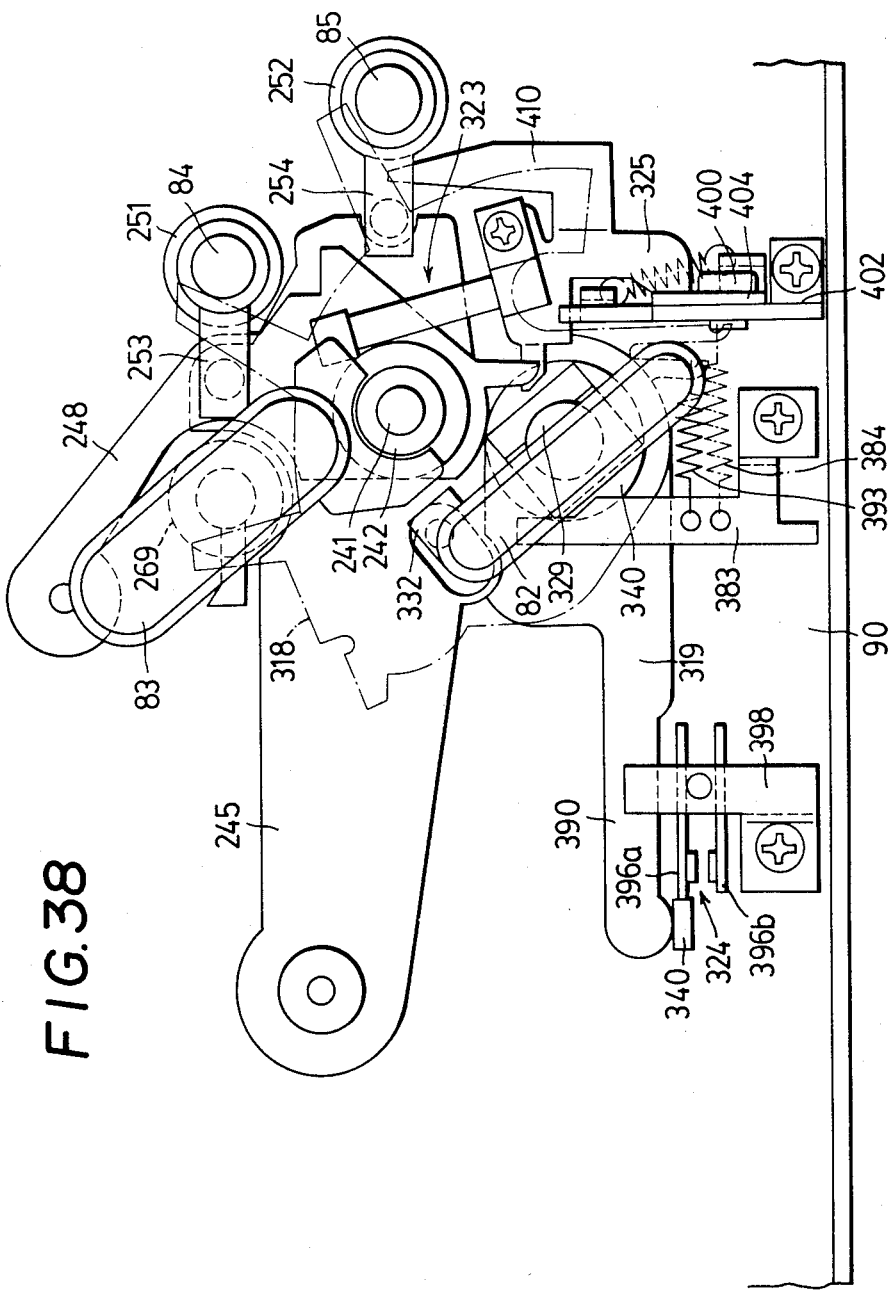
FIG. 38 is an enlarged bottom view showing an assembly of a push button unit, a lock unit and a power switch unit included in the tape cassette player according to the invention.

Referring now to FIG. 38, it will be seen that stop button 82, reproducing or FWD button 83, FF button 84 and rewind button 85 are mounted at the underside of mounting board 90 in an array around operating plate supporting shaft 241 which serves as a guide for the movements of first and second operating plates 245 and 248. As earlier noted, FWD button 83, FF button 84 and rewind button 85 are mounted in tubular members 269, 251 and 252, respectively, which depend from mounting board 90. Stop button 82 which is included in a push-button assembly 312 (FIGS. 39-41) is similarly mounted for movement in a direction normal to board 90 in respect to a mounting member 317 which depends from mounting board 90. Disposed above buttons 82-85 are a locking plate 318 and a switch operating plate 319 which is in close contact with the lower surface of mounting board 90, with locking plate 318 being disposed immediately under switch operating plate 319. The illustrated cassette tape player 70 further employs first and second power switches 323 and 324 (FIG. 38). First power switch 323 is shown to be attached to the underside of mounting board 90 through a switch mounting plate 325 associated with second operating plate 248, while second power switch 324 is directly mounted on the underside of mounting board 90.

Figure 39:
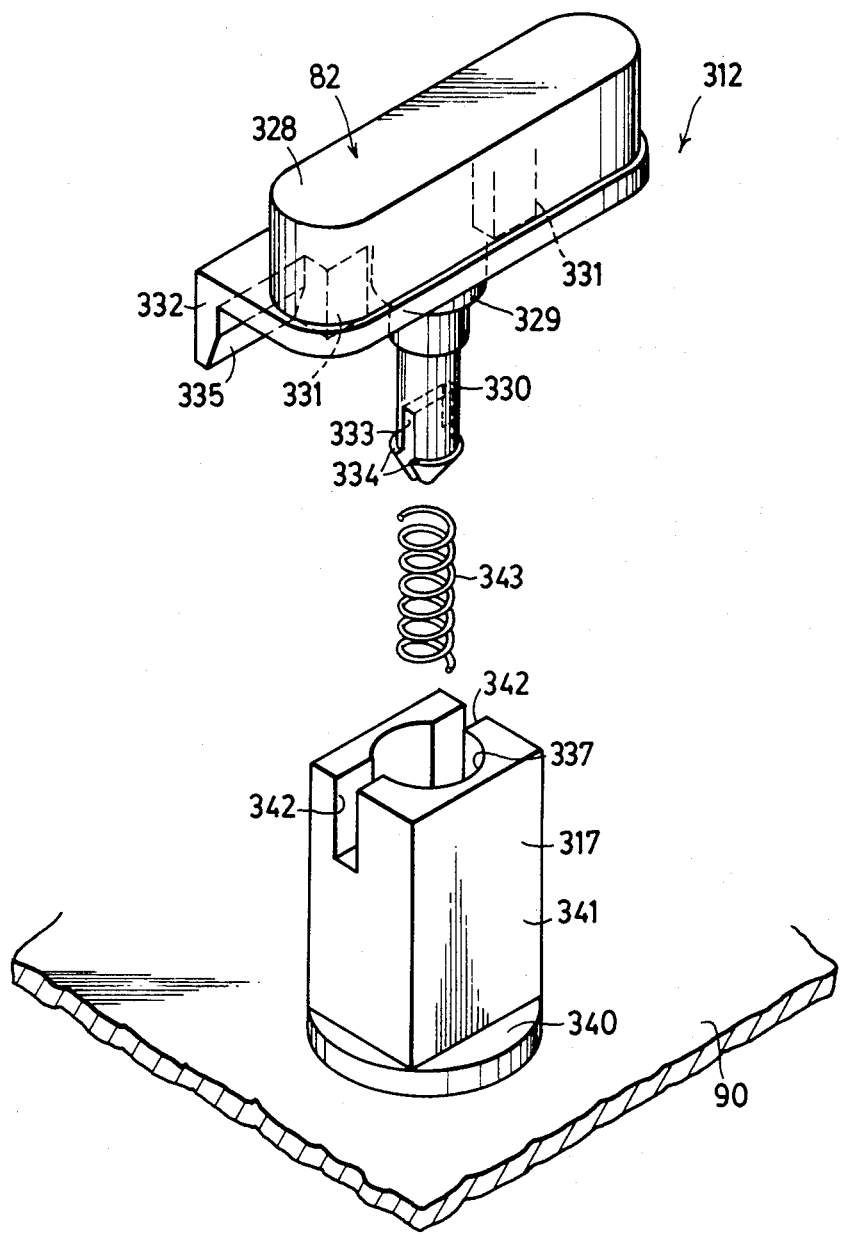
FIG. 39 is an exploded and enlarged perspective view of the elements of a stop button assembly shown inverted.
Figure 40:
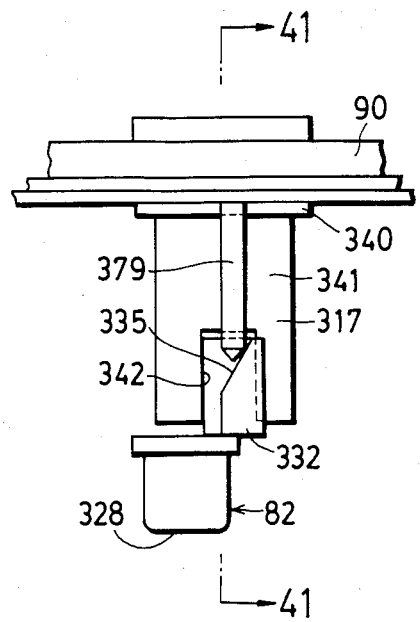
FIG. 40 is a front view of the assembled stop button.
Figure 41:
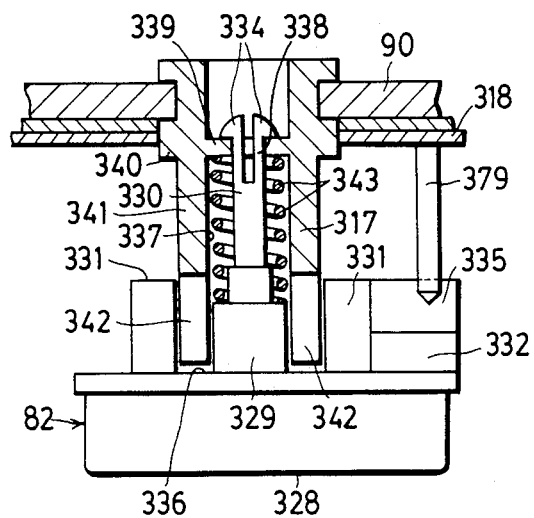
FIG. 41 is a sectional view taken along the line 41—41 of FIG. 40.

Referring in detail to FIGS. 39-41, it will be seen that stop button 82 of push-button assembly 312 is integrally molded of a synthetic resin or plastic material so as to comprise a generally boat-shaped pressing portion 328, a guide shaft portion 329 directed upwardly from approximately the center of pressing portion 328, a retaining shaft portion 330 extending axially upward from guide shaft portion 329, a pair of guide plate portions 331 extending upwardly from the opposite end portions, respectively, of pressing portion 328, and a locking plate operating portion 332 directed upwardly from an end portion of pressing portion 328 adjacent the respective guide plate portion 331. A diametrically extending slit 333 is provided in the end of retaining shaft portion 330, which end is diametrically enlarged and conically shaped so as to form a pair of semi-conically shaped retaining pawls 334 at opposite sides of slit 333. A slant face 335 is formed at one side of the upper end portion of the locking plate operating portion 33Z, and a recess 336 (FIG. 41) is formed in pressing portion 3Z8 and opens upwardly around guide shaft portion 329.

The mounting member 317 for stop button 82 is molded of a synthetic resin or plastic material, for example, by the so-called outsert molding method, so as to be integral with the metal mounting board 90. The mounting member 317 has a vertical guide bore 337 extending therethrough and, at its upper end portion, guide bore 337 has an inwardly directed flange defining a spring seat 339 with a central hole 338 of reduced diameter extending therethrough. A base portion 340 of mounting member 317 disposed immediately adjacent mounting board 90 has a circular configuration and is hereinafter referred to as the "circular base". Extending downwardly from circular base 340, tubular member 317 is formed with a body portion 341 of substantially square external configuration, with slits 342 being formed in the lower end portion of body 341 at opposite sides of the latter.

A helical compression spring 343 is disposed around retaining shaft portion 330 so as to seat, at one end, against the relatively larger diameter guide shaft portion 329. Then, retaining shaft portion 330 and guide shaft portion 329 are inserted from below into guide bore 337 of mounting member 317, until retaining pawls 334 at the upper end of retaining shaft portion 330 are snapped through hole 338 so as to be permanently retained above spring seat 339. In such mounted condition, spring 243 engages seat 339 so as to yieldably urge stop button 82 to its inoperative or extended position shown on FIGS. 40 and 41. Further, the inwardly directed surfaces of guide plate portions 331 are disposed in close proximity to the adjacent flat surfaces of body 341 to resist turning of button 82 relative to mounting member 317 about the axis of shaft portions 329 and 330, while allowing stop button 82 to be depressed upwardly from its inoperative or extended position against the force of spring 343.

Figure 42:
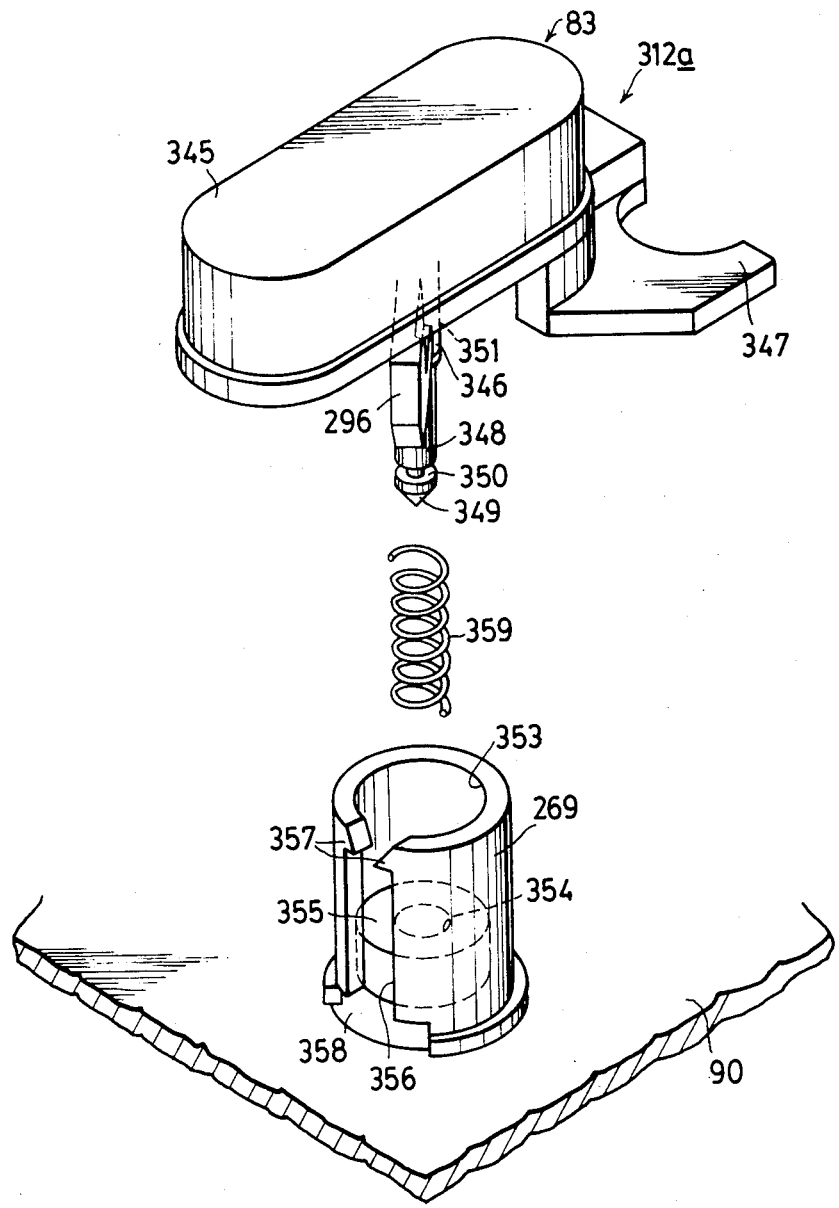
FIG. 42 is an exploded and enlarged perspective view of the elements of a reproducing button assembly shown inverted.
Figure 43:
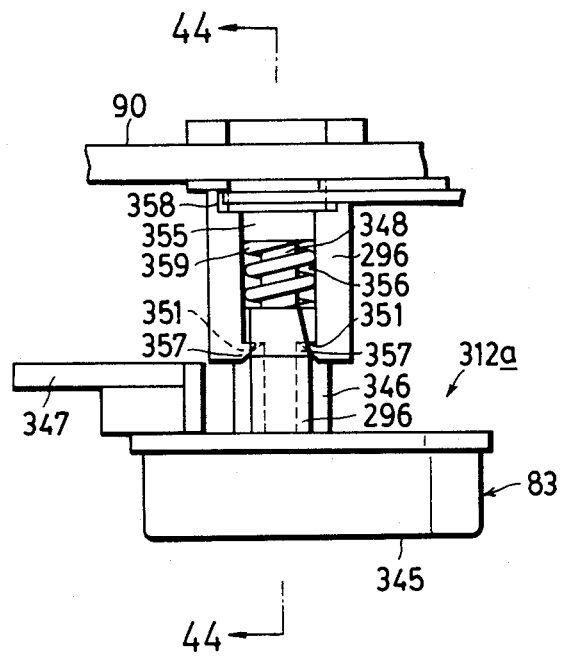
FIG. 43 is a front view of the assembled reproducing button.
Figure 44:
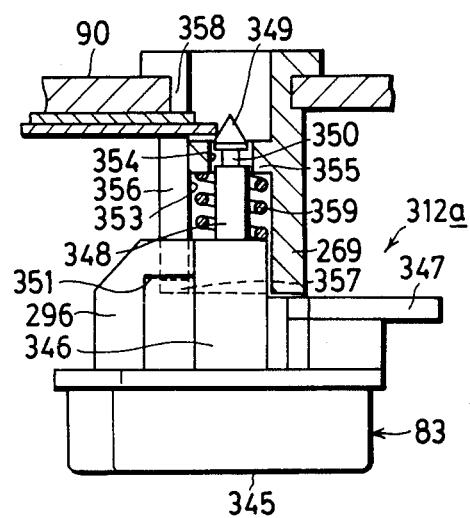
FIG. 44 is a sectional view taken along the line 44—44 of FIG. 43.

Referring now to FIGS. 42–44, it will be seen that reproducing or FWD button 83 is included in a push-button assembly 312a. The button 83 is preferably molded of a synthetic resin or plastic material so as to comprise, as integral parts thereof, a generally boat-shaped pressing portion 345, a guide shaft portion 346 directed upwardly from approximately the center of pressing portion 345 with the previously mentioned operating arm 296 extending radially from guide shaft portion 346 and being directed obliquely in respect to the longitudinal axis of the boat-shaped or elongated pressing portion 345, and a switch operating portion 347 extending from one end of pressing portion 345 and being offset upwardly in respect to the latter. Further, extending upwardly from guide shaft portion 346 there is a coaxial operating shaft 348 which is formed of metal and integrated with the remainder of button 83, for example, by the outsert molding method. The operating shaft 348 has a conical tip 349 and an annular groove 350 adjacent such tip. Further, the operating arm 296 of button 83 has recesses 351 formed in the opposite sides of its root portion, that is, the portion of arm 296 joined to pressing portion 345.

The previously mentioned mounting member 269 for FWD button 83 is molded of synthetic resin or plastic material so as to be integrated with mounting board 90, for example, by the outsert molding method, and is formed with a guide bore 353 extending therethrough in the vertical direction. Intermediate its ends, guide bore 353 is formed with an inwardly directed flange defining a spring seat 355 about a central hole 354. A guide slot 356 is formed along one side of tubular mounting member 269 and the lower end of such guide slot 356 is narrowed to define a pair of retaining pawls 357 projecting toward each other. Further, at its upper end, guide slot 356 opens into a slit 358 extending through the wall of tubular mounting member 269 at the base of the latter immediately adjacent mounting board 90, with such slit 358 having an angular extent greater than that of slot 356.

After a helical compression spring 359 has been installed about operating shaft 348 so as to abut, at one end, against guide shaft portion 346, operating shaft 348 and guide shaft portion 346 are inserted axially, from below, into guide bore 353 of mounting member 269, with operating arm 296 extending slidably through guide slot 356, and with the tip end 349 of operating shaft 348 extending through hole 354 and spring 359 abutting against seat 355. When inserting operating arm 296 into guide slot 356, retaining pawls 357 are initially elastically deflected away from each other until they are received in the recesses 351 of operating arm 296, whereupon retaining pawls 357 limit the downward movement of FWD button 83 under the influence of spring 359 to its inoperative or extended position shown on FIGS. 43 and 44. Of course, FWD button 83 can be depressed upwardly from such inoperative or extended position against the force of spring 359 and is guided in the resulting upward movement by the engagement of guide shaft portion 346 in bore 353 and the engagement of operating arm 296 in slot 356.

Figure 45:
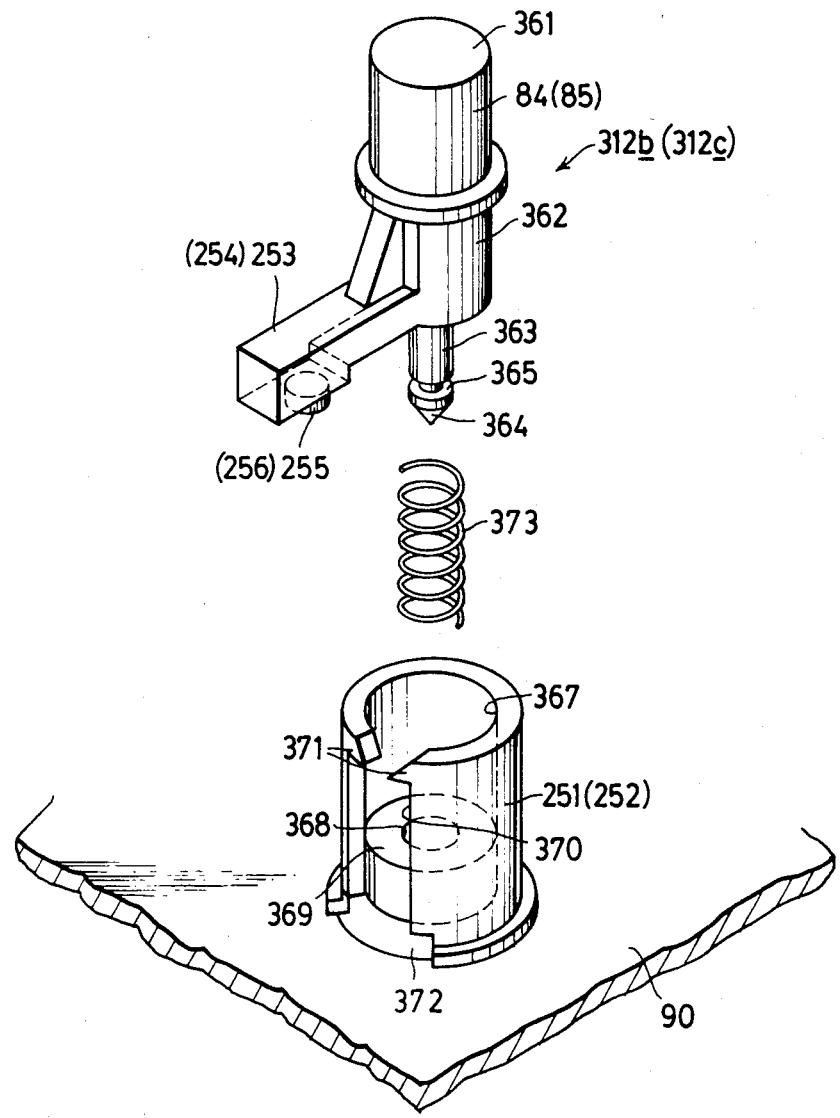
FIG. 45 is an exploded and enlarged perspective view of the elements of a fast-forward or FF button assembly shown inverted.
Figure 46:
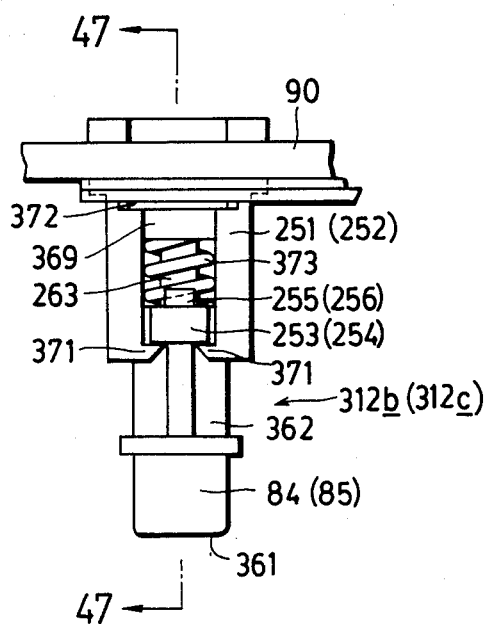
FIG. 46 is a front view of the assembled FF button.
Figure 47:
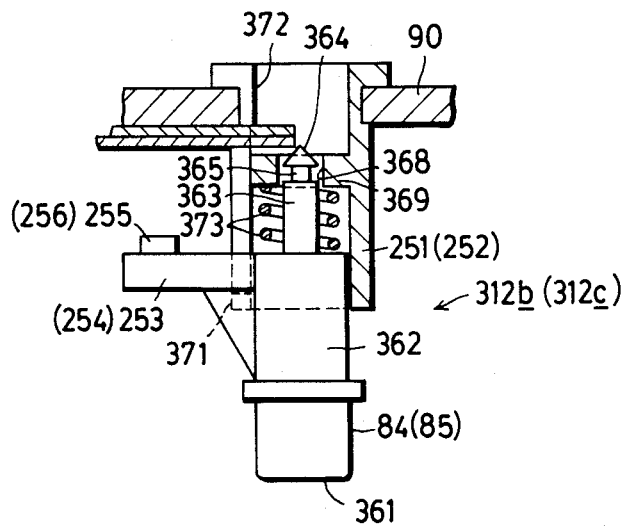
FIG. 47 is a sectional view taken along the line 47—47 of FIG. 46.
Figure 48:
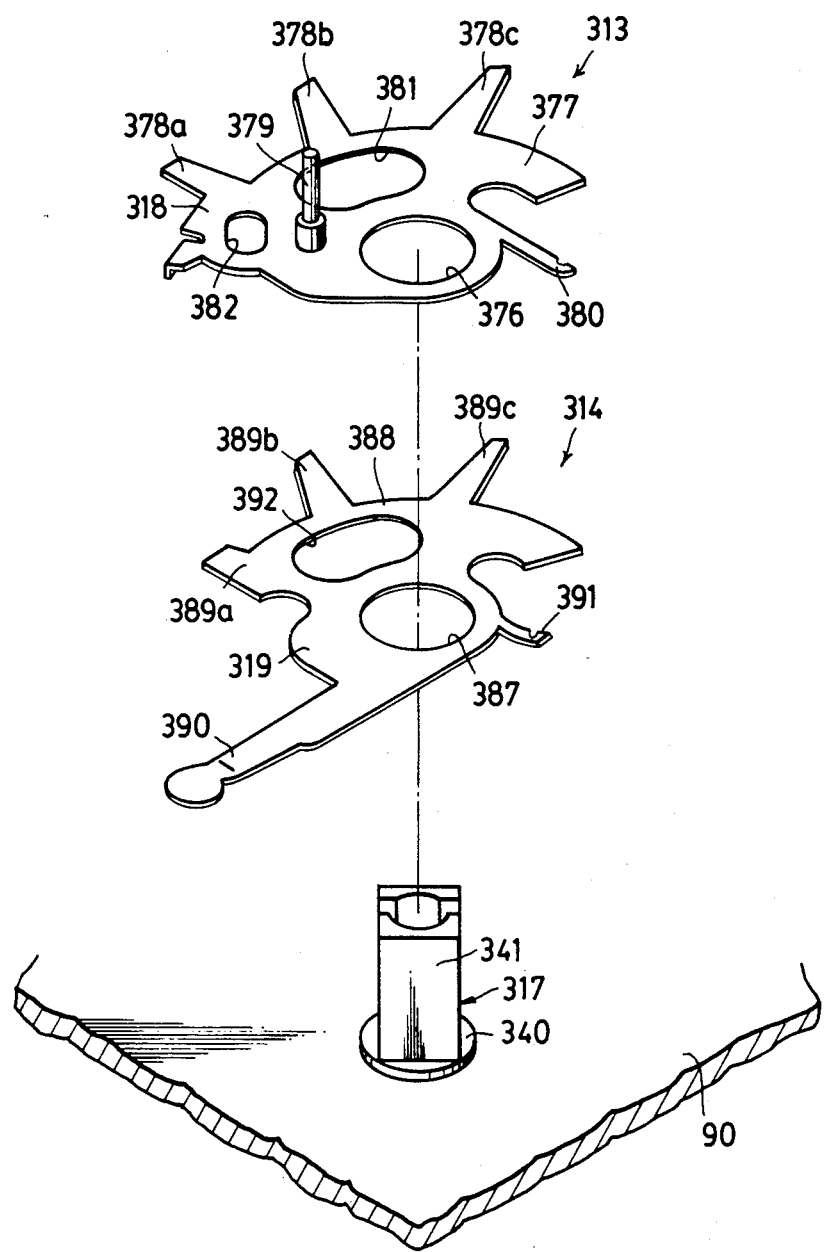
FIG. 48 is an exploded perspective view of a lock plate and switch operating plate shown inverted.

Referring now to FIGS. 45–47, it will be noted that the FF button 84 and the rewind button 85 are included in respective push-button assemblies 312b and 312c which are substantially the same, and thus only the specific arrangement of push-button assembly 312b will be described in detail herein. As shown, FF button 84 is molded of a synthetic resin or plastic material so as to comprise, as integral parts thereof, a cylindrical pressing portion 361 from which there extends upwardly a coaxial guide shaft portion 362 having the previously mentioned operating arm 253 extending radially therefrom. A metal operating shaft 363 extends coaxially upward from guide shaft portion 362 and is integrated therewith, for example, by the outsert molding method. A conical tip 364 is formed at the end of operating shaft 363, and the latter has an annular groove 365 formed therein adjacent conical tip 364.

The previously mentioned mounting member 251 for FF button 84 is tubular and molded of synthetic resin or plastic material, for example, by the outsert molding method, so as to be integrated with mounting board 90. Tubular mounting member 251 is formed with a guide bore 367 extending therethrough in the vertical direction. Intermediate its ends, guide bore 367 has an inwardly directed flange defining a reduced diameter hole 368 extending through a spring seat 369. Further, a guide slot 370 extends along one side of tubular mounting member 251 and is narrowed at its lower end to define a pair of retaining pawls 371 directed inwardly toward each other. The upper end of guide slot 370 opens into a slit 372 extending through the wall of tubular mounting member 251 at the base of the latter immediately adjacent mounting board 90. The slit 372 has an angular extent substantially larger than that of slot 370.

After the installation of a helical compression spring 373 about operating shaft 363, guide shaft portion 362 of FF button 84 is inserted from below into guide bore 367 so that the tip end portion of operating shaft 363 extends into hole 368 and the upper end of spring 373 bears against seat 369. Furthermore, operating arm 253 is forced past retaining pawls 371 into guide slot 370, whereupon retaining pawls 371 limit the downward movement of FF button 84 under the urging of spring 373 to its inoperative or extended position shown on FIGS. 46 and 47. Of course, FF button 84 can be depressed upwardly against the force of spring 373 and the resulting upward movement of button 84 is guided by the engagement of its guide shaft portion 362 in guide bore 367 and the engagement of operating arm 253 in slot 370.

When the push-button assemblies 312, 312a, 312b and 312c are constructed as described above, the buttons 82–85 can be molded of plastic and the mounting members 251, 252, 269 and 317 can be molded integrally with mounting board 90 by the outsert molding method so that the elements which make up the push-button assemblies can be easily and inexpensively manufactured. Further, the assembling together of such elements making up the pushbutton assemblies is also greatly simplified, as all that is required is to push the buttons 82, 83, 84 and 85 into the respective mounting members 317, 269, 251 and 252 from below and in the same direction normal to the mounting board 90. Since the various gears making up the tape driving unit 91 can also be mounted on mounting board 90 from below, that is, in the same direction as buttons 82–85, the use of automatic assembling techniques for assembling the driving unit 91 as well as the pushbutton assemblies is facilitated.

Moreover, in the described cassette tape player 70 according to this invention, buttons 82–85 and the gears of tape driving unit 91 are all at the side of mounting board 90 opposite to the side at which cassette 71 is disposed in its loaded condition, and also within the projected area of the loaded cassette, so that the outside dimensions of cabinet 73 can be made only slightly larger than the corresponding outer dimensions of cassette 71, and thereby a remarkable reduction in the overall size of cassette tape player 70 is realized.

Figure 49A:
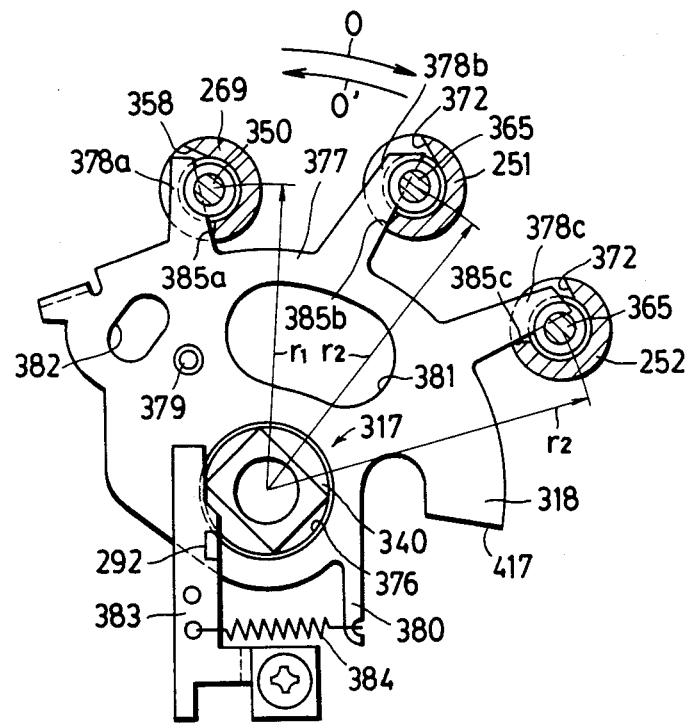
FIG. 49A to FIG. 49C are partly-broken away bottom views to which reference will be made in explaining locking and unlocking operations of the lock unit.
Figure 49B:
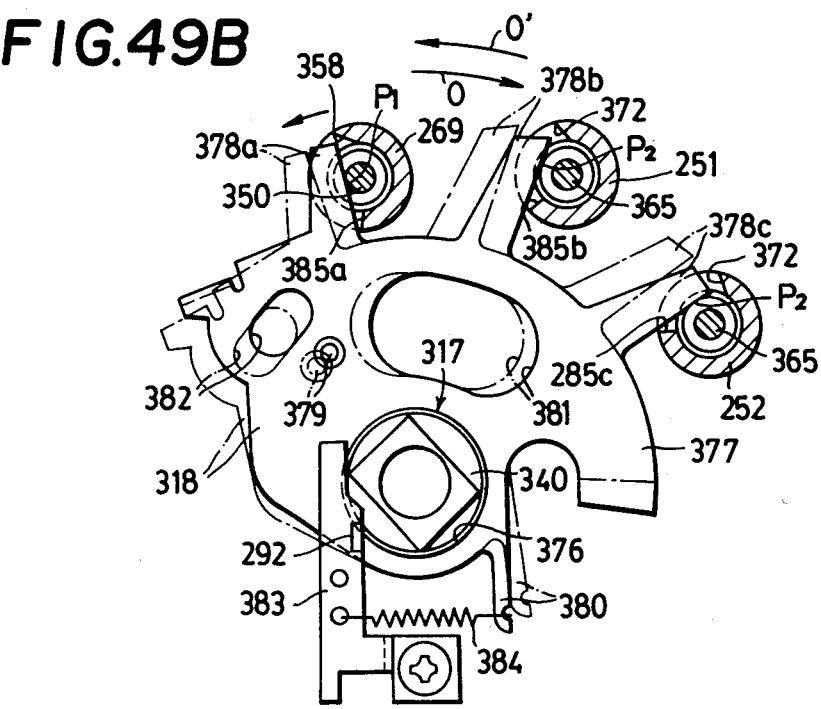
Figure 49C:
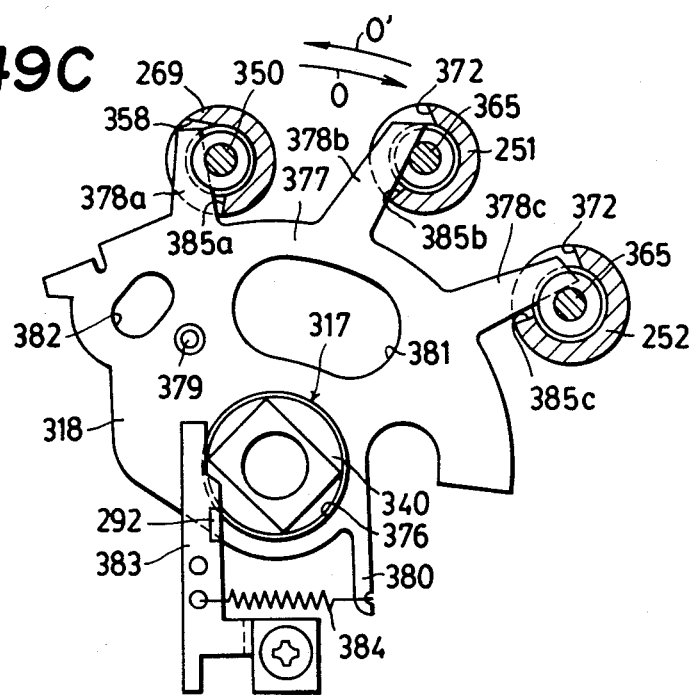
Figure 50A:
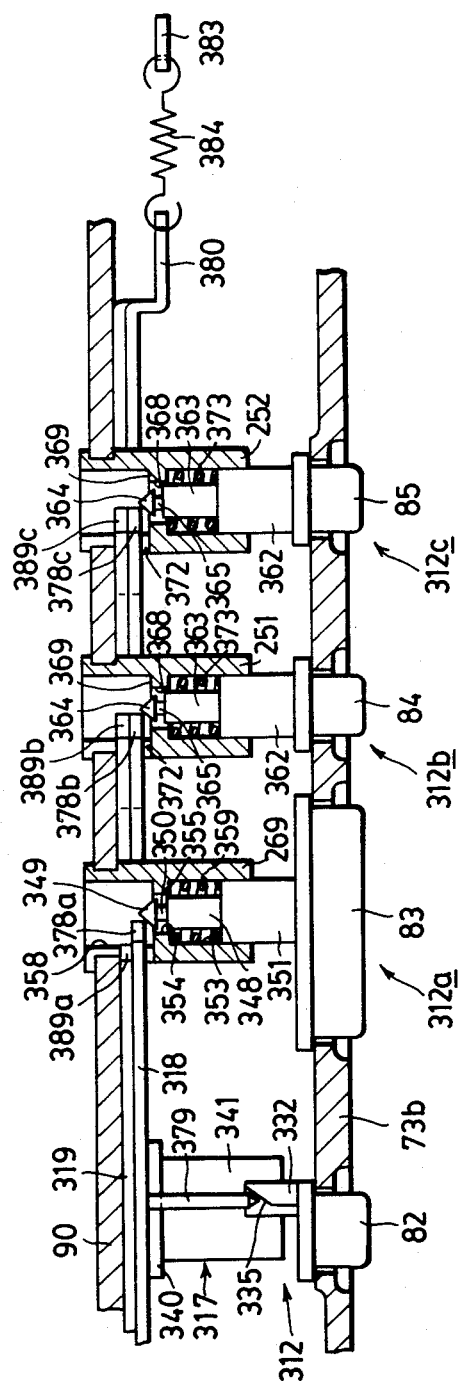
FIGS. 50A to 50C are cross-sectional developmental views to which reference will be made in explaining locking and unlocking operations of the lock unit.

Referring now to FIGS. 48, 49A–49C, and 50A–50C, it will be seen that a push-button locking unit 313 of the player 70 according to this invention includes the previously mentioned locking gate 318 which is constructed of thin sheet metal having a circular aperture 376 which fits over circular base 340 of mounting member 317 so as to be turnably guided by the latter. Locking plate 318 is further shown (FIG. 48) to have an arcuate peripheral portion 377 from which three locking elements 378a, 378b and 378c project radially outward at predetermined intervals. An unlocking pin 379 projects downwardly from locking plate 318 and is positioned for engagement, at its lower end, which is desirably conical, with slant face 335 of locking plate operating portion 332 on stop button 82 (FIG. 50A). An arm 380 also extends from locking plate 318 to form an anchor for a spring, and locking plate 318 is still further formed with openings 381 and 382 which are dimensioned and positioned therein so that operating plate supporting shaft 241 for operating plates 245 and 248 and guide pin 288 for lever 270 can extend through such openings without interfering with angular displacements of locking plate 318 about the center of circular base 340.

When locking plate 318 is mounted immediately below switch operating plate 319 against the undersurface of mounting board 90, as hereinafter described in detail, with its circular aperture 376 receiving circular base 340 for pivoting about the center of the latter, the locking elements 378a, 378b and 378c are respectively inserted in slits 358, and 372 of the mounting members 269, 251 and 252, respectively, whereby the vertical positions of locking elements 378a–378c relative to mounting board 90 are positively established. A pressure element 383 (FIGS. 49A–49C) is secured to mounting board 90 and presses upwardly against the underside of locking plate 318 at a location adjacent circular opening 376 for maintaining locking plate 318 on circular base 340. A tension spring 384 is connected at one end to anchor 380 and, at its other end, to pressure element 383 so that locking plate 318 is pivotally biased in the direction of the arrow o on FIG. 49A. The pressure element 383 also has formed thereon the anchor 292 for the spring 293 acting on lever 270. The ends of slits 358, and 372 in mounting members 269, 251 and 252 which are closest to the axis of pivotal movement of locking plate 318 form restrictions 385a, 385b and 385c, respectively, for limiting the pivotal movement of locking plate 318 in the direction of the arrow o, and thereby limiting the extent to which locking elements 378a, 378b and 378c can be inserted into the respective slits 358 and 372.

It is to be noted that, in locking unit 313, the radial distance $r_2$ from the center of the pivotal movement of locking plate 318 to the center of the operating shaft 363 of each of the FF button 84 and the rewind button 85 is greater than the distance $r_1$ from such center of the pivotal movement to the center of the operating shaft 348 of reproducing or FWD button 83.

The above described locking unit 313 operates as follows:

In the stop mode or condition (FIGS. 49A and 50A), all of buttons 82–85 are urged downwardly to their extended or inoperative positions by the respective compression springs 343, 359 and 373. In such inoperative or extended positions of buttons 83, 84 and 85, the conical tips 349 and 364 of the operating shafts 348 and 363 just reach to the plane of locking plate 318 so as to be bearly engageable with locking elements 378a, 378b and 378c.

When button 83 is depressed upwardly to its advanced or operative position against the force of spring 359 for selecting or establishing the reproducing mode of player 70, conical tip 349 of operating shaft 348 acts against locking element 378a for angularly displacing locking plate 318 in the direction of arrow o' on FIG. 49B against the force of tension spring 384 until annular groove 350 attains the height of locking element 378a. Thereupon, locking plate 318 is returned in the direction of arrow o on FIG. 49B by spring 384 for engaging locking element 378a in annular groove 350 and thereby locking reproducing or FWD button 83 in its advanced position.

Figure 50B:
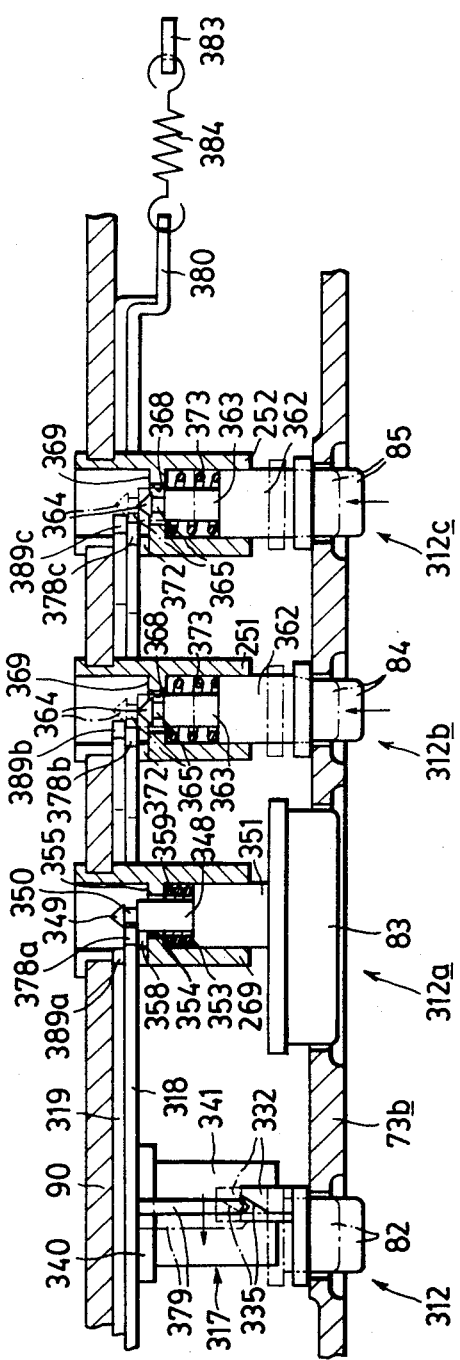
Figure 50C:
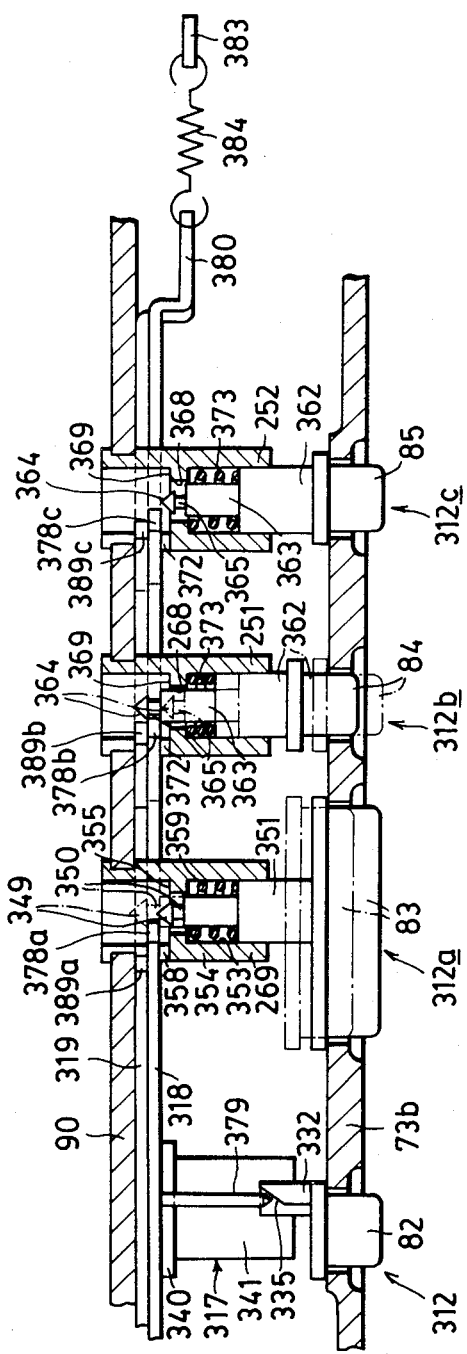

FIGS. 49C and 50C show, in full lines, the condition when the FF or fast-forward mode is selected by upward depressing and locking of FF button 84 in its advanced or operative position. More particularly, when FF button 84 is depressed upwardly to its advanced position against the force of spring 373, its conical tip 364 acts against locking element 378b to pivot locking plate 318 in the direction of arrow o' on FIG. 49C until the annular groove 365 of operating shaft 348 is at the same height as locking element 378b, whereupon locking plate 318 is returned in the direction of arrow o on FIG. 49C by spring 384 for engaging locking element 378b in annular groove 365 and thereby locking FF button 84 in its advanced or operative position.

It will be appreciated that, in the locked state of reproducing or FWD button 83 shown in full lines on FIG. 49B, locking element 378a is held in a position that is shifted slightly in the direction of arrow o' from its position in the stop mode, as shown on FIG. 49A. Similarly, locking elements 378b and 378c are held in positions that are shifted slightly in the direction of arrow o' on FIG. 49B, as compared with their positions in the stop mode, as shown on FIG. 49A. Since the distance $r_2$ is substantially larger than the distance $r_1$, as previously noted, the distances that the locking elements 378b and 378c are shifted in the direction of the arrow o' from their positions on FIG. 49A to their positions shown in full lines on FIG. 49B, at their points of engagement $P_2$ with the respective operating shafts 363, are somewhat larger than the distance moved by the locking element 378a in the direction of the arrow o' at its engaging point $P_1$ with operating shaft 348 between the position shown on FIG. 49A and the position shown in full lines on FIG. 49B. Therefore, if reproducing or FWD button 83 is already locked in its advanced or operative position, either FF button 84 or rewind button 85 may be depressed upwardly to its advanced or operative position, as indicated in broken lines on FIG. 50B, without engagement of the locking element 378b or 378c in the annular groove 365 of the respective operating shaft 363. Accordingly, if FF button 84 or rewind button 85 is depressed to its advanced or operative position at a time when reproducing or FWD button 83 is already locked in its advanced position, the depressed button 84 or 85 is not locked in its advanced or operative position, nor is the reproducing button 83 unlocked and, as a result thereof, either the CUE mode of the REV mode is established.

Conversely, if reproducing or FWD button 83 is depressed to its advanced or operative position at a time when either the FF button 84 or the rewind button 85 has been previously locked in its operative position, the previously locked button 84 or 85 is unlocked or released for return to its inoperative or extended position, while reproducing button 83 is locked in its advanced position.

If stop button 82 is depressed upwardly against the force of compression spring 343, as indicated in broken lines on FIG. 50B, at a time when any one of buttons 83, 84 and 85 has been locked in its advanced position, slant face 335 on locking plate operating portion 332 acts against the lower end of unlocking pin 379 for laterally displacing the latter and thereby pivoting locking plate 318 in the direction of arrow o' on FIG. 49B. Such pivotal movement of locking plate 318 against the force of spring 384 releases the locking element 378a, 378b or 378c from the annular groove 350 or 365 of the button 83, 84 or 85 which was previously locked to permit the respective spring 359 or 373 to return the button 83, 84 or 85 to its extended inoperative position.

Since locking plate 318 of the described locking unit 313 is constituted by a thin metal plate and is pivoted for movement parallel to the plane of mounting board 90 for either locking or releasing buttons 83-85, the reciprocating stroke of each of those buttons 83-85 can be minimized, and the locking and releasing of the buttons 83-85 can be effected with great reliability in a cassette tape player of very small overall thickness.

Referring again to FIG. 48, it will be seen that the switch operating plate 319 is included in a power switch unit 314 and is also formed of thin sheet metal. Switch operating plate 319 has a circular aperture 387 which is also adapted to receive circular base 340 for guiding plate 319 in pivotal movements about the center of such circular base. Switch operating plate 319 similarly to locking plate 318, has an arcuate peripheral portion 388 with three lugs 389a, 389b and 389c projecting radially outward therefrom at predetermined intervals. The length of the lug 389a is seen to be about one-half that of each of the other lugs 389b and 389c. Further, a switch operating arm 390 extends from one side of the portion of plate 319 around aperture 387, and a spring anchor arm 391 extends from another side of the portion of plate 319 around aperture 387. Finally, switch operating plate 319 has an opening 392 therein which is positioned and dimensioned to permit the extension of operating plate supporting shaft 241 without limiting the pivoting of plate 319.

As earlier noted, and as shown on FIGS. 50A-50C, 53A and 53B, switch operating plate 319 is interposed between mounting board 90 and locking plate 318 with its circular aperture 387 receiving circular base 340 of mounting member 317, whereby switch operating plate 319 is mounted for pivoting in a plane parallel with mounting board 90 about the center of circular base 340. The lugs 389a, 389b and 389c of switch operating plate 319 are inserted into slits 358 and 372 of push-button assemblies 312a, 312b and 312c, respectively, and switch operating plate 319 is pivotally biased in the direction of the arrow o on FIG. 53A by a tension spring 393 which is connected between spring anchor 391 on plate 319 and the pressure plate 383. The lugs 389a, 389b and 389c are also adapted to abut ends 385a, 385b and 385c of the respective slits 358 and 372 for limiting the pivotal movement of plate 319 in the direction of arrow o. The two relatively long lugs 389b and 389c are inserted in the respective slits 372 similarly to the locking elements 378b and 378c, respectively, so as to overlap such locking elements of locking plate 318. However, the third or relatively short lug 389a on switch operating plate 319 is inserted only up to the inlet part of the respective slit 358.

Figure 51:
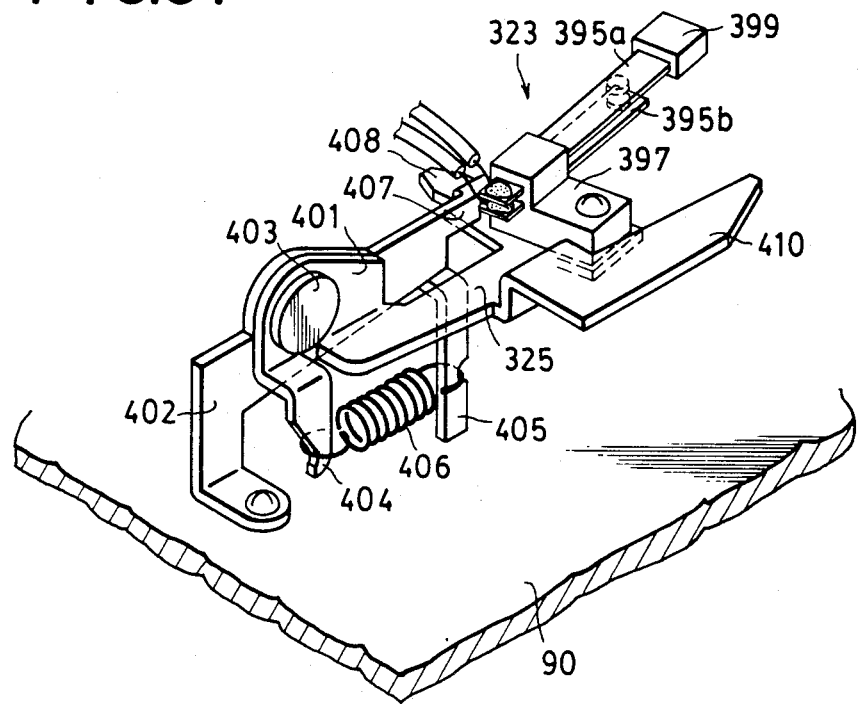
FIG. 51 is an enlarged perspective view of a switch mounting portion of a power switch unit which is shown inverted.
Figure 52:
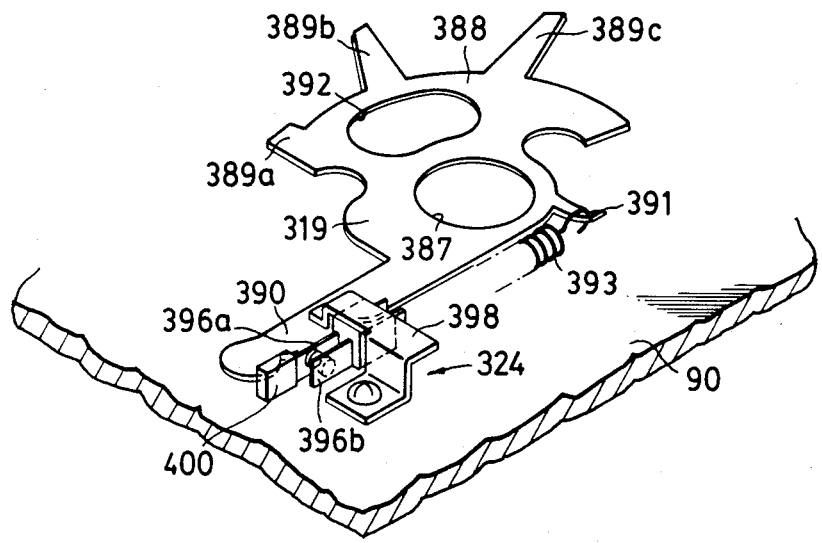
FIG. 52 is a perspective view of a switch operating plate portion of the power switch unit, also shown inverted.

As shown on FIGS. 51 and 52, the first and second power switches 323 and 324 are in the form of leaf switches, and are comprised of a pair of leaf spring contacts 395a and 395b and a pair of leaf spring contacts 396a and 396b, respectively, which are fixed, at one end, to insulating mounting members 397 and 398, respectively. The free end portions of leaf spring contacts 395a and 396a extend beyond the free ends of the other respective contacts 395b and 396b and carry insulated engagement pads 399 and 400, respectively. The first power switch 323 has its insulated mounting member 397 secured to the underside of switch mounting plate 325 (FIG. 51), while mounting member 398 of the second power switch 324 is secured directly to the underside of mounting board 90. Switch mounting plate 325, at its end portion remote from switch 323, is formed with a perpendicular flange 401 which is mounted for pivoting about a horizontal axis, that is, an axis parallel to the underside of mounting board 90, by means of a pivot 403 carried by a mounting bracket 402 which is fixed to the underside of mounting board 90 and extends in a plane perpendicular to the latter. Switch mounting plate 325 is pivotally biased in the direction away from mounting board 90, that is, downward or in the direction of the arrow p on FIG. 54A, by a tension spring 406 which is stretched between an anchor arm 404 extending upwardly from flange 401 of spring mounting plate 325 and an anchor arm 405 integral with supporting bracket 402. The downward swinging of switch mounting plate 325 under the influence of spring 406 is limited to an approximately horizontal position by engagement of a laterally directed lug 408 on plate 325 with a stop 407 extending from mounting bracket 402 (FIG. 1).

Figure 53A:
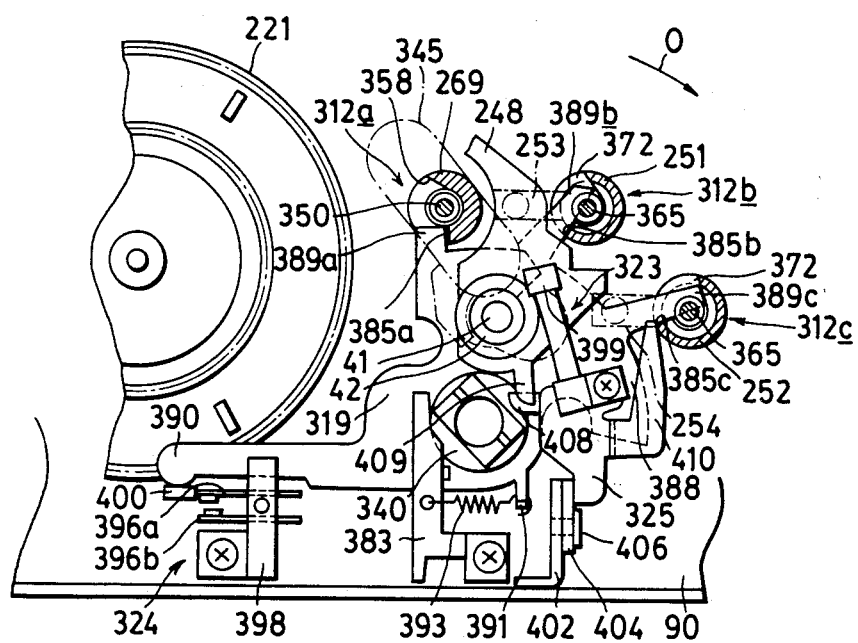
FIGS. 53A and 53B are partly broken away bottom views to which reference will be made in explaining operation of the power switch unit.
Figure 54A:
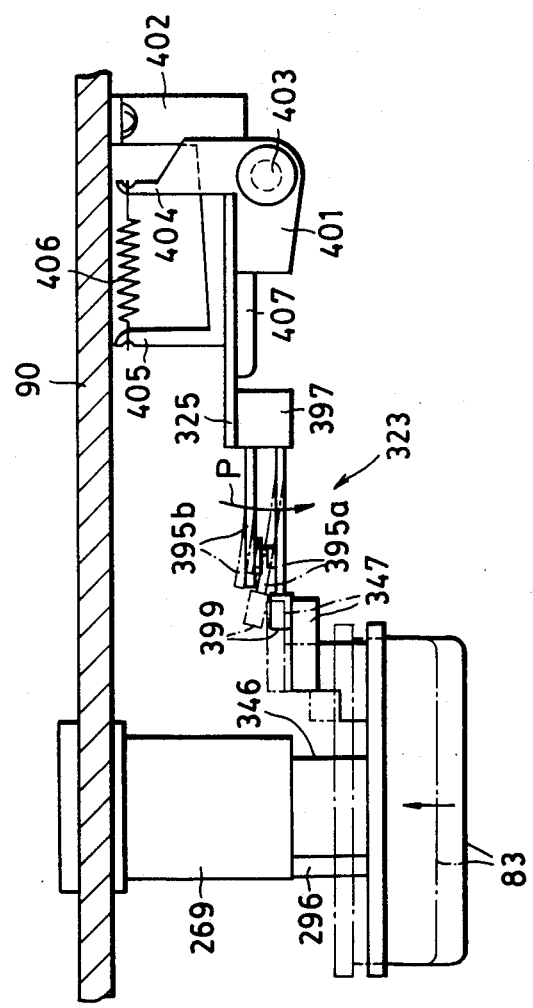

When first power switch 323 is mounted as described above, its insulated engagement pad 399 is disposed above switch operating portion 347 of reproducing or FWD button 83, as shown on FIG. 54A. Further, as is shown on FIG. 53A, lug 408 directed laterally from switch mounting plate 325 is disposed in close proximity to the upper surface of a lug 409 which extends integrally from second operating plate 248 (FIGS. 22 and 23). As shown particularly on FIG. 51, switch mounting plate 325 further has a downwardly offset projection 410 extending longitudinally from one side of switch mounting plate 325 so as to be disposed in close proximity to the upper portion of operating arm 254 of rewind button 85 (FIG. 53A). As also shown on FIG. 53A, the free end or tip of switch operating arm 390 on switch operating plate 319 is disposed close to insulated engagement pad 400 of second power switch 324.

The first and second power switches 323 and 324 of power switch unit 314 are normally OFF, and are adapted to be included in a power supply circuit (not shown) for motor 211 to cause operation of the latter whenever one or the other of switches 323 and 324 is turned ON. The first and second power switches 323 and 324 are operated as follows:

Starting in the stop mode (FIGS. 53A and 54A) in which both switches 323 and 324 are OFF, if reproducing or FWD button 83 is depressed upwardly and locked in its advanced or operative position, as indicated in broken lines on FIG. 54A, switch operating portion 347 displaces insulated engagement pad 399 upwardly and, as a result thereof, leaf spring contacts 395a and 395b are brought into pressure contact with each other and first power switch 323 is turned ON. Since lug 389a of switch operating plate 319 is short and does not extend into the path of operating shaft 348 of button 83 (FIG. 53A), reproduce button 83 can be depressed to its operative position (FIG. 50B) without causing engagement of the tip 349 of its operating shaft 348 with lug 389a for pivoting switch operating plate 319. Thus, in the reproducing mode, switch operating plate 319 remains in the position shown on FIG. 53A so that switch 324 continues in its normal OFF state.

Figure 53B:
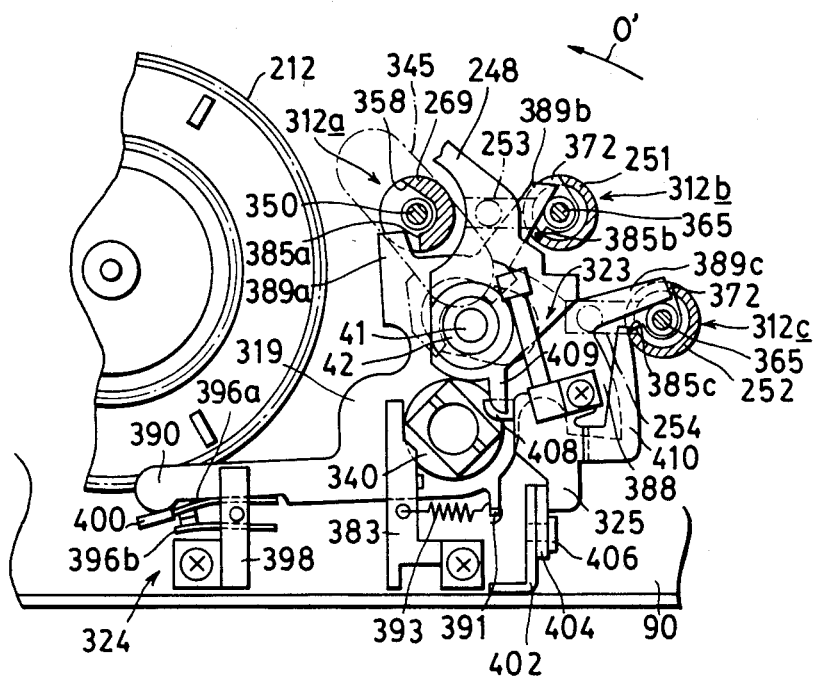

On the other hand, starting from the stop mode, if FF button 84 is depressed upwardly and locked in its advanced or operative position, conical tip 364 of its operating shaft 363 acts against lug 389b of switch operating plate 319 for pivotally displacing the latter in the direction of the arrow o' on FIG. 53B against the force of spring 393, with the result that the tip of switch operating arm 390 displaces insulated engagement pad 400 for causing pressure contact between leaf spring contacts 396a and 396b, whereby second power switch 324 is turned ON. By reason of the conical configuration of the tip 365 of operating shaft of button 84, the pivoting of switch operating plate 319 to an extent sufficient to turn ON second power switch 324 occurs only at the time when FF button 84 is fully depressed and locked in its advanced or operative position. In other words, upon the initiation of the depressing of button 84, the turning ON of second power switch 324 is slightly delayed so as to occur almost simultaneously with the locking of FF button 84 in its raised operative position.

As previously noted, during the upward depressing of FF button 84 toward its operative or advanced position, operating arm 253 thereof effects corresponding upward movement of second operating plate 248. In the course of such upward movement of second operating plate 248, the lug 409 thereon engages lug 408 on switch mounting plate 325 so as to cause substantial upward pivoting of switch mounting plate 325 in the direction of the arrow p' on FIG. 54B against the force of spring 406. Such pivotal movement of switch mounting plate 325 causes the first power switch 323 to be bodily moved upwardly, for example, to the position shown in full lines on FIG. 54B, in which position the insulated engagement pad 399 of switch 323 is spaced upwardly from the highest position attainable by switch operating portion 347 of reproducing button 83, as indicated in broken lines on FIG. 54B. It will be appreciated that the upward bodily movement of first power switch 323 away from switch operating portion 347 of button 83 occurs as soon as the upward depressing of FF button 84 is initiated.

Similarly, when starting from the stop mode of the player, upward depressing of rewind button 85 to its advanced or operative position and the locking of button 85 in such position causes the conical tip 364 of its operating shaft 363 to displace lug 389c of switch operating plate 319 in the direction of arrow o' on FIG. 53B so that second power switch 324 is turned ON by the action of switch operating arm 390 on insulated engagement pad 400. In this case, as in the above described case of the depressing of FF button 84, upon depressing of rewind button 85, switch mounting plate 325 is pivoted upwardly by the action of operating arm 254 on projection 410 of switch mounting plate 325, with the result that first power switch 323 is again displaced to the position shown in full lines on FIG. 54B so as to be immune from actuation by switch operating portion 347 of reproducing button 83.

By way of summarizing the above, starting from the stop mode, the instant reproducing button 83 is depressed, first power switch 323 is turned ON to supply power to motor 211. On the other hand, when FF button 84 or rewind button 85 is depressed, once again with the player in its stop mode, second power switch 324 is not turned ON until just before the button 84 or 85 is locked in the respective advanced or operative position, that is, second power switch 324 is turned ON to supply power to motor 211 approximately simultaneously with the locking of button 84 or 85 in its advanced or operative position.

If stop button 82 is depressed with player 70 in its reproducing mode, reproducing or FWD button 83 is unlocked and returned to its extended or inoperative position shown in full lines on FIG. 54A, and its switch operating portion 347 is moved away from insulated engagement pad 399 of first power switch 323 so that the latter is turned OFF and the supply of power to motor 211 is interrupted. Similarly, if stop button 82 is depressed with player 70 in either its fast-forward or rewind mode, FF button 84 or rewind button 85 is returned to its extended or inoperative position shown in full lines on FIG. 50B so that switch operating plate 319 can be returned by spring 393 to its initial position shown in FIG. 53A, whereby switch operating arm 390 releases insulated engagement pad 400 of second power switch 324 which is thereby turned OFF to interrupt the supply of power to motor 211. The return of FF button 84 or rewind button 85 to its extended or inoperative position also permits switch mounting plate 325 to be returned by spring 406 to its initial or returned position shown in full lines on FIG. 54A.

If player 70 is in its reproducing or playback mode, that is, first power switch 323 has been turned ON in response to depressing of reproducing button 83, as indicated in broken lines on FIG. 54A, and then FF button 84 or rewind button 85 is depressed for effecting change-over to the CUE or REV mode, as earlier described, first power switch 323 is substantially displaced upwardly, as shown in full lines on FIG. 54B, as soon as the upward movement of button 84 or 85 is initiated, with the result that pad 399 of switch 323 is drawn away from switch operating portion 347 of reproducing button 83 to turn OFF switch 323. Shortly after switch 323 is thereby turned OFF, button 84 or 85 is locked in its advanced or operative position and, almost simultaneously therewith, second power switch 324 is turned ON. Therefore, when changing over to the CUE mode or the REV mode, the power supply to motor 211 is momentarily interrupted upon the initiation of the upward movement of button 84 or 85, and then the power supply to motor 211 is restored almost simultaneously with the locking of button 84 or 85 in its advanced or operative position.

As a result of the above described operating features of power switch unit 314, upon change-over from the stop mode to the fast-forward mode or the rewind mode of tape driving unit 91, first driving gear 221 is brought into engagement with first take-up reel shaft gear 233 or with switch-over gear 229, respectively, and only thereafter is power supplied to motor 211 for causing rotation of the meshing gears. Further, when changing over from the reproducing mode to the CUE or REV mode, the power supply to motor 211 is momentarily interrupted for halting the rotation of first driving gear 221 at the instant when upward movement of that gear is initiated, and power is again supplied to motor 211 for effecting rotation of first driving gear 221 only after the latter has been brought into engagement with first take-up reel shaft gear 233 or with switch-over gear 229.

From the above, it will be appreciated that, in the cassette type player 70 according to this invention, the driving of the gears of tape driving unit 91 by operation of motor 211 occurs only when the gears are fully engaged with each other, that is, power is not supplied to motor 211 during gear changes or change-overs between the reproducing, fast-forward, CUE, rewind and review modes, whereby to avoid the harsh gear noise and excessive gear wear that would result if power was supplied to motor 211 for positively driving gear 221 at a time when gear changes are being effected.

Figure 55:
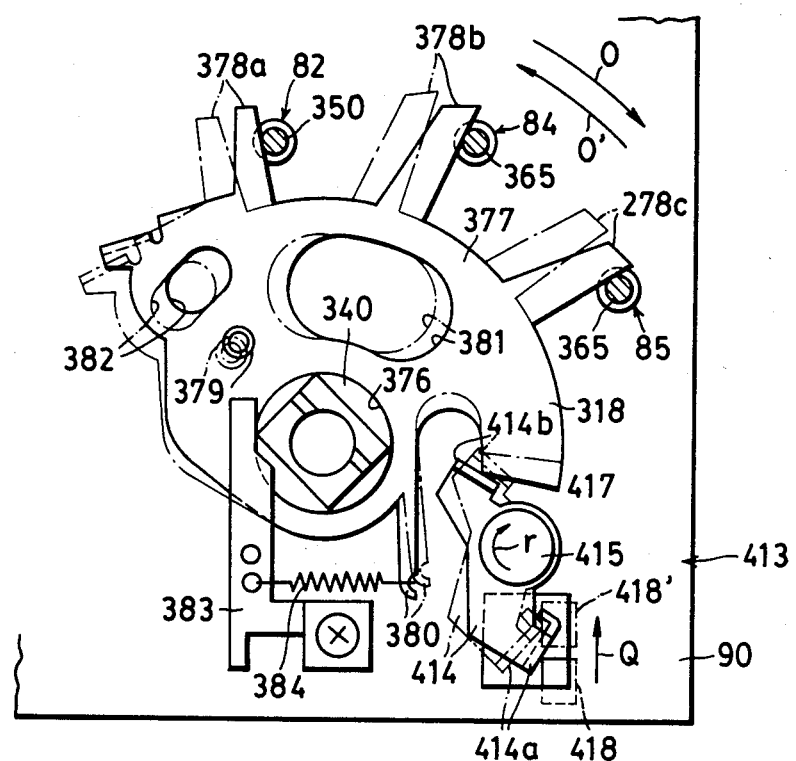
FIG. 55 is a partly broken away bottom view of an automatic reproducing or playback mode cancelling unit.
Figure 56:
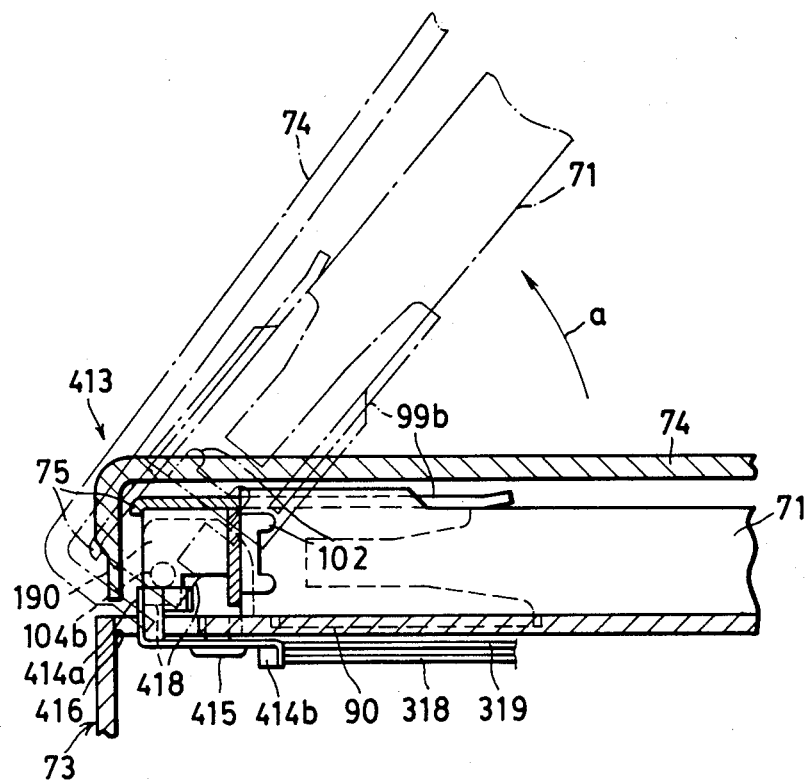
FIG. 56 is a cross sectional view to which reference will be made in explaining operation of a lock release lever by the cassette holder.
Figure 57:
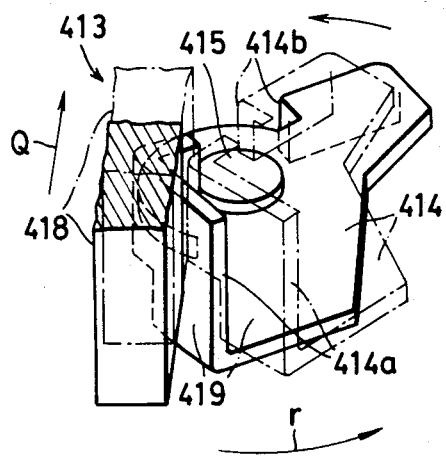
FIG. 57 is a perspective view of the lock release lever.

Referring now to FIGS. 55–57, it will be seen that cassette tape player 70 according to this invention further includes an automatic reproducing mode cancelling device 413 which is responsive to opening of cover 74. Such device 413 is shown to include an unlocking lever 414 pivoted on a pin 415 at the underside of mounting board 90 adjacent the rear portion thereof. One end of lever 414 has a generally V-shaped portion 414a projecting upwardly therefrom through an opening 416 in board 90 and being inserted in a cavity existing at the lower portion of guide support 190. The opposite end portion of lever 414 has an integral depending portion 414b which abuts an end edge 417 at the end of the arcuate portion 377 of locking plate 318 toward which the latter is urged by spring 384. Further, at the lower portion of guide support 190, there is provided an unlocking element 418 formed as an integral part of guide support 190, and which is disposed in opposing relation to an angled face 419 on the V-shaped upwardly directed portion 414a of lever 414. As shown particularly on FIG. 55, unlocking element 418 is positioned relative to the pivoting axis of cover 74 so that, upon movement of cover 74 from its closed position to its opened position, unlocking element 418 will move forwardly in the direction of the arrow Q from the position indicated in broken lines at 418 to the position indicated at 418'.

As previously noted, in operating the cassette tape player 70, a cassette 71 is initially inserted in cassette holder 75 while the latter is in the cassette inserting position shown on FIG. 9A, and then cassette holder 75 is pivotally moved with cassette cover 74 to the cassette loading position shown on FIG. 9B. Such pivotal movement of cassette holder 75 causes end 158a of head base 158 to be disposed immediately in front of operating arm 277 of lever 270, as shown on FIG. 34A. Thereafter, upon depressing of reproducing button 83 and the locking thereof in its advanced or operative position, as shown on FIG. 34B, lever 270 is moved longitudinally to its advanced position using the power of motor 211 and there locked. During such movement of lever 270 its operating arm 277 acts on end portion 158a of head base 158 so that the latter is moved to its advanced position shown on FIG. 34B and there held for establishing the desired reproducing mode.

Figure 58A:
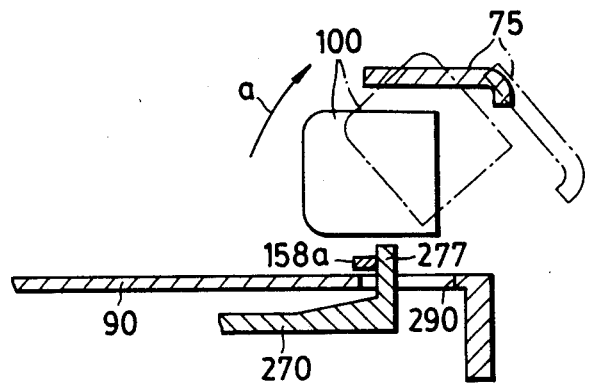
FIGS. 58A and 58B are cross-sectional views to which reference will be made in explaining a hazard avoided by the automatic playback mode cancelling unit.
Figure 58B:
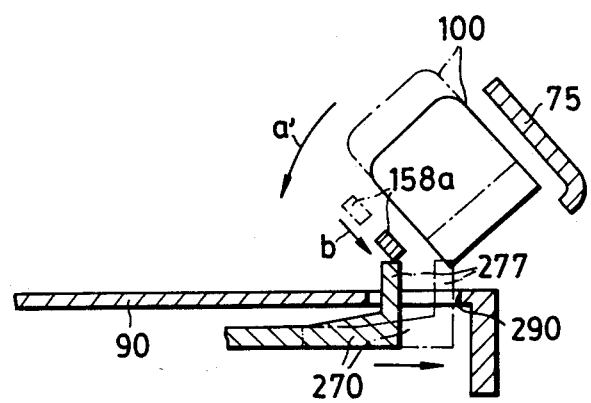

In the absence of the reproducing mode cancelling device 413, if cassette cover 74 is opened while player 70 is in its reproducing mode, that is, without first depressing stop button 82, the pivoting of cassette holder 75 to its cassette inserting position (FIG. 9A) followed by the return of cassette holder 75 to its cassette loading position (FIG. 9B) may cause the free end portion 158a of the head base to strike accidentally against the upper end of operating arm 277 of lever 270, for example, as shown in full lines on FIG. 58B, with the result that lever 270 and/or head base 158 may be broken. More particularly, in the reproducing mode represented in solid lines on FIG. 58A, if cassette holder 75 is pivotally moved in the direction of the arrow a to the cassette inserting position indicated in broken lines, the tip or free end portion 158a of head base 158 is drawn upwardly above operating arm 277 of lever 270, whereupon head base 158 is returned in the direction of arrow b on FIG. 13 by spring 163 so as to be returned to its initial or returned position represented in solid lines on FIG. 58B from its advanced position represented in broken lines. Therefore, if lever 270 remains in its advanced position corresponding to the reproducing mode of the player, as shown in full lines on FIG. 58B, at a time when cassette holder 75 is pivoted in the direction of the arrow a' on FIG. 58B, the tip or free end portion 158a of head base 158, in its returned position, will strike directly against the upper end of operating arm 277.

The above problem is avoided in player 70 having the automatic reproducing mode cancelling device 413. More particulary, it will be seen that, if cassette holder 75 is pivotally moved in the direction of arrow a from the cassette loading position shown in solid lines on FIG. 56 to the cassette inserting position shown in broken lines, unlocking element 418 is moved in the direction of arrow Q on FIGS. 55 and 57 and acts against the angled face 419 of lever 414 with the result that the latter is pivoted in the direction of the arrow r. Pivoting of lever 414 in the direction of the arrow r on FIG. 55 causes its depending end portion 414b to act against the end edge 417 of locking plate 318 whereby the latter is pivoted in the direction of arrow o' against the force of spring 384. As earlier described, such pivoting of locking plate 318 causes unlocking of reproducing or FWD button 83, with the result that cassette tape player 70 is automatically restored to its stop mode. The unlocking of reproducing button 83 permits lever 270 to be returned from its advanced position indicated in solid lines on FIG. 58B to its returned or initial position shown in broken lines so that, if the cassette holder 75 is thereafter pivoted again to the cassette loading position, the tip or free end portion 158a of head base 158 will be disposed well in front of arm 277 of lever 270 and cannot accidentally strike against the upper end of such arm 277.

Further, by reason of the presence of automatic reproducing mode cancelling device 413, movement of cassette holder 75 to its cassette inserting position at a time when the player is in its fast-forward or rewind mode will again cause locking plate 318 to be pivotally displaced in the direction of arrow o' on FIG. 55, thereby to unlock the FF button 84 or the rewind button 85 for automatically restoring player 70 to its stop mode. Further, by reason of the presence of device 413, none of the buttons 83, 84 and 85 can be locked in the respective depressed or advanced position so long as cassette cover 74 is in its opened position.

Although the invention has been shown applied to a cassette tape player, it will be appreciated that the invention may also be advantageously applied to other types of recording and/or reproducing apparatus.

Having described an illustrative embodiment of the invention with reference to the accompanying drawings, it is to be understood that the invention is not limited to that precise embodiment, and that various changes and modifications may be effected therein by one skilled in the art without departing from the scope or spirit of the invention, as defined in the appended claims.

What is claimed is:

1. In a cassette tape recording and/or reproducing apparatus including a substantially rectangular chassis having generally parallel first and second surfaces at its opposed sides, and cassette holding means for operatively positioning a tape cassette against said first surface such that axes of reels within said cassette are normal to said first surface;

a tape transport mechanism comprising reel shafts extending through said chassis from the side of said second surface for engaging respective reels in a tape cassette operatively positioned against said first surface, and gear transmission means for selectively driving said shafts in accordance with a plurality of operating modes of the apparatus, said gear transmission means consisting of a plurality of gears at the side of said chassis corresponding to said second surface for rotation about respective axes, all of said axes of the gears being normal to said second surface and fixed relative to each other and with respect to said second surface with at least one of said gears being displaceable in the direction of the respective axis for changing from one to another of said modes;

at least one push button each disposed at said side of the chassis corresponding to said second surface and each being manually actuable between extended and depressed positions in a direction normal to said second surface; and means responsive to actuation of said one push button from said extended position to said depressed position for displacing said one gear in said direction of the respective axis and thereby changing the mode of the apparatus.

2. A cassette tape recording and/or reproducing apparatus according to claim 1; in which said chassis has a perimeter substantially coextensive with a cassette to be operatively positioned against said first surface, and said tape transport mechanism and each said push-button are wholly contained within said perimeter.

3. A cassette tape recording and/or reproducing apparatus according to claim 1; in which there are a plurality of the push-buttons; and further comprising a locking plate in a plane parallel to said second surface and mounted on said chassis for pivotal movement in said plane, said locking plate being operative to lock the actuated push-button in said depressed position thereof.

4. A cassette tape recording and/or reproducing apparatus according to claim 3; in which, for each of said push-buttons, a hollow guide member extends from said second surface of the chassis normal to the latter and slidably guides the respective push-button in its movement between said extended and depressed positions thereof, each said hollow guide member has a slit therein extending parallel to said second surface and into which a respective locking portion of said locking plate extends, and each said push-button has a portion in the respective guide member formed with a keeper groove engageable by the respective locking portion of said locking plate for retaining the push-button in said depressed position.

5. A cassette tape recording and/or reproducing apparatus according to claim 4; further comprising bias means yieldably urging said locking plate to pivot in the direction inserting each said locking portion into the respective slit to a limit determined by engaging of said locking portion with an inner end of said slit.

6. A cassette tape recording and/or reproducing apparatus according to claim 5; in which said portion of each said push-button has a conical tip beyond said keeper groove and by which said locking portion is momentarily displaced against said bias means in actuation of the respective push-button from said extended position to said depressed position until said keeper groove registers with said locking portion to receive the same.

7. A cassette tape recording and/or reproducing apparatus according to claim 6; further comprising a spring in each said guide member for urging the respective push-button to said extended portion thereof.

8. A cassette tape recording and/or reproducing apparatus according to claim 7; further comprising cooperative means on each said push-button and the respective guide member which are engageable to limit, to said extended position, the movement of the respective push-button by said spring.

9. A cassette tape recording and/or reproducing apparatus according to claim 8; in which said cooperative means includes a longitudinal slot along a side of said guide member and having a narrowed opening at the end of said guide member remote from said second surface, and an arm extending from said push-button to be slidable along said slot and retained therein by said narrowed opening.

10. A cassette tape recording and/or reproducing apparatus according to claim 7; in which said cassette holding means is pivoted on said chassis for movement between a cassette receiving position inclined relative to said chassis and an operative position for disposing a cassette in said holding means against said first surface; and further comprising release means responsive to movement of said cassette holding means to said cassette receiving position for pivoting said locking plate in opposition to said bias means, whereby to release from said depressed position any one of said push-buttons previously actuated thereto.

11. A cassette tape recording and/or reproducing apparatus according to claim 10; in which said release means includes a release lever pivoted on said second surface of the chassis and having one end portion formed to act on said locking plate, an opening in said chassis, another end portion on said release lever extending through said opening and projecting from said first surface of the chassis, and an abutment extending from said cassette holding means and acting against said other end portion of the release lever in response to movement of said holder means to said cassette receiving position to cause said release lever to pivot said locking plate in opposition to said bias means.

* * * * *